United States Patent
Bedwell

(10) Patent No.: US 6,522,635 B1
(45) Date of Patent: *Feb. 18, 2003

(54) COMMUNICATION PROTOCOL FOR SATELLITE DATA PROCESSING

(75) Inventor: Thomas E. Bedwell, Reston, VA (US)

(73) Assignee: Mobile Satellite Ventures, LP, Reston, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/654,453

(22) Filed: May 28, 1996

Related U.S. Application Data

(60) Provisional application No. 60/000,226, filed on Jun. 15, 1995.

(51) Int. Cl.[7] .................................................. H04Q 7/00
(52) U.S. Cl. .................... 370/314; 370/321; 370/436; 370/445; 370/468; 370/471; 370/432; 370/524
(58) Field of Search .............................. 370/313–316, 370/319, 321, 322, 326, 328, 329, 330, 336, 337, 345–350, 442, 443–445, 447, 448, 437–439, 449, 428, 429, 465, 473, 468, 522; 340/825.07, 825.08; 455/450–452, 509, 510, 511, 512, 513, 500, 501, 502, 422, 426, 517, 524, 67.1

(56) References Cited

U.S. PATENT DOCUMENTS

| 4,686,672 A | | 8/1987 | Namiki ........................ 370/321 |
| 4,715,033 A | * | 12/1987 | Saburi ......................... 370/321 |
| 4,742,512 A | * | 5/1988 | Akashi et al. ............... 370/347 |
| 4,774,708 A | * | 9/1988 | Hotta .......................... 370/321 |
| 4,785,306 A | | 11/1988 | Adams ........................ 343/786 |
| 4,868,886 A | | 9/1989 | Assal et al. ................. 455/13.3 |
| 5,057,381 A | | 10/1991 | Persen ........................... 429/7 |
| 5,229,995 A | * | 7/1993 | Strawezynski et al. ..... 370/280 |

(List continued on next page.)

FOREIGN PATENT DOCUMENTS

GB 2265795 A 4/1993

OTHER PUBLICATIONS

"A Land Mobile Satellite Data System", by J.D.B. Kent, Proceedings of the Second International Mobile Satellite Conference IMSC '90 (JPL Publ. 90–97), pp. 97–102.

(List continued on next page.)

Primary Examiner—Seema S. Rao
(74) Attorney, Agent, or Firm—Myers Bigel Sibley & Sajovec

(57) ABSTRACT

A communication system includes a communication switching office having a transceiver for receiving/transmitting a message from/to a data terminal using a communication system, and a management system including a central controller receiving/transmitting the message from/to the communication switching office. The central controller is responsive to the message received from the data terminal, and receives data in the message received from the data terminal. The data terminal transmits to the management system on a message channel. The message channel includes multiple messages from multiple data terminals. The management system receives the multiple messages per message channel or TDM group, and allocates message channel bandwidth for each of the multiple messages to the data terminal responsive to the data terminal call request received on the signalling channel. The management system minimizes the store of the message therein and maximizes the forward of the message, providing the capability to minimize the amount of data that must be stored before transmitting the message to the data terminal, while simultaneously maximizing utilization of communication system resources.

80 Claims, 23 Drawing Sheets

U.S. PATENT DOCUMENTS

| | | | | |
|---|---|---|---|---|
| 5,231,633 A | * | 7/1993 | Hluchyi et al. | 370/429 |
| 5,239,545 A | * | 8/1993 | Buchholz | 370/348 |
| 5,271,039 A | | 12/1993 | Suzuki | 375/327 |
| 5,303,234 A | * | 4/1994 | Kou | 370/442 |
| 5,307,348 A | * | 4/1994 | Buchholz et al. | 370/348 |
| 5,311,583 A | * | 5/1994 | Friedes et al. | 379/209 |
| 5,355,374 A | | 10/1994 | Hester et al. | 370/461 |
| 5,638,399 A | * | 6/1997 | Schuchman et al. | 370/321 |
| 5,659,545 A | * | 8/1997 | Sowels et al. | 370/324 |
| 5,796,726 A | * | 8/1998 | Hassan et al. | 370/322 |
| 5,923,648 A | * | 7/1999 | Dutta | 370/280 |
| 5,991,279 A | * | 11/1999 | Haugli et al. | 370/311 |

OTHER PUBLICATIONS

"A New International Position Reporting Service for Maritime and Land Mobile Users", by A. Ekman, Proceedings of ION GPS–89. Second International Technical Meeting of the Satellite Division of the Institute of Navigation, 1989, pp. 133–137.

"Experiment of INMARSAT Standard–C System", by T. Higuchi, et al., Fourth International Conference on Satellite Systems for Mobile Communications and Navigation, 1988, (pp. 47–51.

"The Standard–C Communication System", by N. Teller, et al., Fourth International Conference on Satellite Systems for Mobile Communications and Navigation, 1988, pp. 43–46.

"Satellite Data Link Research and Development Program", by H. Takeda, First Annual International Satellite Surveillance and Communication Symposium, 1991, pp. 193–201.

"INMARSAT Standard–C Service", International Maritime Satellite Organization, Jun. 1986, pp. 47–49.

"Applications of On–Board Processing to Mobile Satellite Communications Systems: The INMARSAT Standard–C Example", by W. Milcz, IEEE Global Telecommunications.

"INMARSAT Standard–C Communications System", by Kevin Phillipas, IEEE International Conference on Communications 1988.

"Standard–C and Positioning", by J.C. Bell, Proceedings of National Technical Meeting, 1987, pp. 138–145.

"The Land Mobile Services of Inmarsat", by J.C. Bell, vol. 39, Jul. 1991, pp. 396–412.

"Land Mobile Services of Inmarsat", by J.C. Bell, Royal Institute of Navigation, vol. 39, Apr. 1991, pp. 268–281.

Telecommunications Journal, vol. 22, No. 11, 1988, Gallagher, "Land–Based Satellite Services for Mobile Communications", pp. 69, 60 and 64.

Teller et al. "The Standard–C Communication System", 1988, 4th International Conference on Satellite Systems for Mobile Communications and Navigation, pp. 43–46.

Navigation (Paris), vol. 39, Apr. 1991, Royal Institute of Navigation, Colloquim on Land Navigation and Information Systems, "Land Mobile Services of INMARSAT", pp. 269–281.

Teller et al., "The Standard–C Communication System", 1988, 4th International Conference on Satellite Systems for Mobile Communications and Navigation, pp. 43–46.

Electronics & Wireless World, Apr. 1988, "World–Scale Mobile Data Communications", pp. 400–402.

*Satellite Communications, Principles & Applications*, D. Calcutt & L. Tetley, published by Edward Arnold, 1994: Chapter 10, 'The Inmarsat Organization', pp. 205 to 221, and Chapter 13, The Inmarsat–C System, pp. 295 to 313.

* cited by examiner

KEY SPOT AREAS
1 - EASTERN
2 - CENTRAL
3 - MOUNTAIN
4 - WESTERN
5 - ALASKA AND HAWAII
6 - SOUTHERN

| SDM FIELD | SPOT AREA [SPOT ID] | # IN FEP [LOCAL ID] | FEP PAIR [OCEAN REGION] | SYSTEM [STATION ID] | TDM TYPE |
|---|---|---|---|---|---|
| | 1 | 1 | 0 | 51 | PRIMARY COMMON |
| | 1 | 2 | 0 | 51 | LES |
| | 2 | 1 | 1 | 51 | PRIMARY COMMON |
| | 3 | 2 | 1 | 51 | PRIMARY COMMON |
| | 4 | 1 | 2 | 51 | PRIMARY COMMON |
| | 5 | 2 | 2 | 51 | PRIMARY COMMON |
FIG. 6
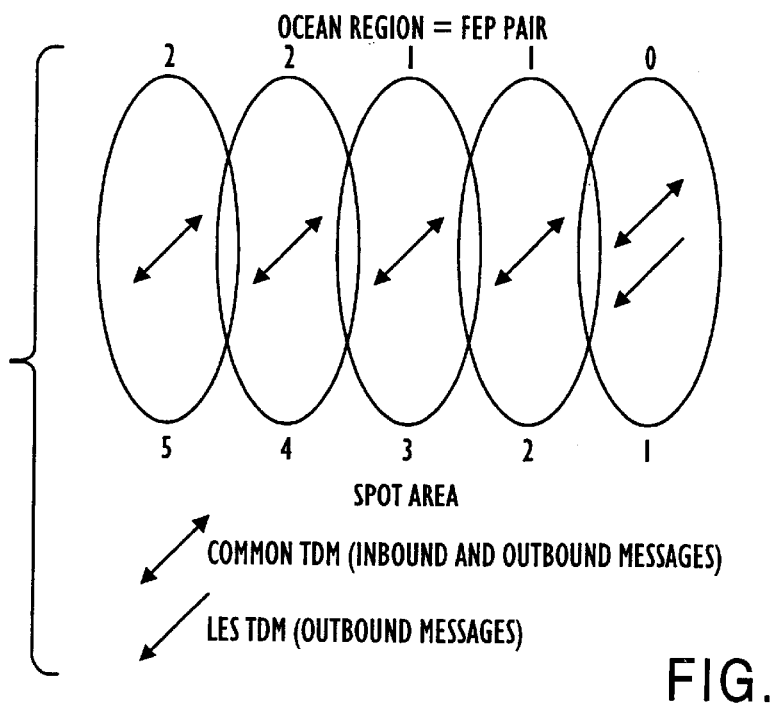
FIG. 7
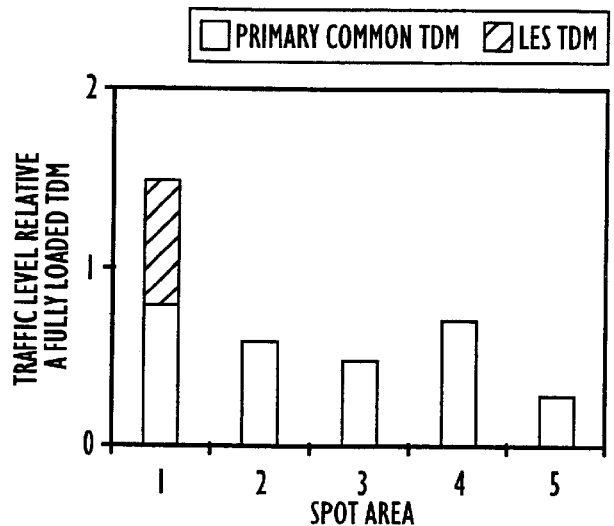
FIG. 8

| LES ACTION | MES ACTION | TIME ELAPSED | RELATIVE FRAME |
|---|---|---|---|
| | | -4.32.00 | 0 |
| | 1. MESSAGE ENTERED IN DTE BY OPERATOR | 0:00.00 | |
| | 2. MESSAGE FORMATTED AND TRANSFERRED TO DCE. -DCE DETERMINES NO CHANNEL CHANGE NECESSARY. | 0:02.00 | |
| | 3. READ BULLETIN BOARD (BB) AND SIGNALING CHANNEL DESCRIPTORS (SCD) TO DETERMINE FREE SLOTS. | 0:04.32 | |
| | 4. PREPARE REQUEST BURST SELECT A RANDOM SIGNALING SLOT | | |
| | 5. TRANSMIT ASSIGNMENT REQUEST ON SIGNALING CHANNEL. | 0:08:64 | |
| a. RECEIVED AT LES. | MES WAITING | 0:09:26 | |
| b. DECODE BURST REQUEST AND FORWARD TO MAIN PROCESSOR. MAIN PROCESSOR WILL SET MES DATABASE ENTRY TO BUSY. KEEP BURST INFORMATION FOR LATER BULLETIN BOARD UPDATE. | | | |
| c. COMPLETE BULLETIN BOARD (AND SIGNALING DESCRIPTORS ALSO ASSUMED) UPDATE FROM FRAME 0. | | | |
| d. LOAD FRAMING HARDWARE. | | 0:09:96 | |
| e. BEGIN FRAME 1 TDM TRANSMISSION WITH CONTAINING BB FROM FROM FRAME 0. | | 0:12:96 | 2 |
| f. DECODE ANY OTHER BURST REQUESTS FOR MAIN PROCESSOR. KEEP BURST INFORMATION FOR LATER BULLETIN BOARD UPDATE. | | | |

FIG. 13a g. COMPLETE BULLETIN BOARD BY
   UPDATE FROM FRAME 1.

h. LOAD FRAMING HARDWARE.                                                    0:18:60 i. BEGIN FRAME 2 TDM TRANSMISSION WITH
   CONTAINING BB FROM FROM FRAME 1. ·········>                               0:21:60        3

6. MUST READ FULL FRAME
                              OF DATA TO GET INPUT.

j. MESSAGE CHANNEL ASSIGNMENT FOR MES
   MESSAGE BURST ARRIVES WITH
   DEFINITION FOR FRAME 6, SLOT 1,
   FOR TDM TRANSMISSION.

k. INITIATE FRAME 3 TRANSMISSION    7. COMPLETE FRAME 2
   INCLUDING MESSAGE CHANNEL           READ.                                 0:30:24        4
   ASSIGNMENT.

8. VERIFY FROM SIGNALING
                                       DESCRIPTORS THAT FRAME
                                       1 REQUEST WAS RECEIVED
                                       PROPERLY

9. START LOOKING FOR
                                       MESSAGE CHANNEL
                                       ASSIGNMENT.

l. INITIATE FRAME 4 TRANSMISSION.  10. COMPLETE FRAME 3
                                       READ.                                 0:38:88        5

11. DECODE ASSIGNMENT.

12. WAIT FOR ASSIGNED
                                       MESSAGE CHANNEL SLOT
                                       TO BE AVAILABLE.

m. INITIATE FRAME 5 TRANSMISSION.  13. COMPLETE FRAME 4
                                       READ.                                 0:47:52        6

14. TUNE TO MESSAGE CHANNEL
                                       & TRANSMIT 40 CHARACTER
                                       MESSAGE PLUS PACKET
n. RECEIVE MESSAGE. <··············    HEADERS.                              0:51:36 o. DECODE MESSAGE AND SEND IT TO MAIN
   PROCESSOR. MUST WAIT FOR MESSAGE
   STORE AND MESSAGE REFERENCE NUMBER                                        FIG. 13b
   BEFORE RESPONSE.
                                   15. MES TUNES TO TDM
                                       CHANNEL TO WAIT FOR

MESSAGE ACKNOWLEDGMENT.

p. LOAD FRAMING HARDWARE.

MES WAITING    0:53:16 q. MAIN PROCESSOR RESPONDS WITH MESSAGE
    DETAILS. MAIN PROCESSOR ALSO INITIATES
    TERRESTRIAL CALL CONNECTION SETS IDLE
    WAIT TIMER OF 130 SECONDS TO ASSURE
    MES RECEIVES ALL PACKETS AND CAN RETRY AS
    NEEDED IF ONE IS MISSED.                     0:54:00 r. INITIATE FRAME 6 TRANSMISSION.    16. COMPLETE FRAME 5
    (NOTE, CALL CLEAR NOT IN THIS        READ.                0:56.16          7
    FRAME)

s. SET UP CLEAR TDM CLEAR RESPONSE TO
    LET THE MOBILE KNOW THE MESSAGE WAS
    RECEIVED IN FULL.

t. INITIATE FRAME 7 TRANSMISSION.    17. COMPLETE FRAME 6
                                            READ.                1:04.80          8 u. INITIATE FRAME 8 TRANSMISSION.    18. COMPLETE FRAME 7
                                            READ.                1:13.44          9

19. MES SEAS CALL CLEAR
                                                   AND KNOWS CALL IS
                                                   HELD BY LES.

20. DTE OPERATOR INFORMED
                                                   OF SUCCESSFUL SATELLITE
                                                   TRANSMISSION.

v. INITIATE FRAME 9 TRANSMISSION.    21. COMPLETE FRAME 8
                                            READ.                1:22.08         10 w. MAIN PROCESSORS CONTINUES      22. DTE INFORMS OPERATOR
    TO WAIT ON 2 MINUTE TIMER.         OF CALL COMPLETION.

x. INITIATE FRAME 10 TRANSMISSION.   23. COMPLETE FRAME 9
                                              READ.                1:30.72         11 y. INITIATE FRAME 11 TRANSMISSION.   24. COMPLETE FRAME 10
                                              READ.                1:39.36         12 z. INITIATE FRAME 12 TRANSMISSION.   25. COMPLETE FRAME 11
                                              READ.                1:48.00         13 aa. INITIATE FRAME 13 TRANSMISSION.  26. COMPLETE FRAME 12
                                              READ.                1:56.64         14

FIG. 13c

| | | | |
|---|---|---|---|
| ab. INITIATE FRAME 14 TRANSMISSION. | 27. COMPLETE FRAME 13 READ. | 2:05.28 | 15 |
| ac. INITIATE FRAME 15 TRANSMISSION. | 28. COMPLETE FRAME 14 READ. | 2:13.92 | 16 |
| ad. INITIATE FRAME 16 TRANSMISSION. | 29. COMPLETE FRAME 15 READ. | 2:22.56 | 17 |
| ae. INITIATE FRAME 17 TRANSMISSION. | 30. COMPLETE FRAME 16 READ. | 2:31.20 | 18 |
| af. INITIATE FRAME 18 TRANSMISSION. | 31. COMPLETE FRAME 17 READ. | 2:39.84 | 19 |
| ag. INITIATE FRAME 19 TRANSMISSION. | 32. COMPLETE FRAME 18 READ. | 2:48.48 | 20 |
| ah. INITIATE FRAME 20 TRANSMISSION. | 33. COMPLETE FRAME 19 READ. | 2:57.12 | 21 |
| ai. WAIT TIMER NOW COMPLETE SO THE MAIN PROCESSOR CAN FINALLY SET THE MOBILE TO IDLE AND NOW ALLOW NEW CALLS TO THE MOBILE TO BEGIN. CALL COMPLETE IN LES. | | 3:04:00 | |
| aj. INITIATE FRAME 21 TRANSMISSION. | 34. COMPLETE FRAME 19 READ. | 3:05.76 | 21 |

FIG. 13d

| LES ACTION | MES ACTION | TIME ELAPSED | RELATIVE FRAME |
|---|---|---|---|
| | MES WAITS ON TDM | | |
| a. TERRESTRIAL SYSTEM HAS CALL DATA READY. | | 0:00.00 | 0 |
| b. LES CONNECTS LOGICAL CALL TO TERRESTRIAL USER. | | 0:02.00 | |
| c. LES VERIFIES USER AND ACCEPTS MESSAGE. | | 0:04.00 | |
| d. LES LOADS FRAMING HARDWARE | | 0:05.64 | |
| e. LES LOGS MESSAGE, SENDS MESSAGE REFERENCE TO USER, CLEARS CONNECTION. | | 0:06:00 | |
| f. LES SETS MOBILE DATABASE ENTRY TO BUSY AND FORWARDS CALL ANNOUNCEMENT TO THE FRONT END PROCESSOR (FEP) FOR TDM TRANSMISSION. | | 0:08.00 | |
| g. INITIATE FRAME 0 TRANSMISSION (ANNOUNCEMENT MISSED THIS FRAME) | 1. COMPLETE FRAME -1 READ | 0:08.64 | 1 |
| h. INCLUDE ANNOUNCEMENT IN THIS TDM FRAME FOR TRANSMISSION. | | | |
| i. INITIATE FRAME 1 TRANSMISSION. | 2. COMPLETE FRAME 0 READ | 0:17.28 | 2 |
| j. INITIATE FRAME 2 TRANSMISSION. | 3. COMPLETE FRAME 1 READ | 0:25.92 | 3 |
| | 4. ANNOUNCEMENT DECODED. MES DETERMINES THAT NO TDM TUNING IS NEEDED. | | |
| | 5. PREPARE ASSIGNMENT RESPONSE PACKET. | | |

FIG. 14a k. INITIATE FRAME 3 TRANSMISSION.

6. COMPLETE FRAME 2 READ.    0:34.56    4

7. BASED ON SIGNALING CHANNEL DESCRIPTORS PICK A CHANNEL AND A BURST SLOT.

8. TRANSMIT ASSIGNMENT RESPONSE ON SIGNALING CHANNEL THEN TUNE TO THE TDM CHANNEL.    0:38.88 l. RECEIVED AT LES

MES WAITING    0:39:50 m. DECODE BURST REQUEST AND FORWARD TO MAIN PROCESSOR. MAIN PROCESSOR WILL SET MOBILE TO BUSY. STATUS BIT FOR THIS BURST MUST BE SET IN THIRD FRAME SIGNAL DESCRIPTORS.

n. INITIATE FRAME 4 TRANSMISSION.

9. COMPLETE FRAME 3 READ.    0:43.20    5 o. MAIN PROCESSOR SENDS FULL MESSAGE TO FRONT END TO BE BROKEN INTO PACKETS FOR TRANSMISSION.

p. FRONT END SETS THE SIGNALING CHANNEL DESCRIPTOR RELATIVE TO LAST FRAME'S SIGNALING CHANNEL BURST.

q. INITIATE FRAME 5 TRANSMISSION.

10. COMPLETE FRAME 4 READ.    0:51.84    6 r. FRONT END CONVERTS MESSAGE INTO PACKETS FOR THIS TDM FRAME. IF NO OTHER CALLS ARE INTERLEAVED ON THIS FRAME, A 300 CHARACTER MESSAGE CAN BE SENT IN ONE FRAME.

s. FRONT END SENDS AN ACK REQUEST PACKET FOR MESSAGE. (IT CAN GO IN THE SAME FRAME AS THE MESSAGE IF THERE IS SPACE AVAILABLE.)

t. INITIATE FRAME 6 TRANSMISSION.

11. COMPLETE FRAME 5 READ.    1:00.48    7

12. MES DECODES SIGNALING CHANNEL DESCRIPTOR TO VERIFY THAT THE ASSIGNMENT RESPONSE WAS RECEIVED.

13. PROTOCOL CORRECT SO MES BEGINS TO LOOK FOR A MESSAGE ON THE TDM.

FIG. 14b

| | | | |
|---|---|---|---|
| u. INITIATE FRAME 7 TRANSMISSION. | 14. COMPLETE FRAME 6 READ. | 1:09.12 | 8 |
| | 15. MES READ MESSAGE FROM THE LES IN THIS FRAME. | | |
| | 16. MES READS MESSAGE ACKNOWLEDGMENT REQUEST IN THIS FRAME. | | |
| v. INITIATE FRAME 8 TRANSMISSION. | 17. COMPLETE FRAME 7 READ. | 1:17.76 | 9 |
| | 18. EARLIEST FRAME FOR ACKNOWLEDGMENT RESPONSE PACKET TO BE SENT. TRANSMIT ACKNOWLEDGMENT RESPONSE ON SIGNALING CHANNEL THEN TUNE TO THE TDM CHANNEL. | | |
| w. RECEIVED AT LES | MES WAITING | 1:25.16 | |
| x. DECODE BURST REQUEST AND FORWARD TO MAIN PROCESSOR. MAIN PROCESSOR WILL INITIATE A CLEAR MES TRANSACTION AND FLAG CALL AS COMPLETED. MAIN PROCESSOR WILL ALSO SET 130 SECOND IDLE WAIT TIMER TO ASSURE THAT MES CAN REQUEST ANY REPEAT PACKET TRANSMISSIONS NEEDED. | | 1:26.00 | |
| y. INITIATE FRAME 9 TRANSMISSION. | 19. COMPLETE FRAME 8 READ. | 1:26.40 | 10 |
| z. SEND LOGICAL CHANNEL CLEAR RESPONSE IN THIS TDM FRAME (ASSUMES THAT THERE ARE NO OTHER CALLS FOR THIS MES TO CAUSE ACK RESPONSE AND FOLLOW ON CALLS.) | | | |
| aa. INITIATE FRAME 10 TRANSMISSION. | 20. COMPLETE FRAME 9 READ. | 1:35.04 | 11 |
| ab. INITIATE FRAME 11 TRANSMISSION. | 21. COMPLETE FRAME 10 READ. | 1:43.68 | 12 |
| | 22. MES SEES CALL CLEAR PACKET AND KNOWS THE CALL IS HELD IN THE LES. | | |

FIG. 14c

| | | | |
|---|---|---|---|
| | 23. DTE OPERATOR INFORMED OF SUCCESSFUL SATELLITE TRANSMISSION. | | |
| ac. INITIATE FRAME 12 TRANSMISSION. | 24. COMPLETE FRAME 11 READ. | 1:52.32 | 13 |
| ad. MAIN PROCESSORS CONTINUES TO WAIT ON 2 MINUTE TIMER. | 25. DTE INFORMS OPERATOR OF CALL COMPLETION. | | |
| ae. INITIATE FRAME 13 TRANSMISSION. | 26. COMPLETE FRAME 12 READ. | 2:00.96 | 14 |
| af. INITIATE FRAME 14 TRANSMISSION. | 27. COMPLETE FRAME 13 READ. | 2:09.60 | 15 |
| ag. INITIATE FRAME 15 TRANSMISSION. | 28. COMPLETE FRAME 14 READ. | 2:18.24 | 16 |
| ah. INITIATE FRAME 16 TRANSMISSION. | 29. COMPLETE FRAME 15 READ. | 2:26.88 | 17 |
| ai. INITIATE FRAME 17 TRANSMISSION. | 30. COMPLETE FRAME 16 READ. | 2:35.52 | 18 |
| ai. INITIATE FRAME 18 TRANSMISSION. | 31. COMPLETE FRAME 17 READ. | 2:44.16 | 19 |
| aj. INITIATE FRAME 19 TRANSMISSION. | 32. COMPLETE FRAME 18 READ. | 2:52.80 | 20 |
| ak. INITIATE FRAME 20 TRANSMISSION. | 33. COMPLETE FRAME 19 READ. | 3:01.44 | 21 |
| al. INITIATE FRAME 21 TRANSMISSION. | 34. COMPLETE FRAME 20 READ. | 3:10.08 | 22 |
| am. INITIATE FRAME 22 TRANSMISSION. | 35. COMPLETE FRAME 21 READ. | 3:18.72 | 23 |
| an. INITIATE FRAME 23 TRANSMISSION. | 36. COMPLETE FRAME 22 READ. | 3:27.36 | 24 |
| ao. WAIT TIMER NOW COMPLETE SO THE MAIN PROCESSOR CAN FINALLY SET THE MOBILE TO IDLE AND NOW ALLOW NEW CALLS TO THE | | | |

FIG. 14d

MOBILE TO BEGIN. CALL COMPLETE IN THE LES.

ap- INITIATE FRAME 24 TRANSMISSION.        37. COMPLETE FRAME 23        3:36.00        25
                                               READ.

FIG. 14e

| MESSAGE STEP - UTILIZATION | 0% | 10% | 20% | 30% | 40% | 50% | 60% | 70% | 80% |
|---|---|---|---|---|---|---|---|---|---|
| DTE - MES REQUEST SUBMISSION | 2.0 | 2.0 | 2.0 | 2.0 | 2.0 | 2.0 | 2.0 | 2.0 | 2.0 |
| START OF FRAME DELAY | 4.3 | 4.3 | 4.3 | 4.3 | 4.3 | 4.3 | 4.3 | 4.3 | 4.3 |
| SINGLE PACKET DATA REPORT SEND | 8.6 | 8.6 | 8.6 | 8.6 | 8.6 | 8.6 | 8.6 | 8.6 | 8.6 |
| LES LOG OF DATA REPORT | 2.0* | 2.2* | 2.4* | 2.7* | 2.9* | 3.2* | 3.5* | 3.9* | 4.3* |
| TOTAL TRANSACTION REQUEST TIME | 0:15 | 0:15 | 0:15 | 0:15 | 0:15 | 0:15 | 0:15 | 0:15 | 0:15 |
| EXTERNAL MACHINE DELIVERY | 1.0 | 1.1 | 1.2 | 1.3 | 1.5 | 1.6 | 1.8 | 1.9 | 2.1 |
| TERRESTRIAL MESSAGE PROCESSING | 5.0 | 5.5 | 6.1 | 6.7 | 7.3 | 8.1 | 8.9 | 9.7 | 10.7 |
| TERRESTRIAL INPUT, LOG, ROUTE | 3.0 | 3.3 | 3.6 | 4.0 | 4.4 | 4.8 | 5.3 | 5.8 | 6.4 |
| TERRESTRIAL PROCESSING TIME | 0:09 | 0:10 | 0:11 | 0:12 | 0:13 | 0:14 | 0:16 | 0:18 | 0:19 |
| TOTAL REQUEST AND TERR. TIME | 0:24 | 0:25 | 0:26 | 0:27 | 0:28 | 0:29 | 0:31 | 0:32 | 0:34 |

* TIME OVERLAPS WITH ANOTHER TIMER.

FIG. 15

| MESSAGE STEP - UTILIZATION | 0% | 10% | 20% | 30% | 40% | 50% | 60% | 70% | 80% |
|---|---|---|---|---|---|---|---|---|---|
| DTE - MES REQUEST SUBMISSION | 2.0 | 2.0 | 2.0 | 2.0 | 2.0 | 2.0 | 2.0 | 2.0 | 2.0 |
| START OF FRAME DELAY | 4.3 | 4.3 | 4.3 | 4.3 | 4.3 | 4.3 | 4.3 | 4.3 | 4.3 |
| SINGLE PACKET DATA REPORT SEND | 8.6 | 8.6 | 8.6 | 8.6 | 8.6 | 8.6 | 8.6 | 8.6 | 8.6 |
| LES LOG OF DATA REPORT | 2.0* | 2.2* | 2.4* | 2.7* | 2.9* | 3.2* | 3.5* | 3.9* | 4.3* |
| TOTAL TRANSACTION REQUEST TIME | 0:15 | 0:15 | 0:15 | 0:15 | 0:15 | 0:15 | 0:15 | 0:15 | 0:15 |
| LES ACKNOWLEDGMENT PROCESSING | 2.0* | 2.2* | 2.4* | 2.7* | 2.9* | 3.2* | 3.5* | 3.9* | 4.3* |
| ACKNOWLEDGMENT TRANSMISSION | 23.8 | 24.7 | 25.9 | 27.5 | 29.5 | 32.4 | 36.7 | 43.9 | 58.3 |
| TOTAL ACKNOWLEDGMENT TIME | 0:24 | 0:25 | 0:26 | 0:27 | 0:30 | 0:32 | 0:37 | 0:44 | 0:58 |
| EXTERNAL MACHINE DELIVERY | 1.0* | 1.1* | 1.2* | 1.3* | 1.5* | 1.6* | 1.8* | 1.9* | 2.1* |
| TERRESTRIAL MESSAGE PROCESSING | 5.0* | 5.5* | 6.1* | 6.7* | 7.3* | 8.1* | 8.9* | 9.7* | 10.7* |
| TERRESTRIAL INPUT, LOG, ROUTE | 3.0* | 3.3* | 3.6* | 4.0* | 4.4* | 4.8* | 5.3* | 5.8* | 6.4* |
| TERRESTRIAL PROCESSING TIME | 0:09 | 0:10 | 0:11 | 0:12 | 0:13 | 0:14 | 0:16 | 0:18 | 0:19 |
| TOTAL INPUT, ACK & TERR TIME | 0:39 | 0:40 | 0:41 | 0:42 | 0:44 | 0:47 | 0:52 | 0:59 | 1:13 |

* TIME OVERLAPS WITH ANOTHER TIMER.

FIG. 16

| MESSAGE STEP | UTILIZATION | | | | | | | | |
|---|---|---|---|---|---|---|---|---|---|
| | 0% | 10% | 20% | 30% | 40% | 50% | 60% | 70% | 80% |
| DTE - MES REQUEST SUBMISSION | 2.0 | 2.0 | 2.0 | 2.0 | 2.0 | 2.0 | 2.0 | 2.0 | 2.0 |
| START OF FRAME DELAY | 4.3 | 4.3 | 4.3 | 4.3 | 4.3 | 4.3 | 4.3 | 4.3 | 4.3 |
| SINGLE PACKET DATA REPORT SEND | 0.0 | 0.0 | 0.0 | 0.0 | 0.0 | 0.0 | 0.0 | 0.0 | 0.0 |
| LES SENDS ANNOUNCEMENT | 23.8* | 24.7* | 25.9* | 27.5* | 29.5* | 32.4* | 36.7* | 43.9* | 58.3* |
| SUBTOTAL ANNOUNCEMENT TIMER | 38.7 | 51.1 | 66.7 | 86.7 | 113.3 | 150.6 | 206.5 | 299.7 | 486.1 |
| LES LOG OF DATA REPORT | 2.0* | 2.2* | 2.4* | 2.7* | 2.9* | 3.2* | 3.5* | 3.9* | 4.3* |
| TOTAL TRANSACTION REQUEST TIME | 0:15 | 0:26 | 0:41 | 0:59 | 1:24 | 1:58 | 2:50 | 4:16 | 7:08 |
| EXTERNAL MACHINE DELIVERY | 1.0 | 1.1 | 1.2 | 1.3 | 1.5 | 1.6 | 1.8 | 1.9 | 2.1 |
| TERRESTRIAL MESSAGE PROCESSING | 5.0 | 5.5 | 6.1 | 6.7 | 7.3 | 8.1 | 8.9 | 9.7 | 10.7 |
| TERRESTRIAL PROCESSING TIME | 0:06 | 0:07 | 0:07 | 0:08 | 0:09 | 0:10 | 0:11 | 0:12 | 0:13 |
| TERRESTRIAL MESSAGE CAPTURE | 3.0 | 3.3 | 3.6 | 4.0 | 4.4 | 4.8 | 5.3 | 5.8 | 6.4 |
| INITIATE MES MESSAGE FROM S&F | 2.0 | 2.2 | 2.4 | 2.7 | 2.9 | 3.2 | 3.5 | 3.9 | 4.3 |
| START OF FRAME DELAY | 4.3 | 4.3 | 4.3 | 4.3 | 4.3 | 4.3 | 4.3 | 4.3 | 4.3 |
| MES SENDS ASSIGNMENT RESPONSE | 8.6 | 20.1 | 34.4 | 52.9 | 77.4 | 111.8 | 163.4 | 249.4 | 421.4 |
| LES BURST ACKNOWLEDGMENT | 8.6 | 8.6 | 8.6 | 8.6 | 8.6 | 8.6 | 8.6 | 8.6 | 8.6 |
| LES SENDS MESSAGE | 0.0* | 0.0* | 0.0* | 3.7* | 5.8* | 8.6* | 13.0* | 17.3* | 25.9* |
| LES SENDS ACKNOWLEDGMENT RQST | 0.0* | 1.0 | 2.2 | 8.6 | 8.6 | 8.6 | 17.3 | 20.2 | 34.6 |
| MES DECODES ENCODED MESSAGE | 8.6 | 8.6 | 8.6 | 8.6 | 8.6 | 8.6 | 8.6 | 8.6 | 8.6 |
| MES-DTE MESSAGE DELIVERY | 2.0 | 2.0 | 2.0 | 2.0 | 2.0 | 2.0 | 2.0 | 2.0 | 2.0 |
| SUBTOTAL : LES - MES MSG DELIVERY | 0:37 | 0:50 | 1:06 | 1:32 | 1:57 | 2:32 | 3:33 | 5:03 | 8:10 |
| TOTAL END TO END CALL TIME | 0:58 | 1:23 | 1:54 | 2:39 | 3:30 | 4:40 | 6:34 | 9:30 | 15:31 |

* TIME OVERLAPS WITH ANOTHER TIMER.

FIG. 17

| MESSAGE STEP - UTILIZATION | 0% | 10% | 20% | 30% | 40% | 50% | 60% | 70% | 80% |
|---|---|---|---|---|---|---|---|---|---|
| TRANSACTION REQUEST PROCESSING | | | | | | | | | |
| DTE-MES REQUEST SUBMISSION | 2.0 | 2.0 | 2.0 | 2.0 | 2.0 | 2.0 | 2.0 | 2.0 | 2.0 |
| START OF FRAME DELAY | 4.3 | 4.3 | 4.3 | 4.3 | 4.3 | 4.3 | 4.3 | 4.3 | 4.3 |
| SINGLE PACKET DATA REPORT SEND | 8.6 | 8.6 | 8.6 | 8.6 | 8.6 | 8.6 | 8.6 | 8.6 | 8.6 |
| LES LOG OF DATA REPORT | 2.0* | 2.2* | 2.4* | 2.7* | 2.9* | 3.2* | 3.5* | 3.9* | 4.3* |
| TOTAL TRANSACTION REQUEST TIME | 0:15 | 0:15 | 0:15 | 0:15 | 0:15 | 0:15 | 0:15 | 0:15 | 0:15 |
| TERRESTRIAL PROCESSING | | | | | | | | | |
| EXTERNAL MACHINE DELIVERY | 1.0 | 1.1 | 1.2 | 1.3 | 1.5 | 1.6 | 1.8 | 1.9 | 2.1 |
| TERRESTRIAL MESSAGE PROCESSING | 5.0 | 5.5 | 6.1 | 6.7 | 7.3 | 8.1 | 8.9 | 9.7 | 10.7 |
| TERRESTRIAL PROCESSING TIME | 0:06 | 0:07 | 0:07 | 0:08 | 0:09 | 0:10 | 0:11 | 0:12 | 0:13 |
| EGC OR POLL MESSAGE RESPONSE | | | | | | | | | |
| TERRESTRIAL MESSAGE CAPTURE | 3.0 | 3.3 | 3.6 | 4.0 | 4.4 | 4.8 | 5.3 | 5.8 | 6.4 |
| INITIATE MES MESSAGE FROM S&F | 2.0 | 2.2 | 2.4 | 2.7 | 2.9 | 3.2 | 3.5 | 3.9 | 4.3 |
| START OF FRAME DELAY | 4.3 | 4.3 | 4.3 | 4.3 | 4.3 | 4.3 | 4.3 | 4.3 | 4.3 |
| LES SENDS 2 PACKET EGC ON TDM | 8.6 | 8.6 | 8.6 | 8.6 | 8.6 | 8.6 | 17.3 | 17.3 | 25.9 |
| TOTAL RESPONSE DELIVERY TIME | 0:18 | 0:18 | 0:19 | 0:20 | 0:20 | 0:21 | 0:30 | 0:31 | 0:41 |
| TOTAL END TO END CALL TIME | 0:39 | 0:40 | 0:41 | 0:43 | 0:44 | 0:46 | 0:56 | 0:58 | 1:09 |

* TIME OVERLAPS WITH ANOTHER TIMER.

FIG. 18

COMMUNICATION PROTOCOL FOR SATELLITE DATA PROCESSING

RELATED APPLICATIONS

This application claims priority from U.S. provisional application filed Jun. 15, 1995, serial No. 60/000,226 entitled "Improved Communications Protocol for Satellite Messaging," the details of which are incorporated herein by reference.

TECHNICAL FIELD

The present invention relates generally to an improved communication protocol for satellite messaging, and more particularly, to improvements to data protocols, such as the Standard-C communication protocol, for sending and receiving data messages using a satellite.

BACKGROUND ART

One example of a currently successful and operational satellite based data service is INMARSAT's Standard-C Communications System. The following description of the Standard-C System has been reprinted, with permission, from "INMARSAT Standard-C Communications System" by Kevin Phillips, IEEE International Conference on Communications '88: Digital Technology—Spanning the Universe, Jun. 12–15, 1988, pp. 1117–1122 (Available from IEEE Service Cent (cat. #CH2538-7/88)) ©1988 IEEE.

FIG. 1 shows the major elements of the Standard-C system architecture which consists of coast earth stations (CESs), a network coordination station (NCS) in each ocean region and ship earth stations (SESs). Each CES serves as a gateway between the terrestrial network and the INMARSAT Standard-C communications system. The types of interface provided at the CES are decided by the coast earth station operator, however, Telex, EGC message processing and distress message handling are mandatory.

All SESs that are active in an ocean region are required to register with the NCS and a copy of the list of all registered SESs is held at each CES and used as a basis for accepting or rejecting shore originating calls. In addition, the location of every registered SES is held at the CES so that calls received at the CES for a SES that is in another ocean region may be redirected and the call not lost. CESs may operate their traffic channels in a demand assigned mode. If traffic and satellite power considerations call for this mode of operation to be used, the NCS allocates on a need basis, CES TDM channels, SES Signalling Channels and SES Message Channels.

Three NCSs are provided in the Standard-C system, one in each ocean region, managing central resources such as traffic channels when demand assigned operation is used and coordinating signalling and control traffic. Each NCS transmits a NCS Common Channel which is received by all SESs when they are not involved in message transfer. The common Channel is used to announce shore-to-ship messages waiting at CESS, for broadcasting EGC messages and at various stages for protocol signalling packet transfer.

The NCS is responsible for synchronizing access to SESs by CESs and maintains a database containing the state of each commissioned SES including an indication whether a particular SES is currently engaged in message transfer with a CES. Statistics concerning every processed call are transmitted by CESs to the NCS. This and other data held by the NCS is used for network management and monitoring purposes. A SES is the mobile earth station used by mobile subscribers. Below is a summary of some of the primary characteristics of the standard-C SES:

| | | |
|---|---|---|
| (a) | G/T (5° elevation): | −23 dB/K |
| (b) | minimum EIRP: | +12 dBW |
| (c) | modulation: | BPSK |
| (d) | data rate | 600 bit/s |
| | i) shore-to-ship: | |
| | ii) ship-to-shore | |
| | current satellites: | 300 bits/s |
| | future satellites: | 600 bit/s |
| (e) | operational bandwidth | |
| | Transmit: | 1626.5–1646.5 MHz |
| | Receive: | 1530.0–1545.0 MHz |
| (f) | tuning increment: | 5 kHz |

The system allows the use of very low G/T receivers at the ship earth station (SES). Standard-C uses all digital transmission techniques for both signalling and message data. SES equipment may therefore take advantage of the low cost trend of digital technology. Standard-C SESs do not require the use of a dedicated receiver for receiving signalling information.

FIG. 2 shows a block diagram of the SES. It consists of a DCE (data circuit terminating equipment) providing the interface to the satellite network, and a DTE (data terminal equipment, for example a personal computer) which provides the user interface. For ship-to-shore message transfer, a message is formatted in the DTE and then transferred to the DCE for transmission. In the shore-to-ship direction, the DCE receives the complete message from the radio channel before passing it to the DTE for the attention of the user. The SES may be equipped for reception of Enhanced Group Calls (EGC) or a separate Receive Only Terminal for EGC reception may be used. When idle, every SES tunes to and receives a TDM channel transmitted by the NCS; the NCS Common Channel. The channel is used to transmit announcements to SESs that shore-to-ship calls are ready at a CES for transmission to the SES. Enhanced Group Calls are also transmitted on this channel.

The requirement for a very low G/T message based mobile earth station, resulted in the following major design features:

(a) the use of a very low gain antenna requires robust modulation and coding scheme had to be employed to alleviate the effects of multipath propagation. Rate 1/2, constraint length 7 convolutional coding and frame interleaving are used to ensure that the packet error probability is met for the design link budget;

(b) shore-to-ship TDM channels require a relatively high satellite EIRP of 21 dBW and the capability of operating in a demand assigned mode is provided to save satellite power if network conditions require it;

(c) the packet data transmission medium is completely transparent to the type of data to be passed over the traffic channels;

(d) the need to cater for future new services and applications requires considerable flexibility to be provided in the design of the access control and signalling protocols;

(e) operation in a spot beam environment is provided by the ship earth station automatically identifying the appropriate satellite spot beam. This ensures that the Standard-C system will be compatible with future generations of satellites which may use spot beams;

(f) the store-and-forward nature of Standard-C allows the system to make use of off-peak satellite capacity.

The initial services to be offered by Standard-C CESs to users will be:

(i) access to the International Telex network;
(ii) a wide range of Enhanced Group Call Services; and
(iii) access to rescue Coordination Centers (RCCs).

Additional optional services are available within the system and may be offered by CESs. These services include access to electronic mail and message handling services (X.400 for example), individual, group and area directed polling, and a data reporting service. The polling and data reporting services are primarily aimed at providing a service to remotely operated and land mobile terminals.

A comprehensive message addressing system has been adopted so that access to various terrestrial data networks and a variety of specialized services can readily be provided. A number of different types of channels are used in the Standard-C system. In addition to those channels required for shore-to-ship and ship-to-shore communications and signalling via the satellite, there are also inter-station links on the shore side for network monitoring and control purposes.

The NCS common channel is a TDM carrier transmitted continuously by the NCS to all SESs in the ocean region. SESs tune to the NCS common channel when they are idle. The channel operates at 1200 symbols/s with a fixed length frame of 8.64 s. The information is scrambled, half rate convolutionally encoded and interleaved on a frame by frame basis. The data rate is therefore 600 bit/s and all message and signalling information is conveyed in packets. In each frame, 639 bytes are available for packets. The first packet in every frame is always the bulletin board packet. This packet is followed by a number of signalling channel descriptor packets used to transfer information concerning SES usage of the signalling channels associated with that TDM.

The CES TDM channel is used for the forward link when the CES is communicating with a SES. Its structure is identical to that of the NCS common channel described above, and is used for carrying call set-up signalling, shore-to-ship message, acknowledgements, and call clear down signalling. A CES may operate more than one CES TDM channel and each channel may be demand assigned by the NCS.

The SES signalling channels associated with each forward TDM channel are received both by the NCS and the CES mainly for signalling from the SES to the shore stations. Access by SESs to a SES signalling channel is by means of a slotted ALOHA scheme with the addition of a mechanism for reserving slots in the channel. More than one SES transmitting in the same slot results in a 'collision' as seen at the receiving CES. In order to minimize the time elapsed before an SES is aware that its transmission was not successful, the signalling channel descriptor packet in the forward TDM indicates the status of all slots associated with that signalling channel (i.e., reserved or unreserved collision or available).

Slot timing is based on the TDM frame of 8.64 s, as shown in FIG. 3. Each frame time is divided into 14 slots for current generation satellites and 28 slots for future generation satellites. Information transmitted in a slot is scrambled and half rate convolutionally encoded. The transmission rate is 600 symbol/s for current generation satellites and 1200 symbol/s for future generation satellites. Each slot can carry a burst of 120 information bits. The bursts transmitted in the slots do not have dedicated acquisition preambles. This feature helps to maximize the signalling channel capacity.

SES message channels are used by SESs to transmit their messages to the chosen CES. A SES signalling channel is used during the call setup phase of the transfer, but the message itself is sent on a SES message channel assigned by the CES. Access to the channel by SESs is on a TDMA basis. The destination CES instructs each SES waiting to transmit the time at which it may start transmitting. Once assigned a start time, a SES will transmit all of its message without interruption.

The information to be sent is formatted into fixed sized packets and placed into frames. More than one frame size is available although the size will be fixed for a particular transmission. A frame may contain between 1 and 5 packets depending on its size. Each packet in turn contains 127 bytes of information. The frames are scrambled, half-rate convolutionally encoded and interleaved. Before transmission, an acquisition preamble is added. The transmission rate is 600 symbol/s for current generation satellites and 1200 symbol/s for future generation satellites.

CESs offering Standard-C services have bidirectional links with the NCS of the same region. This link is used to transfer announcements and EGC messages from a CES to the NCS for the subsequent transmission on the NCS common channel. In addition, signalling is exchanged on this link to ensure synchronization of access to SESs and for the allocation of CES TDM channels by the NCS. The channel uses the CCITT X.25 link access procedures. The transmission rate is 1200 bit/s and, no error correction techniques are employed other than those included in X.25.

Each NCS is linked to the other NCSs by an inter-region link channel. This channel is used primarily to update other regions of any registration activity by SESs in a particular region. This link uses automatic dial-up voice band data channels over the PSTN. The link layer procedures of X.25 are used for interchange of information. These links operate at 600 bit/s, using CCITT V22 full duplex modems.

The minimum performance of conventional analogue or continuous data links is usually defined for a specific threshold value of C/No (at the receiver demodulator) and the link availability is defined as the percentage of time that this threshold value is likely to be exceeded. Standard-C is a packet data communication system, and makes use of ARQ techniques to re-transmit errored packets. For this reason variations of C/No do not affect the quality of the received message but only the number of re-transmissions required to ensure that the complete message can be reconstructed error free at the receiver.

In order to minimize the loading on the satellite, the total energy per message transfer transaction must be minimized. In the forward link, which in terms of satellite resources is the more critical, reducing the transmit power will degrade the C/No which in turn will lead to increased packet errors. More repeat packets will be required and, as a result, satellite capacity utilization increases due to the extra total message energy required to transmit the repeat packets. Additionally the time required to complete the message transfer increases. For optimum satellite capacity utilization the satellite power should be set at such a level that the total message energy is minimized. In practice one forward TDM may serve many SESs and the power may be set to ensure a distribution of packet error rate across the SES population.

Half-rate convolutional encoding (constraint length k=7) is used on all channels to provide Forward Error Correction. A relatively short constraint length allows the use of maximum likelihood decoding techniques (such as the Viterbi algorithm) which can provide in the region of 5 dB coding gain in an unfaded link. As a baseline for defining performance limits, a Viterbi decoder operates on 3 bit soft decision samples.

A given data bit passing through the encoder is able to influence a group of 14 consecutive symbols and since the fading bandwidth is low compared with the data rate, all 14 symbols could be affected by a fade. For TDM and message channels, encoded symbols are assembled into a block before transmission. They are then transmitted in a different order to that in which they were assembled. The effect of this interleaving process is to spread transmission of the 14 symbols associated with a given data bit over a length of time which is large compared with a fade duration.

Deinterleaving of the encoded symbols at the receiver is used to effectively convert the long duration fades into random noise which the decoder is able to handle since only some of the 14 symbols may be corrupted due to a typical fade. The redundancy built in to the transmitted symbol stream allows reconstruction of the original data.

For the burst mode SE signalling channel, interleaving is not employed because the bursts are too short for it to have any useful effect. Data scrambling is also employed on all the channels. It is needed to ensure adequate symbol transitions for the demodulator clock recovery. Every packet transmitted on any of the Standard-C channels contains a 16 bit checksum field. Following deinterleaving, decoding and descrambling operations, the receiver computes the checksum for each packet in order to determine if the packet has been received in error.

Due to the store and forward nature of Standard-C, message transfer can be considered as three distinct processes:

(a) DTE to DCE at the SES;
(b) SES to CES (via the satellite);
(c) CES to terrestrial network.

Each process can be thought of as a completely independent message transfer process. This allows the maritime satellite portion of the link to be defined as a memory-to-memory transfer between CES and SES.

FIG. 4 is a sequence diagram for a SES originated call to a CES with a permanent TDM channel. To transfer a SES originated message, the SES must tune to the CES that the message is to be transferred to. After synchronizing to the frame of the CES TDM channel, the SES transmits a request message in a random access slot on a SES signalling channel. When the request is processed, the CES will command the SES to tune to a particular SES message channel frequency and transfer the message. Message packets are checked for errors by the CES and any requiring retransmission are advised in the CESs acknowledgement packet. Upon completion of transfer, the SES is released and re-tunes to the NCS common channel. Following delivery of the message to the terrestrial subscriber, the delivery may be confirmed to the ship.

Transfer of shore (terrestrial user) originated calls follows a procedure similar to that of SES origination. The terrestrial subscriber places a call to the desired SES. The call is routed via the terrestrial network to the appropriate CES and this CES then checks for the availability of the required SES within the ocean region. A call announcement is transmitted on the NCS common channel. If the shore originated call is being transferred over an international public switched network, the subscriber may be billed for the entire message transfer at the time the message is accepted into memory at the CES. Hence steps must be taken to ensure the availability of the addressed SES.

The Enhanced Group Call (EGC) service is a message broadcast service within the Standard-C Communications System. EGC messages are sent to Standard-C CESs by shore based Information providers using terrestrial facilities such as Telex. The messages are processed at the CES and forwarded to a NCS for transmission on a NCS common channel. A sophisticated and flexible addressing technique allows the reception of messages from a variety of service providers. Receiver addressing can be performed on the basis of:

1. individual unique ID;
2. group IDs;
3. pre-assigned geographical areas (i.e., NAVAREA); and
4. absolute geographical area, defined in terms of coordinates.

The signal parameters and the receiver performance requirements are identical to those for the receivers of Standard-C SESs.

Additional descriptions of the Standard-C data communication protocols can be found in the following references:

(1) Title: A land mobile satellite data system

Author(s): Kent, J. D. B.

Conference Title: Proceedings of the Second International Mobile Satellite Conference IMSC '90 (JPL Publ. 90-7) p.97–102

Editor(s): Reekie, D. H. M.

Publisher: Jet Propulsion Lab, Pasadena, Calif., USA

Publication Date: 1990 Country of Publication: USA

Country of Publication: Canada (2) Title: A new international position reporting service for maritime and land mobile users Author(s): Ekman, A.

Conference Title: Proceedings of ION GPS-89. Second International Technical Meeting of the Satellite Division of the Institute of Navigation p.133–7

Publisher: Inst. Navigation, Washington, D.C., USA

Publication Date: 1989 Country of Publication: USA (3) Title: Experiment of INMARSAT Standard-C system Author(s): Higuchi, T.; Shinohara, T.

Conference Title: Fourth International Conference on Satellite Systems for Mobile Communications and Navigation (Conf. Publ. No.294) p.47–51

Publisher: IEE, London, UK

Publication Date: 1988 Country of Publication: UK (4) Title: The Standard C communication system Author(s): Teller, N.; Phillips, K.; Paiusco, L.; Howard, C. F.

Conference Title: Fourth International Conference on Satellite Systems for Mobile Communications and Navigation (Conf. Publ. No.294) p.43–46

Publisher: IEE, London, UK

Publication Date: 1988 Country of Publication: UK (5) Title: Standard-C and positioning Author(s): Bell, J. C.

Journal: Navigation. Journal of the Institute of Navigation vol.34, no.2 p.124–39

Publication Date: Summer 1987

(6) Satellite Data Link Research and Development Program Takeda, H.

In FAA, the First Annual International Satellite Surveillance and Communication Symposium p 193–201.

Sponsor: National Aeronautics and Space Administration, Washington, DC. 1991

(7) INMARSAT Standard-C Service

International Maritime Satellite Organization, London (England). Included in Proceedings of an ESA (European Space Agency) Workshop on Land Mobile Services by Satellite, p47–49 June 1986.
(8) Title: Applications of on-board processing to mobile satellite communications systems: The INMARSAT Standard-C example.
Author: Milcz, W.; Vernucci, A.
Conference Title: IEEE Global Telecommunications Conference & Exhibition: Communications for the Information Age—Conference Record
(9) Title: INMARSAT standard-C communications system.
Author: Phillips, Kevin
Conference Title: IEEE International Conference on Communications '88: Digital Technology—Spanning the Universe.
(10) Title: STANDARD-C & POSITIONING.
Author: Bell, J. C.
Conference Title: Institute of Navigation, Proceedings of the National Technical Meeting.
Conference Date: Jan. 20–23, 1987
Source: Publ by Inst of Navigation, Washington, D.C., USA p 138–145, Publication Year: 1987
(11) The land mobile services of Inmarsat
BELL, J.-C.
(Royal Institute of Navigation, Colloquium on Land Navigation and Information Systems, Warwick, England, Sep. 18–20, 1990) Navigation (Paris) vol. 39, July 1991, p. 396–412.
Publication Date: July 1991
Country of Publication: France
(12) Land mobile services of Inmarsat
BELL, J.-C.
(Royal Institute of Navigation, Colloquium on Land Navigation and Information Systems, Warwick, England, Sep. 18–20, 1990) Navigation (Paris) (ISSN 0028-1530), vol. 39, April 1991, p. 268–281.
Publication Date: April 1991
Country of Publication: France
(13) CCITT Recommendation F.127

All of the above articles are hereby incorporated by reference.

Various problems exist using the Standard-C protocol. The problems stem from the following reasons.

Standard-C protocol is not designed for a multiple TDM (time division multiplexed) channel stand-alone ground station based communications network;

Standard-C protocol is based on a global beam satellite;

Standard-C protocol is not designed to be used in connection with land mobile data terminals but was designed only for maritime use; and Standard-C was developed as a message transfer protocol generally based on FIFO (first in, first out) principles.

Accordingly, as will be discussed in detail below, it is desirable to provide a communication protocol that is designed for a multiple TDM (time division multiplexed) channel stand-alone ground station based communications network. It is also desirable to provide a communication protocol that is based on a multiple spot beam satellite.

It is also desirable to provide a communications protocol that is designed to be used in connection with land mobile data terminals. It is also desirable to provide a message transfer protocol that is not based on FIFO (first in, first out) principles, but is based on principles that optimize usage of the satellite resources.

SUMMARY OF THE INVENTION

It is a feature and advantage of the present invention to provide a communication protocol that is designed for a multiple TDM (time division multiplexed) channel stand-alone ground station based communications network.

It is another feature and advantage of the present invention to provide a communication protocol that is based on a multiple spot beam satellite.

It is also a feature and advantage of the present invention to provide a communications protocol that is designed to be used in connection with land mobile data terminals.

It is another feature and advantage of the present invention to provide a message transfer protocol that is not based on FIFO (first in, first out) principles, but is based on principles that optimize usage of the satellite resources.

The present invention is based, in part, on the identification of the problem or need to effectively and efficiently utilize satellite resources in the communication system. It has been determined that an improved communication protocol that does not operate under the standard FIFO process provides unique and unexpected benefits for the satellite communications system. In accordance with the features of the present invention, controls are introduced to maximize satellite resources in the satellite communications network. To accomplish the above, it has been determined that the improved communication protocol is based on maximizing the number of messages that are being concurrently transmitted via the satellite or broadcast station. It has been further determined that an efficient and practical to accomplish this objective is to divide messages of various sizes into smaller packets and transmit packets of different messages substantially concurrently, thereby maximizing the number of messages that are being transmitted.

To achieve these and other features and advantages of the present invention, an improved communication protocol for messaging for a communication system is provided in a mobile satellite system. The communication system includes a communication switching office having a transceiver for receiving/transmitting a message from/to a data terminal using a communication system, and a management system including a central controller receiving/transmitting the message from/to the communication switching office. The central controller is responsive to the message received from the data terminal, and receives data in the message received from the data terminal. The data terminal transmits to the management system on a message channel. The message channel includes multiple messages from multiple data terminals. The management system receives the multiple messages per TDM group or message channel, and allocates message channel bandwidth for each of the multiple messages to the data terminal responsive to the data terminal call request received on the signalling channel. The management system minimizes the store of the message therein and maximizes the forward of the message, providing the capability to minimize the amount of data that must be stored before transmitting the message to the data terminal, while simultaneously maximizing utilization of communication system resources.

In another embodiment of the invention, a communications system includes a radio communications switching office having a transceiver for receiving/transmitting a message from/to a data terminal using the communications switching office. The communications system also includes a terrestrial communications switching office for receiving/transmitting a message from/to a client host processor. The communications system also includes a central controller responsive to the message received from the data terminal, and receiving data in the message received from the data terminal. The data terminal transmits to the communications system on a message channel. There are multiple message channels controlled by the radio communications switching office, each of which will receive multiple messages based on TDMA (time division multiple allocation) to various data terminals. The communications system receives the multiple message requests on the signaling channel and then allocates message bandwidth to the data terminals on the message channels in sequential order. The communications system also sets up logical channel connections through the terrestrial communications switching office to the client host processor. Some of the channels can be allocated to be held open for additional calls for a period of time. When a call from a data terminal arrives to a client with an open channel, the communications system minimizes the store of the message therein and maximizes the forward of the message, providing the capability to minimize the amount of data that must be stored before transmitting the message to the data terminal, while simultaneously maximizing the utilization of the communications system resources.

In another embodiment of the invention, a communication system is provided including a management system. The management system transmits to the data terminal on a Time Division Multiplex (TDM) channel. The TDM channel includes management system signalling, management system messages, and management system acknowledgements. The data terminal is responsively connected to the management system and transmits to the management system on a signalling channel. The signalling channel includes data terminal call requests, and data terminal acknowledgements. The management system receives multiple signalling channels per TDM channel, and the data terminal transmits to the management system on a message channel. The combination of the forward TDM channel and its associated return signal channels and message channels is defined to be a TDM group. The message channel includes multiple messages from multiple data terminals. The management system receives the multiple messages per TDM group or message channel, and allocates message channel bandwidth for each of the multiple messages to the data terminal responsive to the data terminal call request received on the signalling channel.

In another embodiment of the invention, a communication protocol method includes the step of transmitting from the management system to the data terminal on a Time Division Multiplex (TDM) channel. The TDM channel includes management system signalling, management system messages, and management system acknowledgements. The method also includes the step of transmitting from the data terminal to the management system on a signalling channel. The signalling channel includes data terminal call requests, and data terminal acknowledgements. The management system receives multiple signalling channels per TDM channel. The method also includes the step of transmitting from the data terminal to the management system on a message channel. The message channel includes multiple messages from multiple data terminals. The management system receives the multiple messages per TDM channel, and allocates message channel bandwidth for each of the multiple messages to the data terminal responsive to the data terminal call request received on the signalling channel.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 6 is a diagram illustrating the allocation of TDM groups to three FEP pairs;

FIG. 7 is a diagram of a resulting beam pattern as seen by the mobiles;

FIG. 8 shows a typical traffic pattern;

FIGS. 13a–13d are detailed frame timing diagrams for an MES to LES call;

FIGS. 14a–14e are detailed frame timing diagram for an LES to MES call; and FIGS. 15–18 are diagrams illustrating utilization of satellite network resources for various exemplary transactions.

BEST MODE FOR CARRYING OUT THE INVENTION

The present invention provides the capability to minimize the amount of time that data must be stored in the ground station before transmitting to the mobile data terminal, while simultaneously maximizing the use of satellite capacity. This feature allows faster message delivery since less information is stored at the ground station while maximizing satellite usage.

The following is a description of the design for the implementation of a spot beam based satellite working with multiple TDMs for the operation of the Land Earth Station (LES). The spot area number will be organized as in FIG. 5 to match the footprint of the satellite. Each spot area has a primary TDM frequency and possibly other associated TDMs as detailed later herein. The Primary TDM that illuminates the LES site (e.g., the Primary TDM in the Eastern Spot Area) will be received at the LES and used to derive the satellite loop delay for all TDMs in the system. Mobile data terminals are programmed with the frequencies of the Primary TDMs for all spot areas. The mobile logs into any of these TDMs that has a strong enough signal. The LES notes the [Spot ID] associated with the TDM and uses this to route calls to the mobile. The corner stone of this solution is scalability. As traffic load increases in any given spot area the system can be expanded to accommodate this growth.

The building block of the satellite interface is the TDM group of which there are two possible types:

Joint Common and LES TDM (Common TDM), and

LES TDM.

For the mode of operation, the following defines the possible uses of these TDM types. Significantly, the NCS TDM types, as specified in the conventional Standard-C system is not used in this LES system.

Joint Common and LES TDM

All From-Mobile calls are handled by this TDM type. A mobile must be logged into a common TDM to process calls. Calls to mobile will have the [ANNOUNCEMENT] packet sent over the common TDM channel and this will indicate the TDM frequency that is to be used to complete the call. This may be an LES TDM if one is available or else the call may continue on the common TDM. The following packets are always sent on the common TDM channel.
[LOGIN ACK]
[LOGOUT ACK]
[Group, Area and Individual POLL]
[Group, Area and Individual EGC]
[Message Status]
[Confirmation]

The Common TDM that is loaded into a mobile's eprom is its Primary TDM.

LES TDM

For the LES operation with Multiple TDMs, the LES TDM type is utilized for outbound messaging only. An outbound call is passed from the Common TDM to the LES TDM using the TDM field in the [ANNOUNCEMENT] packet. The MES must tune to the new frequency for the duration of the LES to mobile call. The LES TDMs have no message channels.

Figure 1:
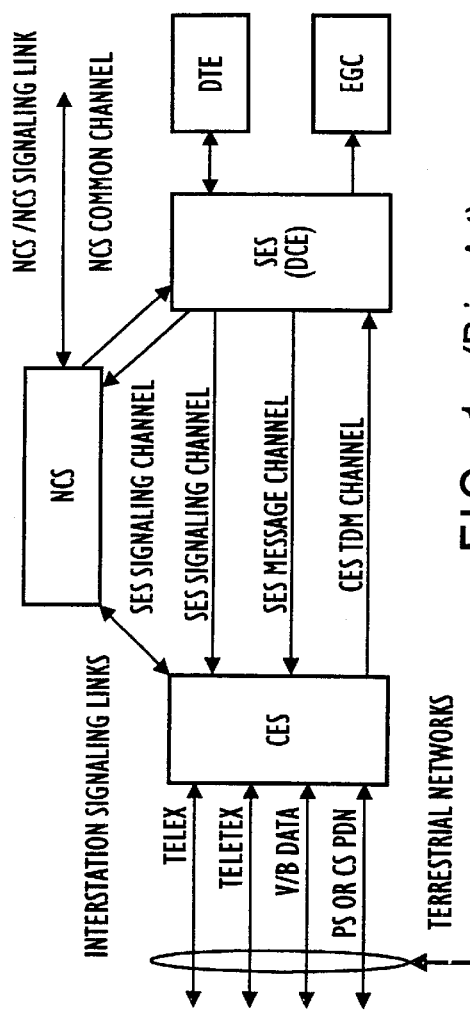
FIG. 1 is a diagram of a prior art satellite communications system.
Figure 2:
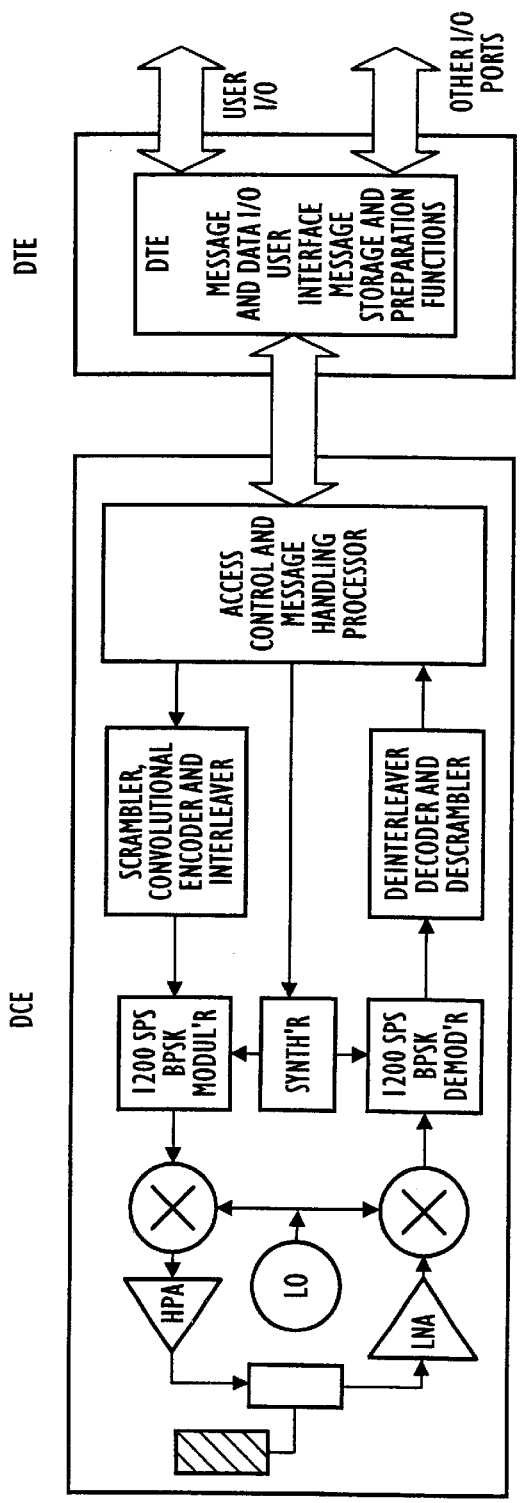
FIG. 2 is a block diagram of a prior art ship earth station.
Figure 3:
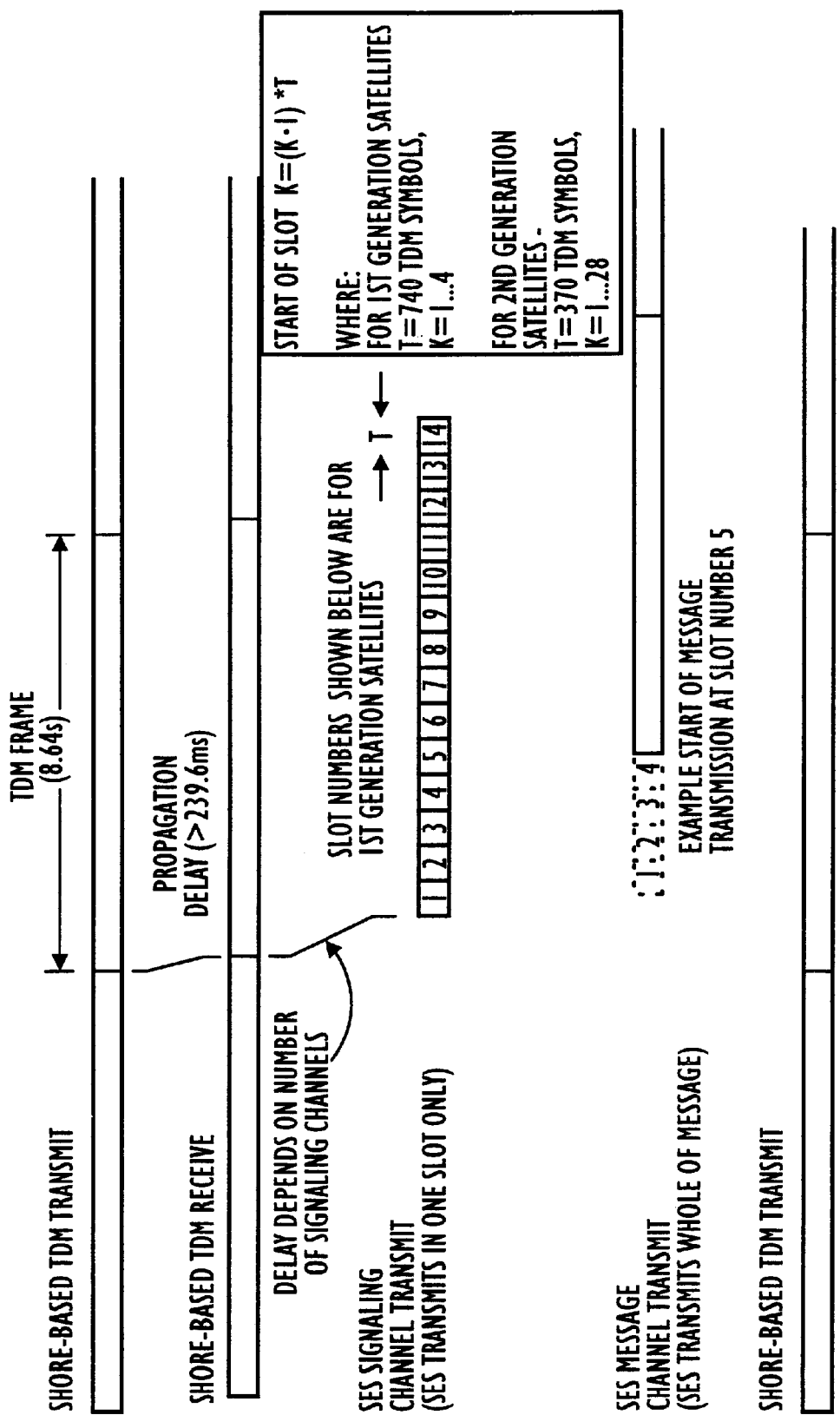
FIG. 3 is a diagram illustrating slot timing based on the TDM frame.
Figure 4:
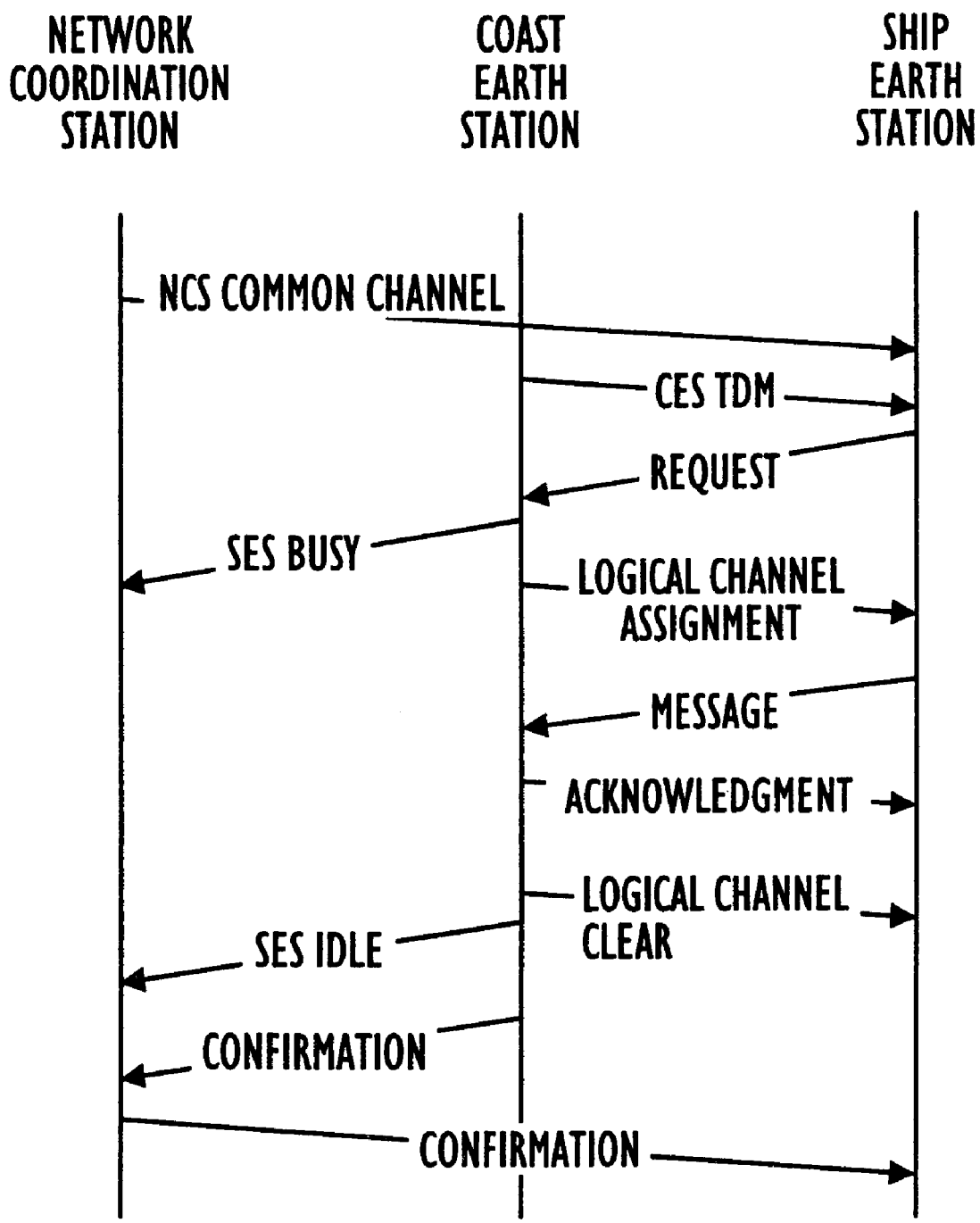
FIG. 4 is a sequence diagram for a SES originated call to a Land Earth Station.
Figure 5:
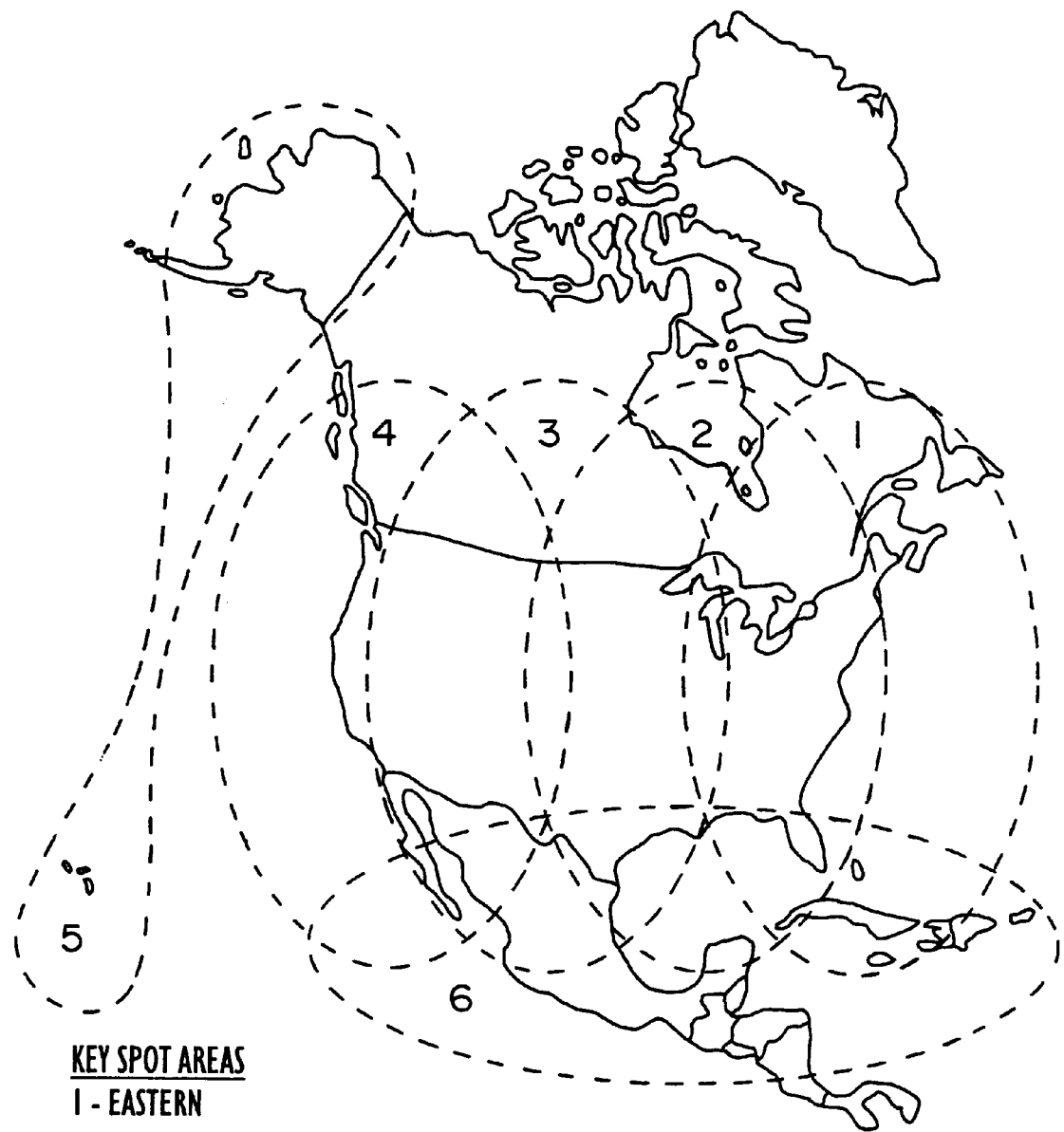
FIG. 5 is a diagram illustrating the spot area that matches the footprint of a satellite.

FIG. 5 shows the spot area coverage of North America. Each spot area must have a primary Common TDM. If this configuration provides insufficient capacity, either an increase to inbound, outbound or both will be required.

The following describes the LES configuration that utilizes the capacity of the spot areas served by a front end processor (FEP) until the system limit of six TDM groups per FEP. To increase outbound capacity extra TDMs may also be added to a Spot area. LES TDMs are used for outbound message traffic only. Announcements are sent on the Common TDM, and the mobiles are commanded to tune across to an LES TDM in preference to the Common TDM for receipt of one or more messages. The mobile will retune to the Common TDM after the completion of the call and any follow on calls.

LES TDMs have a greater potential throughput (they may be allocated up to 10% more than Common TDMs due to a reduced allowance for protocol packets) but with the penalty of higher call setup times for outbound messages caused by the need for the mobile to retune. Second and subsequent Common TDMs may also be used to increase outbound capacity in the spot area. In this case mobiles would not have the frequency of the second Common TDM stored in eprom (they only have the Primary TDM frequency). Mobiles generally attempt to send a [LOGIN REQUEST] via the primary Common TDM. The LES will evaluate loading across all its Common TDMs in the spot area and return the frequency of the least loaded Common TDM in the [LOGIN ACK].

The LES selects the least loaded Common TDM on the basis of the number of mobiles (and their registered users load factor) that are currently logged in to that TDM. On receipt of a [LOGIN ACK] containing a different frequency to the Primary Common TDM, the mobile retunes to the new frequency and sends a new [LOGIN REQUEST]. Having logged into a new (and previously unknown—to the mobile—Common TDM), the mobile remains tuned to it until it powers down or logs out.

To increase the inbound capacity of the LES requires that more message channels and signalling channels are provided. Providing extra channel capacity, however, indicates that the level of call protocol packets carried by the outbound TDM rises. In the case of signalling channels, an extra [signalling channel Descriptor] packet is also transmitted, decreasing the available bandwidth. It has been determined that to provide higher levels of inbound capacity beyond that achievable by increasing the number of signalling and message channels requires that a second or subsequent TDM be allocated. As the limit on the inbound capacity is in fact the amount of outbound TDM capacity required for the protocol overhead, one solution is to move the default outbound traffic to an LES TDM (thus freeing the bandwidth for protocol packets) or defining a second or subsequent Common TDM.

The primary means of addressing is the [Spot ID] which is numbered as for the Spot Area. The standard [Ocean Region] field (Part of the [LES ID]) does not have any geographical relevance but is used to identify which FEP handles that TDM group. Each multiple TDM LES has a unique [Station Number] which will be constant for all Spot Areas. For example if the TDM groups were allocated as in FIG. 6 to three FEP pairs, then the resulting beam pattern as seen by the mobiles would be as shown in FIG. 7. FIG. 8 shows a typical traffic pattern that may result.

The [Spot ID] field is used to record where a mobile is logged into and thus to route calls to the mobile. Although the [Spot ID] initially maps onto the Spot Areas, it is possible to allocate more than one common TDM per Spot Area (any mobile knows about one Primary TDM per Spot Area) and provide a new [Spot ID], and thus, a new route within the LES. This is an alternative method of increasing the capacity that may also prove useful for managing traffic to geographical areas within a Spot Area.

The following assumptions have been made about mobiles operating in this system in accordance with the LES design of the present invention.

Mobiles are frequency agile.
Mobiles may have more than 4 common TDM frequencies in eprom.
Mobiles correctly implement logon handling.
Mobiles ignore the [Ocean Region] field of the [LES ID] when validating a Data Network Identification (DNID) for non preassigned data reporting.

The reasons for these assumptions are outlined below.

Mobiles contain a list of Primary Common TDM frequencies. This data structure allows for 4 [origin ID]s plus 76 other [origin ID]s to cater for spot beam operation, a total of 80 IDs and the associated channel numbers. The [Origin ID] field is equivalent to the [LES ID] and is made up of [Ocean Region] and [Station Number]. Any other TDM frequency is generally not known by the mobile in advance. A second or subsequent common TDM frequency or an LES TDM frequency is made available to the mobile when it is required, either as part of the login process or as part of the message protocols. Maritime mobiles scan the frequencies every 24 hours or if the bulletin board bit error rate goes above a threshold. Land mobiles are not obliged to scan but this is desirable in Spot Beam operation. Mobiles will only tune away from the Common Channel frequency if any of the following occur:

The operator logs out (or powers off)
The operator logs into another spot area Primary TDM
Frequency scanning is enabled
The mobile detects a bulletin board bit error rate above a given threshold and either automatically tunes away or informs the operator of the need to tune away.

An [Announcement] packet gives another TDM frequency for the transfer.

A poll has programmed the mobile to send a data report to a signalling channel associated with a different TDM frequency.

For a single Common TDM in each spot area, mobiles logging on will not represent a problem. Within any spot area only one TDM is available to log into. If the LES is using a second Common TDM in a spot area, load share across TDMs must be used and mobiles must interpret the [LOGIN ACK] packet to determine the Common TDM to use. When the load share software determines that the mobile data terminal should be added to the Primary Common TDM, the same frequency that was used for the logon is returned to the mobile in the logon acknowledgement and the logging process of the mobile is simplified and not complicated. When the load share software determines that the alternate frequency is to be used, the second Common TDM frequency is returned in the logon acknowledgement. In this case, the mobile will have to repeat the logon process again using the second Common TDM frequency.

When a mobile is programmed for periodic data reporting, it is given a Data Network Identification (DNID) and an [LES ID]. The [LES ID] consists of a [Station Number] and [Ocean Region]. When the timeout period expires, it checks the [LES ID] of its currently logged into LES against its programmed [LES ID]. Only if these match will it send its data report. In order for a mobile to work in the proposed configuration, DNIDs will need to be valid across all ocean regions. This will be achieved by the mobile ignoring the [Ocean Region] when checking the validity of a DNID. When a mobile moves between different spots, the LES needs to check if the mobile has been programmed for reserved data reporting. If so it needs to be reprogrammed by the LES assigning the mobile a signalling channel in a TDM in the new Spot Area.

The operator views the System via the man-machine interface (MMI) on the System Operator's Console (SOC). The change of usage of the [Ocean Region] field is crucial to the operability of the system, and thus, a more meaningful way of describing the equipment using a definable FEP ID string is provided. Where appropriate the [Spot ID] is used instead of the [Ocean Region]. The terrestrial user interacts with the LES via the X.25 user interface. For a user submitting a message, no knowledge of the location of the mobile is required. The LES automatically routes the call through to the TDM in which the mobile is logged into. Individual EGCs and Polls are routed by the LES to the correct TDM as for messages. For Group and Area EGCs and Polls, it is important that the user can have knowledge of the location of the mobile or group of mobiles to avoid sending the message to all spots and to allow a level of control over data reporting options.

To allow for this a special format, a data report is sent from the LES when a mobile successfully logs into a Spot Beam TDM. The user may use this information or other privileged knowledge to select the route for the EGC or Poll. The spot areas as supported by the satellite may not be meaningful to a terrestrial user and the ability is therefore given to map several names of areas onto a single spot thus creating 'Virtual' spot areas.

Figure 9:
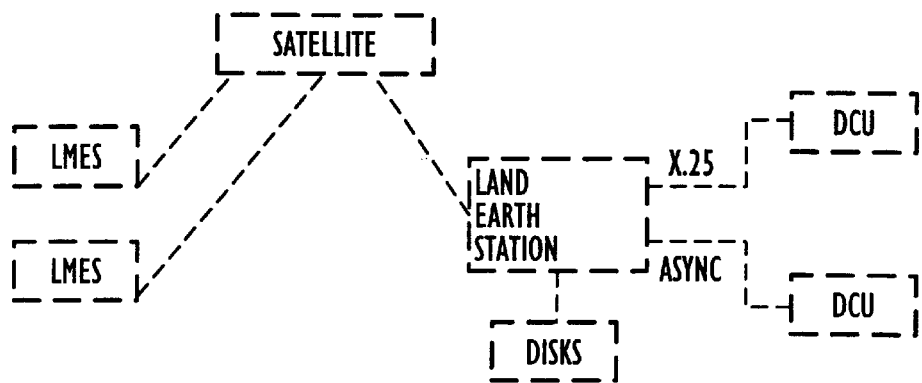
FIG. 9 is an overview of the system topology.

In the data messaging network, messages of between 7 and 7932 characters are transmitted from a remote user to a central dispatcher and vice-versa. The remote user has a Land Mobile Earth Station (LES) and the central dispatcher has a Dispatch Control Unit (DCU). An overview of the system topology is presented in FIG. 9. All communications between the LES (Land Earth Station, the "hub") and the mobiles take place via the satellite. Outbound, from the LES, messages and signalling information is carried on one or more 600 bits-per-second synchronous Time Division Multiplexed (TDM) channels. Inbound, to the LES, signalling information is carried on a number of signalling channels, and message data is transferred on messaging channels. The bit rate of the inbound channels depends on the satellite generation; 300 bits-per-second for the first generation satellites and 600 bits-per-second for the second generation. The signalling channel access is a combination of reserved and unreserved (slotted ALOHA) transmissions, depending on packet type. The messaging channel access is always reserved.

The LES (Land Earth Station) controls all access to the satellite and terrestrial lines. It operates the protocol at both ends. All messages are stored to disk, at least temporarily, and a billing record is generated for each transaction. The subscribers get at the data via terrestrial access lines, operating under the X.25 system or asynchronous serial port (RS-232) connections. Various stages of the system have the capacity to become bottlenecks. The satellite bandwidth is clearly limited, and so, under some circumstances, this may become the limiting factor. Likewise the LES is central to the entire system, and so provides a capacity limit—the number of required disk accesses can be a factor. And of course the terrestrial interface is a limited resource and could be a source of congestion.

As the system becomes congested, end-to-end delays will increase, and along with it customer dissatisfaction. Eventually, delays can increase exponentially, until the system ceases to operate. One aspect of the system we have discovered is the fact that the system load is not spread evenly over the whole day. In particular, there is a busy hour (e.g. between 8 and 9 in the morning) when the system is most heavily loaded. Note that this busy hour refers to the system's busy hour, not to individual user's busiest hour.

The following discussion provides an overview of the satellite communications, and the available bandwidth. It also describes how the inbound and outbound communications channels are used for each type of transaction. This information is vital determining the load each message applies to the system. All outbound data is transferred on synchronous Time Division Multiplexed (TDM) channels. The data rate is 600 bits per second. The 24-hour day is divided into 10,000 frames, each of 8.64 seconds in duration. Each frame contains 639 bytes of data (plus a flush byte). Packet lengths are not fixed, i.e. packets follow each other without any "fill" characters.

Packets are optionally split over two consecutive frames to reduce the amount of 'dead space' at the end of a frame. If there is enough traffic to fill a frame, and the last packet does not end exactly at the end of the frame, it will be continued. The continuation information requires 6 bytes. Thus, the usable frame size is in general 6 bytes less than the nominal size, or 633 bytes. (If there is insufficient traffic to fill a TDM frame, the remainder is padded with zeroes, and the exact size of the frame is immaterial.) Sent with each frame is a bulletin board and a number of signalling channel descriptors (SCDs). The bulletin board takes 14 bytes out of the frame, leaving 619. There is at least one signalling channel descriptor (SCD) for each signalling channel used on the system, and there may be more for timing reasons. Each SCD takes 10 bytes (first generation) or 13 (second generation). The number of bytes available for message packets depends on the number of SCDs and satellite generation.

The message packets themselves have type fields, checksums and other parameters that are an overhead to the transfer of data. These are accounted for within the transactions. When there are more than one TDM channel in the data messaging system, individual mobile units are permanently assigned to one of the channels. Thus, the individual channels function independently, rather than excess traffic on one channel being routed to another. Furthermore, all packets destined for a particular mobile use the same TDM channel. This differs from the Standard-C protocol in which an NCS TDM channel carries announcement packets and EGC packets, and LES TDM channels carry message traffic.

In order to limit delays due to congestion, there is a limit imposed on the number of virtual circuits which may be up at one time. This limit is generally 24 calls per TDM. A virtual circuit (VC) is established by an Announcement packet (outgoing message) or an Assignment packet (incoming message), and cleared by the Logical Channel Clear packet. VC's apply only to messages, not data reports or EGC messages. Associated with each TDM channel is a number (between 1 and 40) of signalling channels. These channels are pseudo-synchronous, in that they are formatted as though they are synchronous, but the signal is only present intermittently. The channel is divided into 8.64 second frames in the same manner as the TDM channel, and the signalling channels are synchronized with the TDM channel. The channels generally operate either at 300 bits-per-second or 600 bits-per-second. The frame is divided into 14 and 28 slots each 15 bytes in length. There is a gap between slots, and a 64-bit unique word to identify each slot, that accounts for the remaining bytes.

The signalling Channel Descriptors (SCD) contain a slot state marker (SSM) for each slot in the frame. Each SSM consists of two bits—a burst received bit and a reserved bit. The burst received bit indicates that a valid packet was received in the equivalent slot in the preceding multi-frame (3 frame sequence). This is used to acknowledge individual bursts. The reserved bit indicates that the slot is reserved for a specific LMES (which will already have been informed) and is not available for unreserved access. Any transaction that is initiated by the mobile starts with some unreserved access. Examples include log on/off, starting an inbound message, and sending an unreserved data report. To make an unreserved access, the mobile searches the SCDs for slots that are not reserved in the SSM. It then chooses at random between them. The mobile makes the transmission, and then waits three frames for the burst received acknowledgement.

Since the slots are unreserved, more than one mobile can attempt to send at once. This may result in the burst being garbled, and the burst received bit not being set; in this case both mobiles will back off a random number of frames and retry. At other times (the most likely case), the LES will successfully decode one of the bursts and set the burst received bit. Both mobiles will assume that their message was received. This is generally solved by higher level protocols; the mobile will time out waiting for a response and retry. However in some cases, such as data reports, there are not higher level protocols and the message will be lost. The cost of a clash is fairly high; it may result in new transmissions, it may cause delays to messages, and it may cause messages to be lost altogether. Thus as unreserved signalling channel traffic increases, performance is lost quite rapidly.

In reserved access, the mobile is informed of a frame, channel and slot when it is to send a burst. That slot is then marked reserved so no other mobiles will use it; this removes the problems of clashes. Reserved access is used for message acknowledgements and such when a message is already under way. If the LMES is unable to transmit in its reserved slot, or its burst is not detected in that frame, then the reservation is extended for one multi-frame; i.e. it can try once more. (A "multi-frame" refers to a complete cycle of 3 frames, i.e. from one frame until the frame in which the burst received bit for the first frame would appear.) This means that the LES cannot reserve the same slot in successive multi-frame for more than one mobile. In the event that the LMES cannot deliver the burst in the required frame/channel/slot, higher level protocols will lead to a retry.

Pre-assigned access is similar to reserved access, with a couple of exceptions. Pre-assignment takes place not on a burst by burst basis, but reserves a number of slots in advance. As an example, the LMES can be told to send a position report every 400 frames in channel 11070, slot 5, starting at frame 6200. That slot is reserved for the LMES in frames 6200, 6600, 7000 and so on. The pre-assigned reservations are not extended if the burst is not made. The mobile is generally permitted only one attempt. The signalling channel is effective for short bursts and messages, but for messages of any length the messaging channel is used. Each TDM can contain a number (but at least 1) of messaging channels. The messaging channel is similar to the signalling channel in timing. However, the timing is only used to determine the start of the transmission—once the transmission is started it continues until the message is complete.

The message is typically split into packets of 127 bytes each, even though they are sent one after another. This so that if the transmission is interrupted, only those packets which have been missed need to be retried. The LMES can send up to 7932 bytes of data at one time in this way. Message channel access is generally reserved. The mobile will generally not transmit on the messaging channel without a reservation. Messaging channel burst can be quite long—from around 5 seconds–3.5 minutes. If several mobiles wish to submit messages, then these messages must be queued one after another (by the LES, which is allocating the channel use.)

Overhead due to the communication protocol accrues as follows. Each 127-byte packet includes a 1-byte sequence number and a 2-byte checksum. Also a flush byte is added during encoding, for a total of 128 bytes. The first packet of a message has an additional 11 bytes of header, including the 7 byte X.121 address. The mode is based on frames of one packet. In addition to the packet overhead, each frame has a "unique word" of 128 "symbols" which is added. This corresponds to 8 bytes of additional overhead. Each message also has a preamble of 192 symbols added, corresponding to 12 bytes overhead. Finally, transmission must start at the beginning of a signalling channel slot, which occurs every 0.62 sec. This translates into an additional overhead per message of 0.31 sec, on the average, corresponding to an additional 12 bytes.

The following examines a number of the transactions that take place between a mobile and the LES, and defines the satellite communication requirements for each. Mobiles log in to the LES to indicate that they are operational, i.e. they are generally monitoring TDM channel transmissions. Mobiles log out when they cease operating. In typical vehicle application, mobiles will log in on ignition "on", and out on ignition "off." In both login and logout, the mobile sends a single packet unreserved position report to the LES in addition to the login/logout packet. Three cases of position reporting are considered:

the LMES sends an unreserved position report periodically the LMES sends position reports periodically in pre-assigned slots the user requests a position report from the mobile using an individual poll In all cases, the position data is sent in a single slot. For the pre-assigned case, the assignment is made with a single 18-byte individual poll. This single packet assigns the slots for a large number of position reports. Data reports are short messages that are sent on the signalling channel. The protocol is initially the same as for unreserved position reports (i.e. unreserved slots in the signalling channels carry the first part of the message), except that up to four slots may be used. The first slot carries up to 9 bytes of data, and the remaining slots carry up to 12 bytes each. Since the first slot has the continuation bit set, the LES will reserve the remaining slots in subsequent multiframes. Thus, only the first slot is unreserved and subject to collisions. There is no acknowledgment other than the burst acknowledged bit, which does not acknowledge receipt of the specific data report, but only of some transmission in that slot.

The protocol is the same regardless of the length of the message. When the LES has an outbound message to be sent to the mobile, it first sends an announcement packet in the communications protocol described herein on the Primary Common TDM channel to which the mobile is. associated from its logon. The MES responds with an unreserved assignment response packet. The LES sends the data in a number of message data packets, followed by an acknowledgement request. The LMES sends a reserved acknowledgement on a signalling channel. If there are requests for retransmission, the LES retransmits on the TDM, and the LMES again acknowledges. Finally the LES sends a clear to the LMES. The outgoing messages themselves are sent over the TDM channel in 1 27-byte packets, with the last packet filled out with zeroes.

When a mobile has an inbound message to be sent to the LES, it first sends an assignment request packet as an unreserved packet on an LES signalling channel. The LES responds by sending a logical channel assignment on the LES TDM. The LMES (mobile) sends the message on the assigned message channel. The LES responds with an acknowledgment packet on the TDM channel. The acknowledgment packet includes any requests for retransmission, and the message channel assignment for the retransmitted packets. After all packets have been successfully transmitted and acknowledged, the LES sends a logical channel clear packet on the TDM. A certain percentage of message packets are lost during a transmission. The resending of these packets increases the load on the satellite channels. The delay, however, is more than just the additional transmission time of the resent message packets. There is an additional cycle in the protocol, involving Request for Acknowledgment (for outbound messages only) and Acknowledgment (for inbound and outbound messages).

EGC messages are outbound messages sent to all mobile users, or to a pre-defined group of mobile users, at once. The EGC message is typically repeated several times, after suitable intervals, to allow reception by mobile users who were transmitting, or who were not logged on, during the first transmission. There are no acknowledgments.

EGC messages will be assumed to have an average length of 500 bytes, and to be transmitted 3 times. With 500 bytes, the "double header" protocol is used. An 11-byte EGC header (plus 4 bytes packet overhead) is transmitted in a packet with the first 16 bytes of data. The same header is retransmitted in the next packet, with the next 240 bytes of data. A third packet contains the header, and the next 16 bytes of data. A fourth packet contains the header and the remaining 228 bytes of data. The first two packets are sent adjacent to one another, as well as the last two packets. Thus, each pair of packets may be viewed to function as one larger (combined) packet which cannot be broken apart. The combined sizes are 286 bytes for the first packet pair, and 274 bytes for the second pair.

Distress alerts and emergency priority inbound messages are additional transactions that are available. These messages are processed at higher priority than normal messages. There are relatively few of these priority messages per day, and they can be included as normal priority traffic without distorting the results in terms of congestion and delay of the normal traffic.

Table 1 decomposes each transaction into its component parts, or "sub-transactions". For each component the channel type and size of the transmitted packet(s) is given. The channel type may be TDM, msg (messaging channel), or res sig (unreserved signalling channel). The size is in bytes for the TDM and messaging channels, and in slots for the signalling channels.

TABLE 1

| Transaction | ch type | Size (bytes or slots) |
| --- | --- | --- |
| Outbound Message | | |
| Announcement | TDM | 19 |
| Assignment Response | unr sig | 1 |
| Message - each packet: | TDM | 128 data + 7 overhead |
| Request for acknowledgment | TDM | 9 |
| Acknowledgment | res sig | 1 |
| Logical channel clear | TDM | 8 |
| Outbound Retransmission | | |
| Message - each packet: | TDM | 128 data + 7 overhead |
| Request for acknowledgment | TDM | 9 |
| Acknowledgment | res sig | 1 |
| Inbound Message | | |
| Assignment Request | unr sig | 1 |
| Logical channel assignment | TDM | 17 |
| Message - first packet: | msg | 113 data + 23 overhead |
| other packets: | msg | 124 data + 12 overhead |
| last packet: | msg | rest data + fill to 124 + 12 |
| Acknowledgment | TDM | 13 |
| Logical channel clear | TDM | 11 |
| Inbound Retransmission | | |
| Message - first packet: | msg | 113 data + 23 overhead |
| other packets: | msg | 124 data + 12 overhead |
| last packet: | msg | rest data + fill to 124 + 12 |
| Acknowledgment | TDM | 13 + number packets in error |
| Emergency priority message (same as short inbound message) | | |
| Position | | |
| Position report | unr sig | 1 |
| Pre-assigned position | | |
| Position report | res sig | 1 |
| Polled position | | |
| Individual poll | TDM | 18 |
| Position report | unr sig | 1 |
| Data report | | |
| Data report - first slot | unr sig | 1 slot (9 bytes data) |
| other slots | res sig | 1 slot (12 bytes data) |
| EGC | | |
| Each double packet | TDM | 256 data + 30 overhead |
| 500 bytes is 2 double packets | | 500 data + 60 overhead. |

TABLE 1-continued

| Transaction | ch type | Size (bytes or slots) |
|---|---|---|
| Distress Alert | | |
| Distress alert | unr sig | 1 |
| Distress alert acknowledge | TDM | 8 |
| Mobile Login\Logout | | |
| Login\logout | unr sig | 1 |
| Login acknowledgment | TDM | 25 |
| Logout acknowledgment | TDM | 7 |
| Position report | unr sig | 1 |

Table 2 summarizes the satellite channel load for each of the typical transactions. The table lists the transaction name, the approximate number of bytes and of packets used on the TDM, the number of unreserved and reserved signalling channel slots, the number of message channel packets, and the number of virtual circuit requests (1 or 0) added by the transaction. The byte estimates include the type field (medium packet assumed) and checksum fields. The entry "n" is the number of errored packets retransmitted.

TABLE 2

| Transaction | TDM bytes | TDM pkts | Unres Sig Chan slots | Reserved Sig Chan slots | Message Channel packets | Virtual Circuit |
|---|---|---|---|---|---|---|
| Short Outbound Message | 75 | 4 | 1 | 1 | 0 | 1 |
| Long Outbound Message | 1068 | 11 | 1 | 1 | 0 | 1 |
| Short Inbound Message | 41 | 3 | 1 | 0 | 1 | 1 |
| Long Inbound Message | 41 | 3 | 1 | 0 | 9 | 1 |
| Emergency Priority Message | 41 | 3 | 1 | 0 | 1 | 1 |
| Position | 0 | 0 | 1 | 0 | 0 | 0 |
| Pre-assigned Position | 0 | 0 | 0 | 1 | 0 | 0 |
| Polled Position | 14 | 1 | 1 | 0 | 0 | 0 |
| Data Report (3-slot) | 0 | 0 | 1 | 2 | 0 | 0 |
| EGC (3 transmissions) | 1680 | 6 | 0 | 0 | 0 | 0 |
| Distress Alert | 8 | 1 | 1 | 0 | 0 | 0 |
| Mobile Login | 25 | 1 | 2 | 0 | 0 | 0 |
| Mobile Logout | 7 | 1 | 2 | 0 | 0 | 0 |
| Short Outbound Retransmission | 48 | 2 | 0 | 1 | 0 | 0 |
| Long Outbound Retransmission | 9 + 135 n | 1 + n | 0 | 1 | 0 | 0 |
| Short Inbound Retransmission | 14 | 1 | 0 | 0 | 1 | 0 |
| Long Inbound Retransmission | 13 + n | 1 | 0 | 0 | n | 0 |

Figure 10:
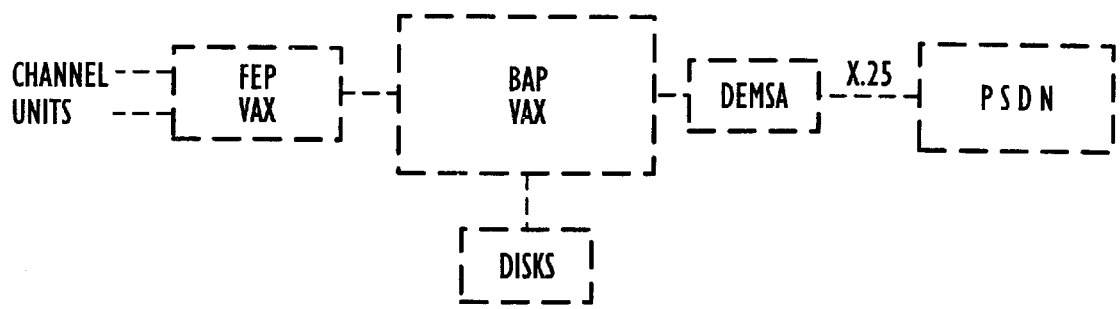
FIG. 10 is a diagram of the computer configuration of the LES.

The computer configuration of the LES is shown in FIG. 10. The following describes basic descriptions of the VMS processes of the LES. The Background Applications Processor (BAP) is a DEC 7000–640 (four processors) with two RZ26 disks, a fast RAM disk for database storage and access and 512 Mbyte RAM, processor rating 125 VUPs. There are two BAPs, master and standby, and two FEPs. Each BAP has two storage disks, and there is also a "quorum" disk for standard VAXcluster operations that are shared. The on-line data disk is shadowed in the standby; replication of disked data is carried out in parallel by hardware.

The following description refers to operations of the master unit, however, everything is duplicated in the standby unit/processor. The processes in the system are described below. Certain processes perform the major processing for the transactions. Examples are the Message Handler, the X.25 Driver, the Mobile Call Manager, etc. These are taken to be primary processes for the model. Other processes are activated by the primary processes to perform specific and predictable tasks for them. Examples are the Pipe Manager and the DECNet Manager. These will be called secondary processes.

The classification of each process as primary, secondary, or background, is given in the process descriptions below, and summarized in Table 3.

TABLE 3

FEP

Primary Processes

MDD (Multi-Drop Driver)
CUCF (Channel Unit Controller FEP portion)
Secondary Processes DECNet
VAX ELN (no disk storage)
Background Processes

VAX ELN

BAP

Primary Processes

CUCB (Channel Unit Controller BAP portion)
MCM (Mobile Call Manager)
MH (Message Handler)
DRH (Data Report Handler)

TABLE 3-continued

X.25 Driver X C CC
SOI (System Operator Interface)
SYB (SYBASE database process)
Secondary Processes Pipe Manager, including DECNet, mailboxes
Token Manager
Report Generator
PADR (Pre-Assigned Data Reporting)
VMS
Background Processes Handshaker
Stats Manager
VMS The Front End Processor (FEP) is a separate processor which communicates with the VAX Background Applications Processor (BAP) over the DECNet, and with the satellite channel units. It handles most of the protocol. The Multi-Drop Driver (MDD) provides the interface between the channel units (transmitters and receivers) and the Channel Unit Controller. It:

- executes the channel unit interface protocol
- assembles link level frame
- handles message and signalling packet acknowledgement, transmission and reception
- handles channel data and control
- informs receive message channel units that a message is expected at a particular frame and start time The Channel Unit Controller (CUC) interfaces between the Multi-Drop Driver of the FEP, and the Mobile Call Manager (MCM) in the BAP, and is therefore, itself split into front and back end components. The main functions of the FEP component (CUCF) are:

- to receive messages from mobiles
- to send messages to mobiles
- to make messaging channel assignments for inbound traffic
- to compile and schedule the transmission of logical channel assignments
- to abort and/or clear message transactions
- to deliver statistics and status data
- to priority process urgent transactions
- to inform the MDD that a message is expected at a particular frame and start time.

The DECNet Link Manager (FEP) process set maintains DECNet links to the BAP Processors (Master and Standby). Each link requires its own process. This process is considered to be a secondary process, i.e. its load is subsumed into the MDD and CUC loads. The VMS is the operating system. Its load is partly background, and partly subsumed into the primary process loads. Each Satellite FEP corresponds via the CUC process with three BAP processes, the Mobile Call Manager (MCM), Satellite Driver Control (SDC), and Pre-Assigned Data Reporting (PADR). These three processes form the interface between the FEP and the BAP. The Mobile Call Manager (MCM) deals only with signal packets and complete messages. It gives and receives messages to/from the message Handler, carries out mobile address validation via the system database, and provides the operator interface to the System Operator Interface (SOI) server. The MCM performs the following:

- writes to and reads from the message text file. The write operation takes N+2 disk accesses, where N is the number of blocks in the message.
- writes call records to the call record log file. A simple sequential write, once per incoming message, and once for each delivery of that message.

The Satellite Driver Control (SDC) has three main functions: satellite configuration data distribution, redundancy control (including maintenance of the channel unit sparing pools) and event and statistics gathering from the MCM and CUC. SDC receives configuration data changes from the DCD and SOI and notifies MCM and/or CUC of the relevant changes. SDC communicates with PRC to receive and notify of state and mode changes within the satellite driver subsystem.

The Channel Unit Controller (CUC) provides the interface between the MCM and the Multi-Drop Driver of the FEP, and is therefore, itself split into front and back end components. The BAP component handles incoming transactions from the mobiles, assembling packets into complete messages and being responsible for some specific Standard-C functions. The CUC supports multiple TDM groups and handles unsolicited position report assignments.

The pre-assigned data reporting process actually handles all data reports, not just pre-assigned. For pre-assigned data reports it manages and validates the reservation of slots. This preassigned data reporting process passes all received data reports to the Data Report Handler.

The Message Handler queues details of incoming messages (X.25 and satellite) and schedules them for transmission (satellite or X.25). The Message Handler process has a priority above that of the driver processes, but below that of the Pipe Manager. Message archiving, retrieving and logging Call Records are conceptually part of the Message Handler but physically exist within the X.25 and satellite driver processes. The Message Handler does not itself handle text; the message details contain the disk address of the message text, written by the incoming driver and read by the outgoing driver. Messages are transmitted when an output resource is available (i.e. a token is free) and the mobile is free (unless sending to an X.25 route). Scheduling of timed transmissions (such as retransmissions of EGC messages after a specified time) is also handled. The Message Handler accesses the system database to write and update message details.

The Pipe Manager process is the highest priority real-time process, and provides channels for inter-process communication transparent of the machine location of the processes. The Pipe Manager is layered over the DECNet Link Manager for BAP to BAP (master to/from standby) and BAP to FEP communication. All pipes are bidirectional. A pipe between two VMS processes in the same processor is implemented as a pair of VMS Mailboxes. A process controlling or providing a system resource (e.g. the Token Manager) or offering a system service (e.g. the Message Handler) will talk over several pipes, one pipe to each resource (or service) user. Although conceptually separate, each pipe terminates in the same Mailbox at the resource (or service) provider.

For processes communicating with processes in another processor, the lower layer of the Pipe Manager is a network of DECNet links. In concert with the Pipe Manager, the DECNet Link Manager (BAP) process set maintains DECNet links to the FEP Processors and the DEMSAs. Each satellite FEP and each DEMSA requires a separate process. Other DECNet links, such as to the System Operator's Console (SOC) and terminal server, also require separate DECNet link manager processes.

For processes communicating with other processes within the BAP the lower layer of the Pipe Manager is a system of VMS mailboxes. A driver passing the details of incoming messages to the Message Handler therefore issues the system call $QIOW (i.e., a synchronous call) to write to the Message Handler's input mailbox, followed by a $QIOW read on its own input mailbox (i.e. the driver end of the Message Handler/driver pipe) to receive the Message Handler's acknowledgement of the details. The VMS process will at this point block the driver, and the Message Handler runs to service its input mailbox.

An owner of a system resource (i.e. disk storage space, terrestrial communication lines and satellite channels) makes the Token Manager resource available by equating it with a token or a number of tokens and offering the tokens for use by other system processes. A use process must seize the token before using the resource. This is the mechanism for insuring that the various limits on virtual calls are not exceeded. The Token Manager process is the interface between resource owners and resource users. The Token Manager provides the using process with a token and a communication path, or pipe, to the process owning the resource. A process seizing a token can use an asynchronous system trap (AST) to do so. Token unavailability does not therefore suspend the seizing process; the process will be interrupted (IPL 2 interrupt) and the AST subroutine executed when the Token is freed.

In general, storage tokens are always available. They are withdrawn only when the system is overloaded, when incoming traffic may be restricted to priority messages. In normal operation the supply of route tokens will occasionally dry up. The Message Handler could have as many ASTs queued as there are routes in the system. The Message Handler process will be immediately run if it is blocked when the AST matures.

The Processor Redundancy Control (PRC) process covers the redundancy control of FEPs and BAPs, and their software processes. The PRC process includes the control of the system's actions during switchover from Standby to Master, and the co-ordination of the VMS processes during synchronization. Synchronization is the process of bringing a 'cold' Standby BAP to a 'warm' state. When warm, it can assume the master role. Switchover is the process of changing the running configuration to replace a failed hardware unit with a redundant unit. PRC processes other than the Handshaker are normally dormant, awaiting a PRC event, and are ignored in the Performance Analysis Tool. The Handshaker is a small and ongoing overhead, and will be subsumed in the background load on the BAP CPU. PRC processes include:

BAP Arbiter—Updates the configuration database with the current BAP status (master or standby). Can force a switchover on operator command. Periodically sends the system time to the Standby BAP.

Event Monitor—Receives PRC events and passes them to the Event Manager.

Handshaker—Handshakes with the redundant BAP and FEPs.

When started, this process constructs DECNet links to the redundant BAP and to each FEP. It then sends and receives the corresponding handshakes to/from each processor. The handshake indicates a change of status of the corresponding processor, or, in the absence of N consecutive handshakes, the failure of a DECNet link or the death of a processor. A failure is reported to the BAP Arbiter process, which updates the configuration database and may initiate a switchover. A 'link up' condition is similarly reported.

Process Status—This process co-ordinates a BAP's VMS processes. It maintains the current record of process states and tells processes to change state when necessary, i.e. during initialization, synchronization and switchover. A finite state machine is associated with each of these transient modes, and is executed by Process Status.

The information in the LES database is both distributed over the FEPs and BAPs according to the ownership and use of the data and also centralized in the DBMS. Any change to data is first applied by the owner and then passed to the Database Interface which disks the change in both BAPs and then distributes the change to any using processes. The Database Change Distributor (DCD) Process distributes database changes to using processes in the BAP. There is also one FEP DCD process (running on the BAP) per FEP, responsible for distributing relevant database changes to the FEP.

The VMS Event Manager process:
receives events from the other VMS processes
differentiates between events and alarms
logs events to a sequential disk file
passes alarms to the SOI Server An FEP event handler receives FEP events and passes them to the Event Manager.

An error logger receives software errors from the VMS processes and writes these to an error log (a sequential disk file). It is activated under software error conditions. A stats manager process acts as a collection point for statistics gathered by the other VMS processes. Statistics are written to a sequential log file. An SOI server process responds to commands received from the System Operator's Console (SOC). The System Operator Interface (SOI) Server accesses the system database to validate the command against the SOC operator's permissions, and communicates with other VMS processes, particularly drivers, to obtain the information required by the SOC. A report generator runs on Operator Command. It reads an active log file (such as the Call Record log file) in the process compiling its reports.

An FEP command response is provided in the interface between the SOI command and the FEP to monitor the execution of operator commands in the FEP. In the system, such commands mainly change the satellite driver configuration. Data reports received from the satellite are passed from the PADR process directly to the Data Report Handler (DRH), bypassing the Message Handler. The DRH validates the CNID address, using an internal list which has been created from the database during process startup. It writes the data report to a sequential "CNID: file, and logs an abbreviated call record.

An X.25 Driver receives and transmits messages over the DEMSA, a unit with a capacity of up to 128 simultaneous virtual circuits. For incoming calls (calls initiated by the terrestrial subscriber) the X.25 driver validates the user's PIN and service selection against an entry in the system database. Then follows a message, or sequence of messages. A submitted message is received in full by the X.25 Driver, which validates the message's list of mobile addresses against the database. The message text is disked and the details passed to Message Handler. The X.25 driver (and this also applies to the satellite driver) compiles call record data when receiving or transmitting a message; this data is written to the Call Record log file, a sequential disk file. A message received and delivered by the LES will thus incur two additional disk writes for incoming and outgoing call record details.

The Message Handler initially places on this Token Seize Queue, queue details of every message due to be transmitted. The details will refer to either a message received over X.25 or satellite for transmission, or a retry of a failed transmission (to either X.25 or satellite) or a timed transmission such as an EGC call. Failed transmissions reach the Token Seize Queue via the Time Queue. The Token Seize queue is organized on a route basis; a route may be a group of terrestrial circuits or the satellite TDM channel assigned to the addressed LMES. The number of tokens for a route equals the number of virtual circuits (terrestrial) or message channels within a TDM (satellite).

Entries (one entry holds the details corresponding to one transmission, or copy, of a message) leave the Token Seize queue for the Selectable Queue when the Message Handler seizes a token for the equivalent route. Entries reach the Selectable Queue when an output line or message channel is free to carry the associated message. The output driver, X.25 or satellite, will remove the entry from this queue when it has connected to the output resource. Entries move to the Active Queue when the transmission of the message begins. There is generally one Selectable Queue shared by both drivers, X.25 and satellite.

The Active queue contains the message details of messages currently being output (several messages may be currently output, even over a single channel). On completion of a successful transmission the driver will remove the details from this queue and discard them unless the message is to be retransmitted at a later date. There is generally one Active Queue shared by both drivers. The time queue retains transmissions until it's time to transmit them or retry the transmission, thus supporting periodic polling of mobile groups. There is generally one Time Queue.

There are three significant LES resources: the disk, the BAP CPU, and the FEP CPU. (Note, as indicated earlier, that the "physical queues", such as the queue of messages waiting in the VAX for transmission over the satellite, are simply places where messages wait, in this case for the TDM channel to become free. The TDM channel is the resource causing the delay in this case, not the VAX.) All the FEP processes execute on the FEP processor. Currently the FEP is a MicroVAX.

All the BAP processes preferably execute on the BAP processor. Currently the BAP is a VAX 7000-640. The disk speed, translating into a number of disk accesses per hour, may well be the limiting factor in the performance of the LES. The disks currently in use are xxxxxs. There is also a RAM Disk on each BAP to allow for rapid access to the database. For ease in description, the LES transactions are broken into incoming (into the LES) and outgoing portions. Outgoing transactions begin with Message Handler execution, and incoming transactions terminate when the message details are passed to the Message Handler, i.e. just prior to MH execution.

Message Submission by an X.25 user proceeds in the following steps within the LES.
1. Caller connects over a virtual circuit for a batch session.
2. The X.25 driver validates the user's PIN and password and service selection against an entry in the system database. The data to validate against is held in a single record of the system database. Then follows a message, or sequence of messages.
3. The submitted message is received in full by the X.25 Driver, which validates the message's list of mobile addresses against the database. Call record data is also written to a sequential log file on disk. The caller disconnects.
4. A seized disk storage token means that the message text can be written to disk by MAR (a package within the MCM task), and the token released. To write a single block of text, MAR locks and reads a header information record, writes a text block and updates the header information with the disk address of the text block, an overhead of one lock, one read and two writes for each text block. Most messages occupy only one text block.
5. The X.25 driver submits the message details to the Message Handler. If there is more than one destination address, MH will replicate the message details, so from here on there are N messages.

The sending of a message from the LES to the mobile proceeds in the following steps within the LES. The message has already been submitted by a terrestrial user.
1. Message Handler receives message details from the submitting process. MH seizes a route token and communications path and moves the message details from the Token Seize Queue to the Selectable Queue.
2. MH also writes the details to the Database.
3. The MCM moves the message details from the Selectable Queue to the Active Queue.
4. The MCM reads the mobile list (database access) to verify that the mobile is idle (not engaged in another transmission).
5. The MCM initiates the transmission of an Announcement packet to the mobile. The Announcement contains the logical channel. The MCM waits for a response to the Announcement.
6. The CUC packages the Announcement and passes it to the FEP, to the MDD, for transmission.
7. The MDD receives channel data from the mobile, and passes this signalling packet (the Assignment Response) to the CUC and thence to the MCM (in the BAP).
8. The MCM marks the Mobile List entry as 'busy' (Database access).
9. The MCM reads the message text from disc, using the address held in the message details.
10. MCM passes the text to the CUC, to be packeted for transmission to the mobile. The MCM does not wait for a response and is free for other activity.
11. The CUC and MDD transmit the message text over a TDM channel. After the text has been sent, the CUC receives a signalling packet from the MDD. This is the mobile's Acknowledgement of message receipt, and may contain a request for the retransmission of message packets.
12. If the message has been received correctly, MCM is informed by CUC and the former starts a clear sequence, packeted by the CUC and sent by the MDD.
13. Once the text has been sent, MCM logs the delivery details in a call record (a sequential disc write), removes the message from the Active Queue, and tells Message Handler of a successful delivery, so that Message Handler can release the token, freeing the output resource.
14. MH also updates the message details in the database to record the delivered status.

MCM marks the Mobile List entry 'unbusy' (Database access). The primary processes in the FEP are MDD (Multi-Drop Driver) and CUCF (Channel Unit Controller, FEP component). The primary processes in the BAP are CUCB (Channel Unit Controller, BAP component), MCM (Mobile Call Manager), MH (Message Handler), DRH (Data Report Handler), X.25 (X.25 driver), and SOI (System Operator Interface) (see Table 3-1). Note that the CUC process passes data between the FEP and the BAP. In Table 3, the appearance of the process "CUC" means that both CUCF and CUCB are executed. "Transactions" refers to that portion of a global transaction which is incoming to the LES, or outgoing from the LES, but not both. For any end-to-end network transaction, two of these transactions are summed: one for the satellite transmission, and one for the terrestrial transmission or CNID storage. Outgoing transactions begin with Message Handler execution, and incoming transactions terminate when the message details are passed to the Message Handler, i.e. just prior to MH execution. For data reports, which bypass the Message Handler, the division takes place at the start of the Data Report Handler execution, in the analogous manner. Within the VAX, transactions to/from asynch users are lumped together with those for X.25 users. The disk accesses and database accesses are the same for both. While the CPU load may be slightly different due to the different protocols, CPU load is modeled as a per process average, with a distribution of load (variability) understood. Similarly, CNID retrievals using Kermit are lumped with those that transmit directly.

Figure 11:
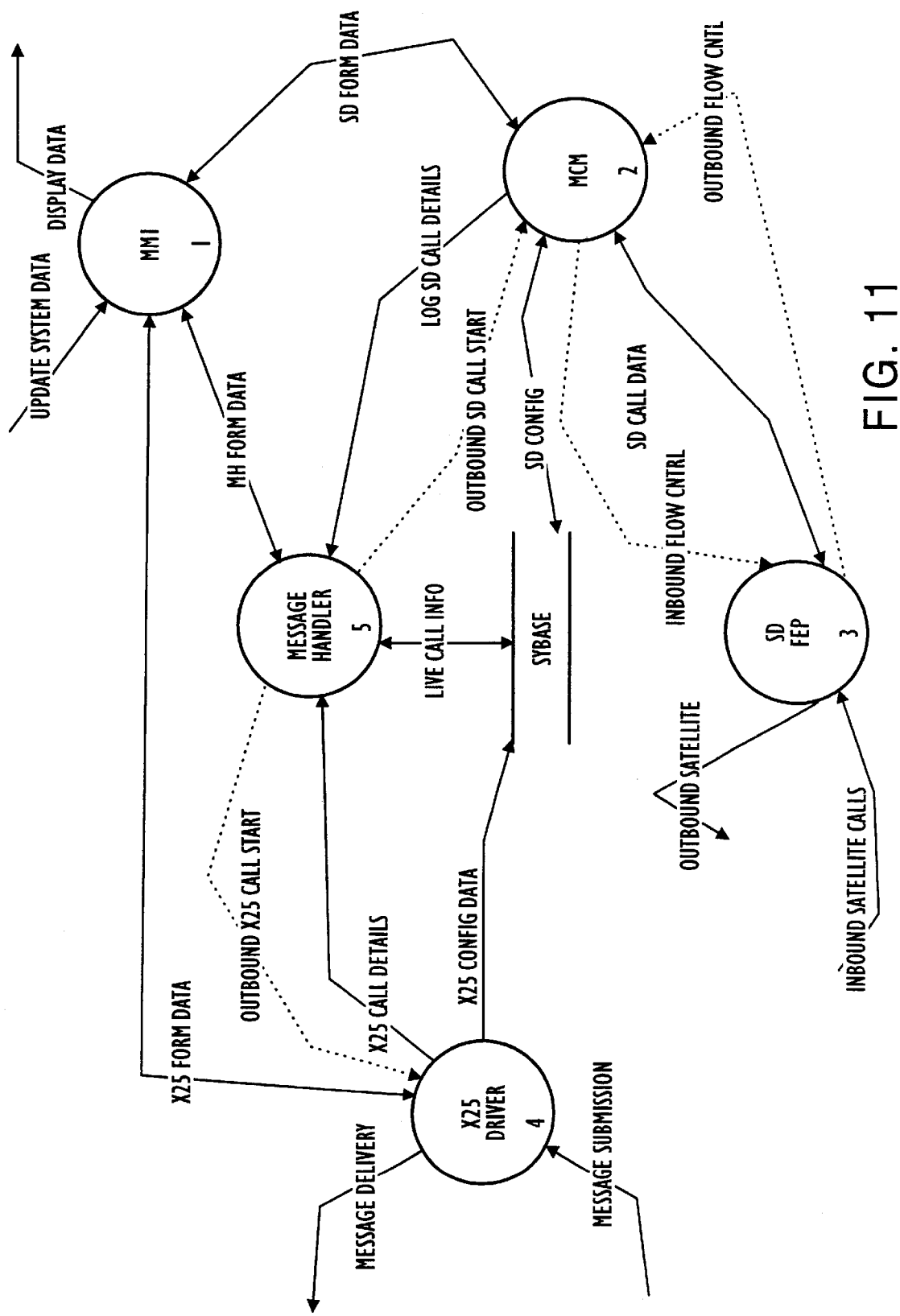
FIG. 11 provides the data flow diagram for the relevant parts of the LES.

FIG. 11 provides the data flow diagram for the relevant parts of the LES. A [LOGIN REQUEST] initially occurs on the primary Common TDM in a spot area. The mobiles send the [LOGIN REQUEST] on signalling channels associated with this TDM. The LES sends the [LOGIN ACK] back on this Common TDM. If a different frequency is returned in the [LOGIN ACK] this will cause the mobile to retune to the new frequency and send the [LOGIN REQUEST] again. The LES then sends a [LOGIN ACK] on this new channel indicating that the mobile is now logged in.

Once the mobile has successfully logged in, it stays tuned to that frequency. The LES database is generally only be updated when the [LOGIN ACK] that indicates success has been sent. To cater for mobiles that do not recognize the login protocol, the LES accepts a subsequent login attempt on the TDM on which it was received. An event is raised giving the mobile number in this case. A [LOGOUT Request] is normally received on a signalling channel associated with the TDM that a mobile is logged into, however, the LES sends a [Logout ACK] on the TDM that the request was received.

In a system that has more than one common TDM per Spot Area, load balancing ensures that a similar mobile load is handled by each TDM. The desired [Spot Id] is checked against the current [Spot Id] held for a mobile attempting to login. If they are the same and the mobile is currently still logged in, then this is a 're-login', the LES sends an acknowledgement. Otherwise, it is a 'real login'—normal login processing including TDM balancing and potentially reprogramming for data reports will take place. Whenever a 'real login' occurs a specially formatted data report is sent to a DNID associated with the mobile to indicate where it is now logged in. The delivery rules for the data report will be as for any other data report belonging to that DNID.

For each registered user, the operator defines a login/logout DNID. When a mobile logs in or out, SD looks up the login/logout DNID associated with the registered user PIN in the mobile's entry in the mobile list, and calls DRH to send a data report to that DNID. The member number is always zero. The LES attempts to find an LES TDM associated with the correct [ocean region] and [Spot ID] for the message transfer. In a spot area with multiple LES TDMs, the LES selects the least heavily loaded LES TDM (or if there is no load the next TDM on a Round robins basis). The loading is based on the number of bytes already allocated on the appropriate TDM interleave queue. If no LES TDM exists with spare capacity, the LES attempts to send the message over the same Common TDM that the mobile logged into. In either case, the [ANNOUNCEMENT] goes out over the Common TDM that the mobile is logged into. If a mobile does not receive the [ANNOUNCEMENT], i.e., because it is scanning, the LES repeats the [ANNOUNCEMENT] following the normal protocol rules.

The mobile sends an [ASSIGNMENT REQUEST] on a signalling channel associated with the Common TDM it is logged into. The LES sends a [LOGICAL CHANNEL ASSIGNMENT] which assigns a message channel associated with the Common TDM. Protocol packets to mobiles will always be on the Common TDM that the mobile is logged into. When the message completes, the [Confirmation] packet is sent (it was requested by the mobile). Unreserved data reports can generally be transmitted on the signalling channels belonging to Common TDM (s). Reserved data reports can be allocated on any signalling defined for reserved data reporting belonging to the Common TDM the mobile is logged into. The reasons for this are as follows:

The Program poll is an individual poll, this contains no TDM frequency, just the [LES ID].

The initiate poll can be a Group poll, and will therefore have a TDM frequency, but it can also be an individual poll and hence it will not have a discrete frequency.

As the mobile may only have an [LES ID], it must use the TDM frequency associated with the [LES ID] from the LES descriptors in the [Login ACK].

When a mobile logs in (Common TDM), and after verifying that this is a 'real login', the LES needs to check if the mobile was programmed for reserved data reporting. A 'real login' is distinguished from a 're-login' as per the following example: A MES is powered down and then up again later (e.g., a lorry driver parks for the night, turning the ignition off). The MES power up causes a login packet to be sent, but since the MES never logged out and is logged into the same spot beam it was previously logged into, the LES treats this as a re-login with simpler handling. A re-login will not require the mobile to be reprogrammed for data reporting.

A 'real login' occurs when a mobile moves across a spot boundary or a mobile logs in after an explicit logout. That is, if a DNID was associated with this mobile, then it will be invalid in the new 'logged into' spot and the mobile needs to be moved. The 'already assigned' DNID reservations associated with that mobile for 'this' spot needs to be initiated. If there are not any, then the operator will be informed. In order for reserved data reporting to work the following rules need to be followed:

All mobiles belonging to a DNID need to be logged into the same Common TDM. This needs to be handled by the load balancing code.

A mobile can only be a member of a single DNID in each Spot. A mobile to DNID association is required.

In order to accomplish this, a list of reservations per DNID (s) associated with a particular mobile is generated. To implement this functionality the following operations/functions are required:

When an EGC is started the EGC handler task requests the list of common TDMS supported in the spot. A delivery of EGCs to all common dispatchers is treated as a single call with respect to the MH component, i.e., failure of any delivery causes all deliveries to fail. MH is informed of call success when the last EGC of each batch completes. A mobile ignores any repeat EGCs once it has successfully received a complete EGC transmission.

If a distress EGC arrives while in the processing of a normal priority EGC over multiple dispatchers then the normal priority EGC will be failed back to MH. The distress priority EGC will then be handled.

A call record will be logged for every delivery except delivery attempts that are never started due to a failure in a previous call and the agent task entering idle. The call records for deliveries except the last have the last delivery attempt set false.

The EGC agent task needs to clear down any pending batch EGCs when the first EGC of a group fails.

Group and area polls are transmitted over each of the common TDMs in the spot. Transmission is stopped once any transmission fails. Individual polls are sent over the common TDM that the mobile is logged into.

The terrestrial interface allows the user to select either a single spot or all spots when submitting Group and Area EGCs and Polls. The spot names and numbers used in the terrestrial interface may be different to those used internally within the system to allow greater geographical connection to be used. This is illustrated in the example below where the steered beam spot that covers Alaska and Hawaii is split (at least as far as the user is concerned) into more meaningful spot IDs. The proposed spot names for the X.25 interface are as follows (note that not all of these may be used initially or more may be defined later):

| Spot Name | X.25 Spot Number | System Spot Number/Name |
|---|---|---|
| Eastern | 1 | 1 Eastern |
| Central | 2 | 2 Central |
| Mountain | 3 | 3 Mountain |
| Western | 4 | 4 Western |
| Alaska | 5 | 5 Alaska/Hawaii |
| Mexico | 6 | 6 Southern |
| Hawaii | 7 | 5 Alaska/Hawaii |
| Puerto Rico | 8 | 6 Southern |

Extending the X.25 user interface this would give the following dialogue when submitting EGCs:

0=Enhanced Group Call
2=DNID Access
4=Message Submission
6=Cancel Message
8=Message Status Enquiry
9=Polling
99=Quit
Service: 0
Region (0=All, 1=AOR-East, 2=POR, 3=IOR, 4=AOR_West ): .Spot
Spot Number (0=All, 1 to 8):

| Spot Number | Spot Name |
|---|---|
| 0 | All Spots |
| 1 | Eastern |
| 2 | Central |
| 3 | Mountain |
| 4 | Western |
| 5 | Alaska |
| 6 | Mexico |
| 7 | Hawaii |
| 8 | Puerto Rico |

This change in the selection criteria for region will also apply to the submission of Group and Area Polls.

Ocean region names currently appear in the following human interfaces.

Alarm printer
Reports
Route forms
Satellite event object name
Satellite forms, including Channel unit Rack defs, etc.
Terrestrial banners
Terrestrial prompts and help text
Terrestrial status enquiries
Terrestrial delivery notifications
Interface definition documents
Operator guide document
System manual document With the change to spot beam working, ocean region names are changed to spot names wherever they appear, with the exception of references to the channel unit racks and the FEP pairs driving them which use an Ocean Region alias that identifies the FEP pair. The system utilizes a Store and Forward protocol designed for low volume, low speed access in order to minimize the equipment costs at the MES.

According to standard data protocols, as described previously, the data transmission is set up for a fixed time period and the average message size is assumed to be approximately 1,000 characters. The protocol operates under the rule first in, first out (FIFO). The standard protocol take the messages in the order that they arrive, and fills up the TDM for output to a destination in turn. Unfortunately, when the TDM is built or filled in with the received messages, it has been determined that the use of a FIFO methodology is extremely inefficient.

The reason of the inefficiency of the standard protocol is because the TDM frame is 8.64 seconds, and contains 600 bits per second total, so on the average having approximately 750 characters per frame. The 750 characters per frame means that for messages that average 1,000 characters, there is needed more than one frame per message. Furthermore, the TDM is the only output port and thus is used for three things. The TDM is used for:

(1) the bulletin board, which takes the average of about somewhere between 60 and 100 characters itself every frame,
(2) the protocol packets to the mobile terminal which takes up additional characters, and
(3) messaging.

So the effective amount of characters that can be used in an actual frame is approximately 500 characters. Each packet within a frame is approximately 128 characters. Therefore, a 1,000 character message is broken up into nine 128 character packets, plus one smaller packet. As described, only approximately 500 characters are available for messaging. Therefore, there are only approximately four packets that can be used for transmitting the actual data message to the destination. In addition, of the 1,000 message, only 2½ frames can be utilized for a 1,000 character message because of the overhead associated with the transmission and receive channels.

The average time then to transmit the message when there is no backup in the queue will then be as follows. First, since it takes two frames to transmit the message to the LES from the mobile, for example, and each frame takes 8.64 second, a total of 17+ seconds is required to transmit from the LES. In addition, there is a delay in getting the message started. The way the protocol works is as follows. An announcement is sent to the mobile that there is an incoming call on a specific frequency to be received. The mobile must then respond indicating that it received the page from the LES, and that it is ready to receive the message. The call announcement and response takes approximately three frames, adding another 25 seconds to the call. Therefore, the total message time is approximately 40 seconds using this simplified or estimated methodology. However, for actual transmission, the delay can be more depending on the load of traffic on the LES.

To add one more dimension to this communication protocol, during that 40+ seconds another message may have arrived. If during that 40+ seconds five more messages arrived at 1,000 characters each, each of these messages are output on the FIFO basis. The fifth message therefore has four messages in front of it at 40+ seconds each. Therefore, it has been determined that the fifth message will likely be delayed for 200+ seconds.

The improved data transmission protocol minimizes the time data resides on the hard drive of the LES. It has been determined that the improved data transmission protocol should not be strictly based on a FIFO priority. It has further been determined that it is beneficial to simultaneously transmit as many messages as possible, while understanding that there is a limited number of characters (approximately 500) that can be used for messaging in a frame. In this connection, it has been determined that in the land mobile environment, the average message size is 50–60 characters, instead of 1,000 characters. Therefore, it has been determined that the packet size can beneficially be drastically reduced in a majority of the messaging situations. Thus, the improved protocol drastically changes the traditional philosophy, and transmits as many packets and messages simultaneously into smaller frames.

Therefore, the improved protocol analyzes the received message size. In addition, the improved protocol overlaps the set up time for the announcement with the messages that are currently going out. Therefore, announcements are being broadcast to the next group of mobiles for which the LES has received a message, while messages are being simultaneously transmitted to mobiles. FIG. 12b, illustrates the basic or overall arrangement of the entire message transmitted from the LES to the mobile. In FIG. 12b, the message 2, is divided into section 4 that contains bulletin board data, section 6 contains protocol data such as the announcement received from the LES, and section 8 contains data describing the received message. Once the announ cement has been received by the mobile, the protocol is designed so that the LES will transmits the first packet for that message within one minute from that announcement. The LES cannot delay too long, because the mobile might. drop the call due to inactivity. In addition, the protocol requires a certain amount of time for the mobile to become ready to process the call. Therefore, there is a relatively small window of time for the LES to transmit the message. If the LES transmits too slow, the mobile will drop the call. If the LES transmits too fast, the LES might get too ahead of itself and then go outside the one minute window of time.

In accordance with the above observations, the improved protocol interweaves the messages when received and sorts the messages based on message size. Messages are advantageously sorted into short, less than one packet—128 or smaller; medium, which is two or three packets at most; and long, anything above three packets. In addition, when each of these messages have been received by the LES, each of the three messages are simultaneously transmitted. Therefore, announcements for each of these three messages are also simultaneously transmitted.

Figure 12A:
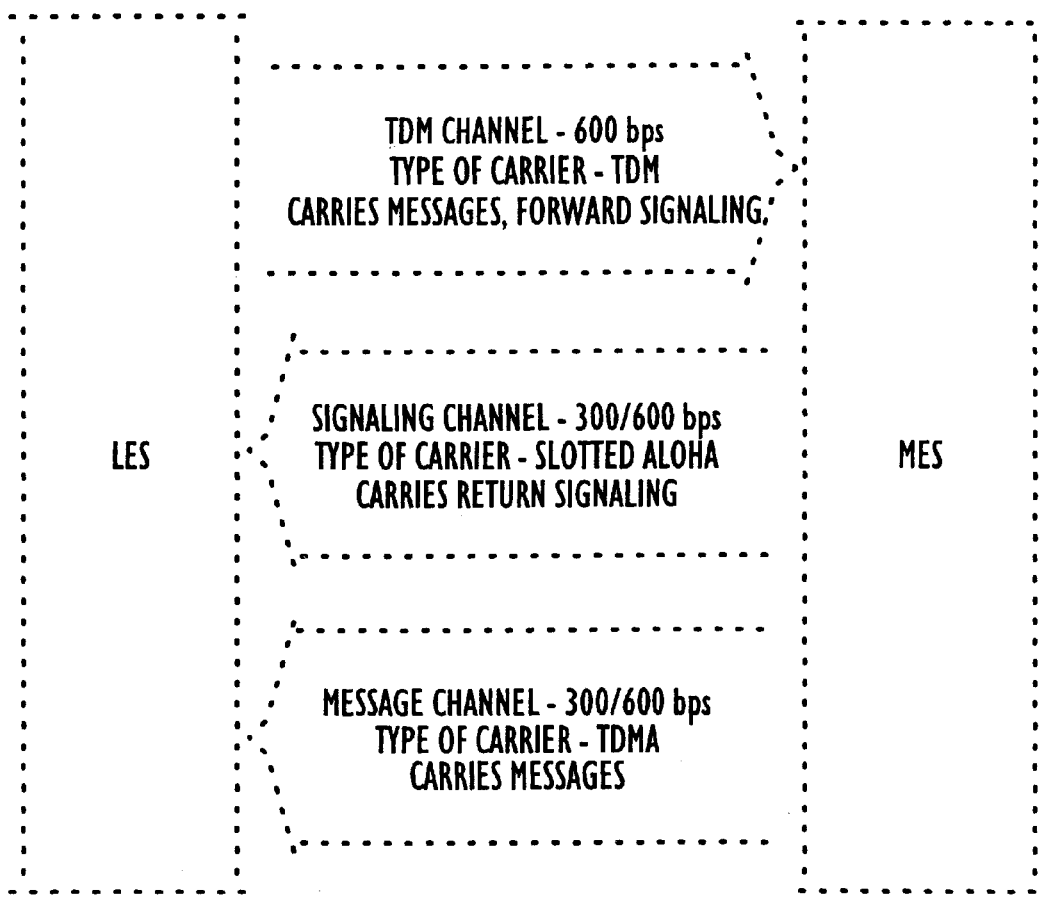
FIGS. 12a–12f illustrate the three types of satellite channels available for communication, and the sequence of simultaneous message transmission.
Figure 12B:
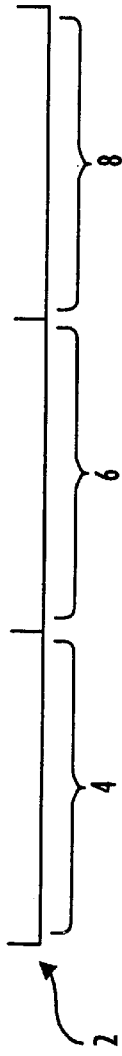
Figure 12C:
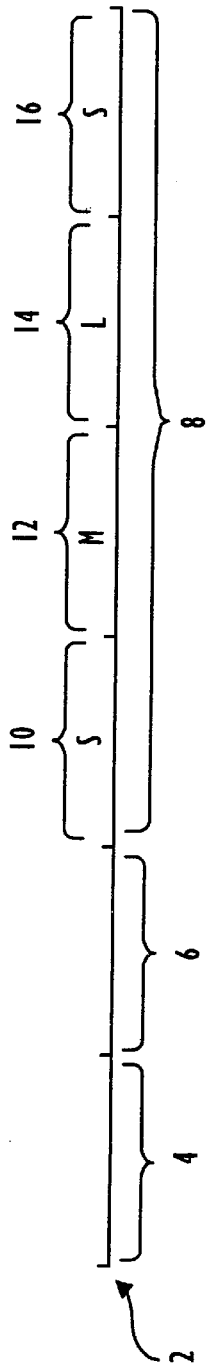

Thus, the first time around, when there are several short, medium and large messages in the queue, the first three frames will have a short (S) 10, a medium (M) 12 and a large message (L) 14, as illustrated in FIG. 12c. The fourth frame will then be filled with a small message (S) 16. Therefore, only one packet is used for each short, medium or long message, even though by definition the medium and large messages require more than one packet. Advantageously, there are now four messages that are being simultaneously transmitted instead of one. Thus, the LES can transmit messages faster and continue to use the TDM channel to its fullest capacity.

Figure 12D:
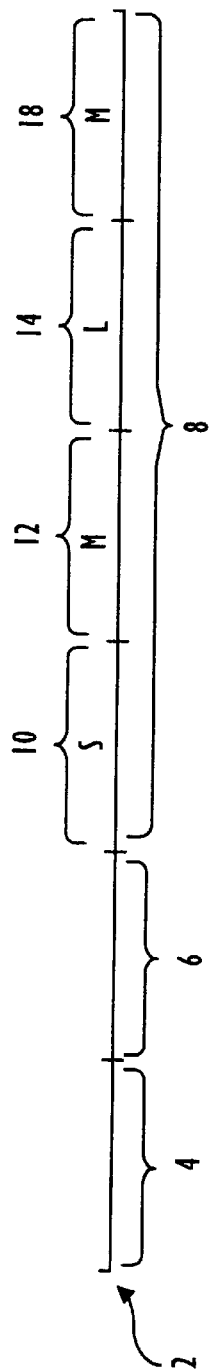
Figure 12E:
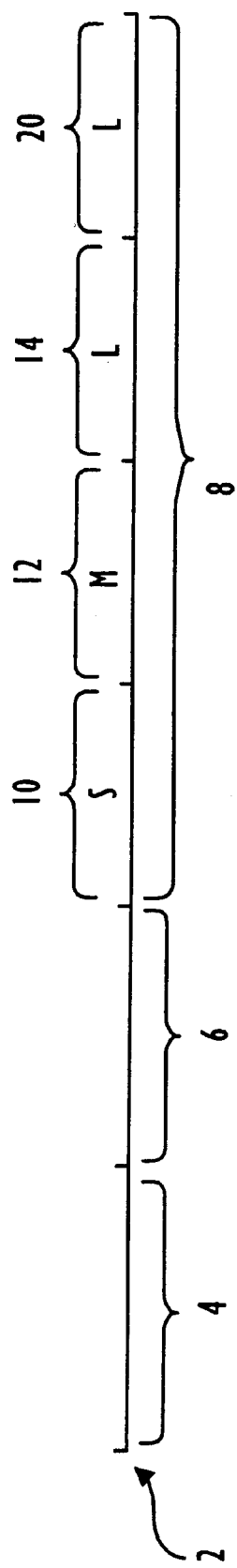

If there is not another short message available, then the next frame of a medium message (M) 18 will be placed therein as illustrated in FIG. 12d. If there is not another short message available, then the next frame of a large message (L) 20 will be placed therein as illustrated in FIG. 12e. Therefore, the priority is generally short, medium and long messages. Of course, other priority schemes may also be utilized that may be considered useful, depending on time of day or year, traffic load, and the like.

In addition, there are also required multiple announcements going out to get all these calls started at the same time. Announcements of each of these calls occur separately. Thus, the improved protocol further contains multiple announcements in one frame for each message that is being broadcast. In the above example, there will be four announcements broadcast when there are four messages going simultaneously. All mobiles receive the announcement frame of the message and determine if the identifier contained therein is their own. If the identifier in the announcement does not contain the mobiles identifier, then the mobile disregards the message.

The improved protocol also provides enhanced timing of announcement messages. We have determined an effective procedure for transmitting announcement messages to mobile terminals. It has been determined that there is a limit to the number of announcements that may be transmitted while maintaining appropriate reception of messages by the mobile terminal.

The basic restriction is the mobile call time-out timer generally requires a response within 60 seconds from when the announcement is transmitted. Assuming, as discussed above, that the frame size is 128 characters, and 75 characters can generally be transmitted per second (600 bps divided 8 bits per character), then to transmit a frame requires 1.7 seconds. Therefore, for a one minute interval, the LES can transmit approximately 24–26 packets (60 seconds divided by 1.7 and reduction for additional overhead). Therefore, there can be no more than 24–26 short messages being transmitted during a one minute period. There will be fewer messages than the 24–26 when the messages comprise medium or large. Therefore, up to 24–26 announcements may be transmitted up front and still all the messages can be transmitted within the next minute, depending on the message size.

For example, assume there are five short messages, one long, one medium. The first frame will contain two short, one medium and one long message. The second frame will contain two short, one medium, one long. The third frame will contain one short, two medium, and one long. Therefore, the number of messages that can be transmitted is variable depending on how many medium and long messages are present. Therefore, one aspect of the protocol transmits four frames per message including multiple messages, and multiple announcements between three and six frames ahead of time. Less than six frames because 6 frames is approximately equal to 24 packets since each frame includes approximately four packets of messages. More than three frames because the mobile terminal requires a certain amount of time to prepare for receiving the message. Therefore, the improved protocol provides a more planned way of doing and coordinating multiple announcements. As a result of transmitting multiple messages simultaneously, the amount of store time for these messages is minimized in the LES while maximizing call completion.

An additional improvement to the communication protocol includes changing the message packet size from 128 to 64 characters on the outgoing channel. This would then double the amount of messages that may be simultaneously transmitted by the LES. It has been advantageously determined in this connection that the average message size is between 50 and 60 characters, thereby permitting a smaller packet size without jeopardizing call completion.

Using a packet size of 64 characters only changes how the message packets are queued. For message packets of 128 characters, small was defined as less than 128 characters, medium is less than 378 characters, and large is greater than 378 characters. For the improved message packet of 64 characters, the new definition of a small packet is less that about 64 characters, medium packet less than about 192 characters, and large packets greater that about 192 characters. Therefore, the 64 character packet size changes the ratio of messages coming forward, and furthermore, it permits eight messages to be simultaneously or concurrently transmitted.

Figure 12F:
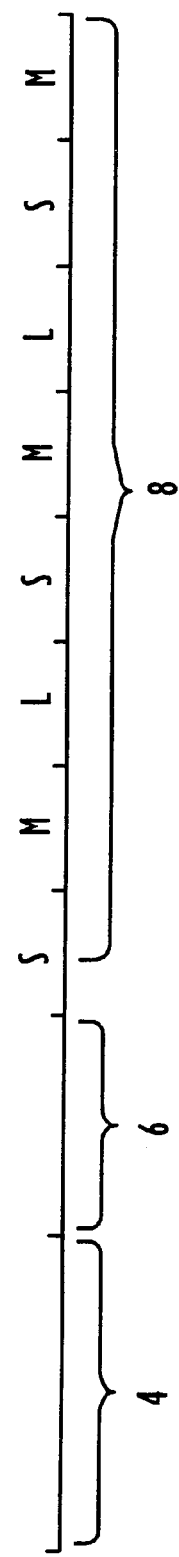

The priority for transmitting the smaller packet size of 64 is as follows, s-m-l, s-m-l, and s-m when there is a sufficient number of all s, m, and l messages for this eight packet scenario as illustrated in FIG. 12f. If the number of short messages completes first, then the next highest priority of messages is the medium packets, and then large. Of course, other priority schemes may also be utilized that may be considered useful, depending on time of day or year, traffic load, and the like. Therefore, there can be eight simultaneous calls at once as compared to the previous four calls. But by doing that, the call that is being delivered takes a little bit longer, however, it gets up to the front of the queue much faster.

The main benefit is that there is not the disadvantage of storing messages for long periods of time and risking loss or more complicated coordination with the mobile. Rather, the ability to simultaneously transmit more messages permits the LES to fill up the TDM as much as possible so there are not many empty spaces in transmission frames. Therefore, the TDM usage is also maximized, conserving important satellite resources.

In addition, a further enhancement includes modifying the mobile terminals to change the standard one minute call completion timer to be two minutes, At first glance, this does not appear to assist in shortening the time for transmission of a message from the LES to the mobile terminal. However, by increasing and, in this example, doubling the call completion timer, the LES capacity is thereby doubled as well in terms of permitting twice as many calls to be simultaneously transmitted. Therefore, the LES would now have the ability to transmit announcement between 3 to essentially 12 frames ahead of time. Therefore, the LES has the ability to have a lot of calls in process, thereby maximizing usage of the TDM resources of the satellite.

According to the prior communication protocol, not all of the message frames were utilized to full capacity, and therefore, TDM resources were not completely utilized since it was based on the FIFO communication process. This aspect of the improved protocol provides two advantages. First, the improved protocol maximizes the utilization of the output channel. In addition, because there are simultaneous calls, the back up of the store is minimized. To help guarantee that the satellite resources are not overused, the average number of calls per mobile per day is measured. In addition, the message size for each of the messages is also measured. The average message size and the average number of calls indicates the total requirement that the LES system should handle to satisfy all mobile terminals. That is, the total utilization or requirement is going to be the average number of calls multiplied by the average message size.

To further ensure that the LES properly utilizes the satellite resources, the amount of required TDM is also determined for the busy hours of transmission. For example, if TDMs will be loaded with 70 or 80% capacity at peak time, then determine the available capacity. Therefore, for the busy hour, the available capacity dictates the number of mobiles in the system so that there is no overload of the TDM at the busy hour, because once the store becomes overloaded, messages will not get transmitted fast enough. Therefore, to determine the appropriate number of mobiles to log into the system, the number of TDMs that are available are divided by the capacity, resulting in a maximum number of characters. Since it has been determined that mobiles output messages of average length of between 50–60 characters, the maximum number of characters is divided by approximately 60 to determine the maximum number of mobiles or messages that can be using the LES system during the busy time of transmission.

FIG. 12a illustrates the three types of satellite channels available to support this improved protocol and service.

TDM Channel

All LES to MES (LES-MES) communication is broadcast on a 600 bps Time Division Multiplex (TDM) channel. In the system, an ocean region will correspond to a spot beam while the MSAT satellite is operational. The TDM channel carries all outbound signalling and messages, and carries the transaction response messages. The TDM transmission is divided into TDM frames. Each TDM frame is 8.64 seconds long and includes 639 bytes (including control information). The 8.64 second frame length provides exactly 10,000 frames per day, where frame zero occurs at or around midnight. The data of a frame is interleaved and encoded using forward error correction (FEC) encoding so that the data can be properly recovered even if portions of the frame are lost. (Note: this is interleaving of data within a frame transmission, not interleaving of messages.)

The LES builds the TDM frame data out of packets that are pending transmission, using transmission priority rules. Space at the end of the fame goes unused if the pending packets do not fit, except for message and Enhanced Group Call (EGC) single header packets which the LES splits across frames (by splitting one packet into two). Each packet contains a packet type (indicating the packet format), a packet checksum used by the MESs to detect invalid packets, and optionally an MES address.

Signalling Channel

MES to LES (MES-LES) call requests, acknowledgements, and other signalling packets are transmitted on slotted ALOHA signalling channels. The LES receives multiple signalling channels per TDM, and the MES population accesses signalling channels on a contention basis with randomizing and retransmission in case of collisions. The signalling channels are configured to operate at 300 bps or 600 bps depending on how much satellite power is available. A data rate of 300 bps is used in first generation satellite mode, and a data rate of 600 bps is used in second generation satellite mode.

The bandwidth of a signalling channel is divided into 15 byte slots that are accessed by MESs using a slotted ALOHA access method. A first generation signalling channel has 14 slots per TDM frame, and a second generation signalling channel has 28 slots per TDM frame. Data within a slot is encoded, but the slots within a frame are independent. The MESs transmit signalling packets in slots. These packets contain packet type and checksum information; and so fewer than 15 bytes are actually available for data. Most signalling packets fit into a single slot, but the protocol has provisions to continue packets across slots. The continuation capability is used for the data reporting service, which allows a packet to span up to four slots.

Message Channel

MES-LES Store and Forward messages are transmitted on message channels. The LES receives multiple message channels per TDM, and the LES allocates message channel bandwidth to MESs in response to call request signalling received on signalling channels. The individual allocation effectively provides scheduled TDMA access by MESs for message channels. The message channels operate at 300 bps or 600 bps depending on the satellite generation. Message channel data is also transmitted in packets containing checksums, but these packets are much larger than the signalling channel slots.

A set of satellite channels including the TDM and associated signalling and message channels is called a TDM Group, and the LES coordinates access to the return channels in the TDM group using the TDM. Slotted ALOHA access to signalling channels and TDMA access to message channels require that all MESs share some master timing source. The frame timing is transmitted by the LES on the TDM.

The LES transmits four categories of packets on the TDM:

Bulletin Board (BB)—provides overall control information for the TDM Group, including whether the return signalling channels operate in first generation or second generation mode. The BB packet is transmitted in every frame.

Signalling Channel Descriptors (SCDs)—provides reservation of signalling channel slots and acknowledgement of received data in signalling channel slots. The signalling channel descriptor defines the return channel frequency, indicates whether any data was received in each slot, and indicates whether the slot is reserved. The LES sets a bit in the signalling channel descriptor indicating a valid packet has been received in a signalling slot, and the transmitting MES looks for that bit to signal that the data was received by the LES. Otherwise, the MES assumes a transmit collision with another MES has occurred and implements a back-off before repeating the transmission in another randomly selected slot. The MES sets a continuation bit in its transmitted slot if a packet is to be continued across several slots, and, upon receiving this signal, the LES marks the slot reserved in the signalling channel descriptor so that other MESs will not transmit in that slot.

Signalling packets—These include various packet types providing control and acknowledgement signalling.

Message packets—These include packets of Store and Forward messages being sent to MESs. Messages are sent as series of up to 125 byte packets.

The channel framing has the following consequences for the protocol timing:

1. The whole set of data for a TDM frame must generally be encoded and decoded at the same time. Consequently, an MES must receive an entire 8.64 second frame before extracting even the first bit of data from that frame. Each step in the protocol involves a frame of an 8.64 second duration.

2. Framing implies that the LES or MES will have to wait 4.32 seconds on average (half a frame) to transmit.

This value is valid for an MES only if that MES can transmit in the first bit of the next return-frame. In practice, the MES randomly chooses an available slot in the upcoming return-frame, and so on average would wait another 4.32 seconds (i.e., choose a slot in the middle).

3. An MES which transmits a packet continued across multiple signalling channel slots must await acknowledgement of the first slot before transmitting the second continued slot. The acknowledgement takes a considerable amount of time due to the interleaving, encoding, satellite delay, slow data rates, and processing time, and is not received in the next frame or even the following frame. Rather, the signalling channel protocols work on a three frame cycle called three frame slots. Thus, any frame protocol step that requires a burst protocol response will require a total of three frames or 25.92 seconds (3*8.64). Basically, the three frames periods are one to transmit. the data from the MES to the LES, another for the LES to read and set the acknowledgement bit in the signalling channel descriptors, and the third to transmit the acknowledgement back to the MES. An MES which transmits the first slot of a continued packet in frame N will receive the signalling channel descriptor acknowledgement in time to transmit the second slot in frame N+3, the third slot in frame N+6, etc. Note that the TDM and return-frame timing are offset so that the MES has time to de-interleave and decode the signalling channel descriptor in time to determine whether it can continue transmission in the next return-frame.

4. Each time the protocol changes from one type of channel to another, the MES has to tune to a new frequency. The LES will always allow a delay of 25 seconds, normally covered by the three frame slots, to allow for the tuning to take place. The tuning of the system includes the MES changing the hardware frequency selection, finding a burst at the new frequency. No synchronizing to the TDM frame when the MES changes between TDMs is needed. The LES accepts the input with the burst rather than waiting for the full timer to pass.

5. The signalling channel is used in a slotted ALOHA contention mode. Because of collisions, the throughput of slotted ALOHA channels degrades rapidly above 30% utilization, and response time is severely affected by collisions at higher utilization levels. In first generation mode, 30% utilization means that no more than four packets per frame (30% of 14 slots) are planned and lower throughput is desirable if response time is important. Additionally, error recovery procedures exist to allow for retransmission on the signalling channel.

MES to Terrestrial Message Protocols

To understand the implications of the protocol restrictions, a detailed frame timing diagram for an MES to LES call as presented in FIGS. 13a–13d. Within the protocol, the frame timing diagrams show that the minimum MES to terrestrial message time is greater than three minutes for a short message. Messages consisting of 40 bytes of inbound data and 300 bytes of outbound data, both of which fit within one message frame or TDM frame, are defined as the 'minimum message'. The response is assumed to be independent from the request because there is no linkage between any two given messages.

Using the normal message protocol, a MES to terrestrial message requires a minimum of over 3 minutes including some processing time for the terrestrial system. This minimum time requirement is examined in more detail for three reasons:

1. Over half of the time, the detailed frame analysis involves setting an idle wait timer at the end of a call for some 113 seconds. The actual idle wait timer is 130 seconds, but the overlap with the transmission and receive frame brings it down to 113 in the case of MES to terrestrial calls.

2. There are a number of places within the protocol where the call takes much longer.

3. There are subtle points in the protocol that may diminish the benefits of adding a new protocol or message type.

The minimum time requirements for message handling is adversely affected by the 130 second timer at the end of each call. After a response packet for a call clear is transmitted on the TDM Frame, informing the mobile that the call is completed, an idle wait timer is started. If the mobile misses this frame due to a bad checksum in the frame read, it will not be able to read the call clear acknowledgement or deliver the message to the DTE. The current protocol supports a one minute timer at the MES to wait for this last packet to arrive.

Even after the one minute has passed, the mobile must transmit a mobile status request message to the LES, wait three frames for the acknowledgement of the status request, and wait another frame or two for the status response to make up for the missed data. More time may also be required in case the status request transmission has a collision on the signalling channel, and thus has to be retransmitted. By the time these factors-are added, the 130 second idle wait timer makes sense.

In reality, this full 2 minutes and 10 seconds is not always lost. While it is true that the mobile is marked busy for that period of time, the effect is more complex. Since the mobile is marked busy, -no calls to the MES can be started during this time, a fact will effect a response message. However the MES begins another message once the call clear packet has be received from the LES. The LES, on receiving another assignment request, will cancel the MES response timer and allow a second call to be accepted.

Likewise, the LES does not have to wait for the timer to clear before the message can be forwarded to the terrestrial side. Since the protocol is built to be robust, the LES makes the assumption that the call protocol will be completed and initiate the terrestrial signalling while the idle wait timer is running. The LES-to-terrestrial timing after the receipt of the message is estimated based on the following steps for the minimum call case:

1. The first step, estimated at 3 seconds, is to buffer the message from the Front End Processor (FEP) to the Background Applications Processor (BAP) and store the message in the Store and Forward message file. Also associated with this step in the call is the logging of the call record for the MES to LES portion of the call.
2. The second step, estimated at 2 seconds, is to make the output half of the call active, determine the correct output route, assure that LES does not already have a call to this terrestrial address, and to pass the call to the terrestrial driver. Other LES systems also have access to telex, FAX, and X400 destination routes. The output step is done by the code process that will be referred to as the Store and Forward (i(S & F)) process.
3. The final step, the actual terrestrial access, estimated at 5 seconds, is to create the call connection, transmit the 40 byte packet, clear the call properly, and acknowledge the Store and Forward process that the call has been delivered. Based on completion of the terrestrial processing, including retries if necessary, the call record is logged for the LES-to-terrestrial portion of the call.

While these call timings are approximate, the seconds spent to deliver the terrestrial side of the call we have determined are insignificant when compared to the idle wait timer. The call can complete two minutes earlier, but unless both the LES and the MES agree to this delivery, there can be major problems. Without the final steps, the mobile operator may think that a call has been delivered to the LES when in fact it has not. The two minute timer allows for retries to take place if there is any potential problems, and if the timer expires with no retries, the call is assumed to be complete on both ends. If the worst case should occur, and the protocol between the MES and the LES fails, the billing issues can be handled properly.

Any call through the Store and Forward system is advantageously considered two half calls. The first half of the call is getting the message from the message provider to the LES and is logged for billing purposes with and incoming call register. The second half of the call is the delivery of the call from the LES to the destination address and the billing data is logged in a delivery call register. When there are multiple addresses for a call, there will be multiple delivery call registers corresponding to the original incoming call register. In the unusual case that the LES-to-MES protocol fails at the end of all timers for some reason, the final call records would have shown an incomplete call in the incoming call record and a completed call for the delivery call record. In the rare case where this happens, the billing center should not bill for the message delivery for if the message was important, the MES operator would likely retransmit the call.

Thus, after examining the idle timer issue and overlapping the terrestrial delivery with the idle timer wait, we have determined that the minimum time for a MES to terrestrial call is 3 minutes and 6 seconds including the 210 second idle wait timer.

Listed below are some of the more common problems we have determined that can occur during the processing of a MES to terrestrial call. In each case, the current protocol solution is also explained.

1. Burst Collision on the Signalling Channel

The possibility of collisions on the burst signalling channel is handled in two ways by the protocol.
  a. For each burst properly received, a Signalling Channel Descriptor Burst Detect Bit is set in the next frame by the LES to inform the mobile that data has been picked up on the particular burst slot. When two equally strong bursts are received an overlap of data is possible, and the LES does not set the burst detect bit.
  b. When a collision does occur somewhere in the messaging protocol, higher levels of the protocol detect the error, and the MES requests a status from the LES to determine what point in the protocol path the LES thinks has been reached. When this point is determined, the MES retransmits the lost packet or packets.

The concept of setting the signalling channel descriptor assumes that when a collision occurs (two mobiles burst into the same slot), the burst detect bit will not be set. Based on an empty burst detect bit, the mobiles will determine that their corresponding burst was missed, and reschedule their transmissions. The reschedule algorithm is very time consuming from a single message perspective. Currently, each LES defines the number of frames over which a randomizing interval is to be assumed. The mobile reads the randomizing interval in the TDM frame, picks a random frame from this group, and repeats the burst in a random frame and slot. There is no guarantee that another collision will not occur. Currently the randomizing interval is set to 15 which adds on average seven and a half more frames to the call time, or 7.5*8.64=64.8 seconds.

2. Message Channel Already Busy

When examining the mobile to terrestrial call, the message frame and slot is assigned by the LES to be mobile for the inbound message. In the example given in the framing diagrams in FIGS. 13a–13d, the first frame available after the burst request response is used to minimize the total call time. Instead of the call being accepted early in the protocol, there can be a delay of from one frame to more than five minutes before the message transmission begins. The delay depends on a combination of the number of message channels, the average length of messages being received and the number of simultaneous messages being submitted. The delay practice is advantageously allowed and encouraged in the current protocol. If a mobile tries to make a call to the LES and the message channel is already defined ahead to its maximum length, the mobile is sent a message that the channel is pending. The pending transaction allows for one LES to fill its message channels and then go back to an MES when it has free message bandwidth available again without the MES automatically turning to another LES. When a mobile receives a pending transaction, it is supposed to go back to the common channel to wait for its assignment. The whole process is designed to get the maximum usage out of the message channels.

The message channel busy problem is minimized in the LES by two methods:

a. Have enough message channels to allow the load to be kept at a generally low level with the exception of peaks. If traffic is beginning to become heavy on all defined message channels in the TDM group, then increase the number of message channels.

b. The LES is set up to assign a call to a free message channel rather than one that already has a call in progress if there is sufficient resources of message channel unit cards. Likewise, if all of the message channels have a call in progress, the LES will assign the call to the message channel that will first become idle, but still the call will delayed by the amount of the previous call transmissions. If the average call size is 1000 bytes, and the average number of message channels is eight then with the speed of 300 bps, more than 3 seconds would be added to the end to end delay of an average call. If the average message size increases, this delay time also increases. In a recent call volume analysis, the average call size was found to be 4500 bytes, and the end to end delay would then be increased by 15 seconds.

3. TDM Overloaded

The TDM channel(s) is the only method to transmit data from the LES to the MES population. TDM transmissions must include standard data in the TDM frame, i.e. the bulletin board, a signalling channel descriptor for each signalling channel in the TDM group, any protocol packets to any mobile, and the actual messages that go to the mobiles. The TDM frame is 639 bytes long but there is usually only 500 to 600 bytes available for the message data after the protocol information has been included. The TDM message space has to accommodate all of the mobiles in the TDM group, so again there are situations where long outbound messages will tie up the TDM group and delay the transmission of messages.

In the case of MES to terrestrial messages, the TDM is used only for protocol packets to the MES from the LES. The protocol packets have a slightly higher priority than normal message packets and they since they are small packets can be added into any free space in the frame. If there are both a large number of messages and an associated large number of protocol packets, the protocol packet responses will receive priority with normal message packets being delayed one or more TDM frames. Each frame of delay adds 8.64 seconds to the end to end message delivery time.

4. LES Has Heavy Processing Load

The variation of the load can have some small bearing on the response time of the overall message. In each type of call, there are steps where a response has to be sent from the main processor to the mobile. These responses are sent on the TDM in the frame in which they arrive, or one frame later, depending on where in the frame time they arrive at the satellite driver Front End Processor (FEP). However, if the main processor is heavily loaded, the response time increases, causing packets to miss the minimum frame and/or arrive one frame later. While this does not hurt the overall protocol at all, it does add nearly nine seconds to the overall time for a call to complete every time it happens.

The solution to this problem we have determined is not to overload the main processor. Processor overloading is really a long term problem at the point of system maturity. At the current time, the speed of the channel units is the limiting factor in the system, and until the number of channel units and the number of total message transactions grow significantly, this issue should not be a significant problem.

5. Message Packet Fails Checksum Test

Each packet that transmits over the satellite has an associated checksum to verify that the data that finally arrives at the destination is intact. When the checksum test fails, some number of packets has to be retransmitted to get the correct data.

6. Terrestrial Network Busy or Congested

The terrestrial network being busy or congested occurs, but can be considered a rare event. However, if the delivery network is congested or slow to respond, this extra time is again added to the overall call time. Not being able to deliver any call to the terrestrial network results in the LES executing retry procedures. Terrestrial network delay means that the current call in process will be put on a delay queue for some number of minutes before attempting a secondary retry. If the call fails again, the call will be retried only if the defined retry count has not been exceeded when the next timeout is reached.

7. Terrestrial Address Busy

Terrestrial address busy is just another case that can be solved by the retry timer, but we have determined is a much more common problem. For example, the desired called party is busy answering someone else's call request and can not respond to the TFR call request. Again, the minutes of the retry timer will apply to the call delivery time. Busy terrestrial addresses we have determined is a problem that does need to be watched carefully by the operations staff since it can have severe impact on the overall performance of calls to the that user. A more subtle problem associated with this situation is to have one logical call from the LES active with a call to the data provider, and then attempt to make a separate logical connection for another mobile, thus getting a internally generated busy condition.

In the LES system, there is an internal check to make sure that the same address is not called while a call is already corrected. However, while this check eliminates the internal busy situation, it still causes a delay in the overall time to respond to the secondary request. One potential solution to this problem would be for the destination uses to have logical channels that could be addressed by a subaddress number. By giving each MES an NUA number with a random subaddress included, the number of address matches would be minimized. A second alternative is to have follow on calls for the terrestrial deliveries as are provided for the MES deliveries. While follow on calls would not eliminate the delay, it would eliminate call set up processing between calls. The follow on capability will be dependent on whether the X.25 protocol supports such a feature and significant LES changes.

8. LES Congested or Terrestrial Incoming Connections Busy

LES-to-terrestrial connections busy is equivalent to terrestrial address busy above but on the LES side. If there are insufficient logical channels available to the LES to handle normal inbound and outbound calls, then there may not be a logical channel available when a response is needed to a request. Again, we have determined that the solution is to monitor the logical channel utilization and increase resources as call volume increases.

It has been determined that a MES to LES message cannot be used as the message request to message response situation due to the minimum time required for this message. Further, even with other changes to the protocol, it has been determined that there exists the following potential problems:

1. The current message protocol tends to optimize the satellite channel usage. Overloading the satellite channels results with potential delays for the caller when using the message channel to send in messages or when using the TDM channel to respond to the MES.
   However, from the system standpoint, the largest volume of data is passed in the available bandwidth on the message and TDM channels. For the protocol, this is exactly the right emphasis since the satellite bandwidth is the most expensive resource.
2. The current message protocol is optimized for an average message size of 500 to 1000 characters, much more than generally necessary.
3. The utilization levels can have tremendous effect on the end to end call delivery time.
4. The most significant impact on the satellite portion of the protocol is the portions that deals with the message channel. The long retry time for the collision correction significantly increases the message delivery time from the MES to the LES.
5. The largest impact on the end to end delivery time is the busy terrestrial user.

Terrestrial-to-MES Message Protocols

This section will address calls initiated from an X.25 user terminal being sent to a mobile terminal. To understand the implications of these restrictions, a detailed frame timing diagram for an LES to MES call is presented in FIGS. 14a–14e. The frame timing diagrams show that the minimum terrestrial-to MES message time is greater than three and a half minutes for a short message considered within the 'minimum message'.

Using the message protocol for a terrestrial to mobile call requires a minimum of about three and half minutes after including some processing time for the terrestrial acceptance and routing. The delay on the terrestrial side is transparent to the LES system but will not be ignored by the originator of the call. If the originator is overloading his outgoing lines, the X.25 network between the originator and the LES is congested, or the LES has insufficient logical channels that can be used for incoming calls, there can be a major terrestrial to LES delay. Originators having longer than usual outgoing delays should be examined for one or more of these potential problems.

The minimum time requirements for message handling is adversely affected by the 130 second idle wait timer at the end of each call. In the case of an LES to mobile call, this timer allows for the mobile to request a retransmission of the actual message if any data is missed or in error. The protocol currently supports one lost frame while still completing the call. After a response packet is transmitted on the TDM Frame informing the mobile that the call is completed, an idle wait timer is started. If the mobile misses this frame due to a bad checksum in the frame read, the mobile will not be able to read the burst detect acknowledgement or deliver the message to the DTE. The current protocol supports a one minute timer at the MES to wait for this last packet to arrive. Even after the one minute has passed, the mobile must transmit a mobile status request message to the TFC, wait three frames for the acknowledgement of the status request, and wait another frame or two for the status response to make up for the missed data. More time may also be required in case the status request transmission has a collision on the signalling channel, and thus, has to be retransmitted. By the time these factors are added, the 130 second idle wait timer makes sense.

The call completes two minutes earlier, but unless both the LES and the MES agree to this delivery, it has been determined that there can be major problems, including billing problems. Without the final steps, the LES may bill for a call that was never delivered to the mobile operator. The last two minute timer allows for retries to take place if there is any potential problems, and if the timer expires with no retries, the call is assumed to be complete on both ends.

The estimated minimum call time is minimum not only because the smallest message size was used, but also because the frame timing diagrams assumes absolutely no problems will occur during the protocol. However, the various error conditions and error handling need to be examined because this error processing will effect any final request and associated response messages. Listed below are some problems that occur during the processing of a terrestrial-to-MES call, some of which are duplicated from the mobile to terrestrial call analysis. In each case, the current protocol solution is also explained.

1. Burst Collision Occurs

In the LES to MES portion of a call, the MES still has to burst into the signalling channel to send the assignment response packet. The possibility of collisions on the burst signalling channel is handled in two ways by the protocol as explained in detail in the MES to terrestrial call section. It has been determined that the signalling collision delay time turns out to be one of the most significant delay factors in the protocol.

2. TDM Overloaded

The TDM channel(s) is the only method to transmit data from the LES to the MES population. TDM transmissions must include standard data in the TDM frame, i.e. the bulletin board, a signalling channel descriptor for each signalling channel in the TDM group, any protocol packets to any mobile, and the actual messages that go to the mobiles. The TDM frame is 639 bytes long but there is usually only 500 to 600 bytes available for the message after the protocol information has been included. The TDM outgoing message space has to accommodate all of the mobiles in the TDM group, so again there are situations where long outbound messages will tie up the TDM group and delay the transmission of messages.

Allocation of the TDM channel is optimized by the LES in two ways:

a. For the calls that are currently active, the TDM can be interleaved, i.e., multiple calls can be transmitted simultaneously. Instead of using the entire bandwidth of the TDM with single long message, a packet(s) from the long message can be transmitted in the frame along with the packet(s) from shorter messages to another MES. The LES attempts to break messages into packets of 135 bytes to allow for 4 packets per TDM frame. Of course, this packet area will further subdivided if only smaller packets are scheduled to sent. If the load is heavy, and there is a good mix of messages, these 4 packets could be from four different messages, for example, two from short messages, one from a medium size message, and one from a long message. On the other hand, if there are two long messages is the system along with a heavy load of short and medium size messages, the second long message could be delayed until the first long message completes.

In the example that is given in FIGS. 14a–14e, the full 300 character message is transmitted in the first frame available after the burst and acknowledgement process between the LES and the MES is complete. However, a multiple packet message requires many frames to transmit if the TDM is shared among many messages so that only one packet may be sent in each TDM frame. Thus the 300 byte message could take three frames rather than one frame, adding another 17 seconds to the total message time. The time can be even longer if there are several small messages to be processed that are all of the same priority. In this case, the message in question will be delayed by a previous message. If each of these messages are also in the range of 300 bytes, another 26 seconds is added for each message in the queue ahead.

b. If there is a peak of messages to be sent on the TDM frame, the announcement for the outbound message is not sent at the first available frame, but some minutes lat<<when the message can be scheduled into the TDM transmission.

Messages in the LES can be placed on the TDM outgoing queue based on the message type, thus giving some messages priority over other messages. Priority type section is exactly the way that Distress messages receive priority over normal messages.

3. Overlapping Calls

The protocol does not generally have the concept of associated calls. Thus, between the time that the call request is accepted into the system from the MES, another terrestrial originated call to the mobile can be processed. As soon as the inbound message is finished, the mobile can be assigned to accept this pending outbound message. Starting a new call means that the expected outbound response message is delayed until after a the normal terrestrial message is sent. Because a message response to a request is expected, there is now concern about messages being out of order for the first time.

The multi-message delay will not be for the full protocol because the LES already has the ability to transmit follow-on calls to a mobile once it has started to receive messages. But the delay for the actual message text cannot be eliminated in this particular case under the protocol.

4. LES Has Heavy Processing Load

The variation of the load can have some small bearing on the response time of the overall message. In each type of call, there are steps where a response has to be sent from the main processor to the mobile. These responses are sent on the TDM in the frame in which they arrive, or one frame later, depending on where in the frame time they arrive at the satellite driver Front End Processor (FEP).

However, if the main processor is heavily loaded, the response time decreases, causing packets to miss the minimum frame and/or arrive one frame later. While this does not hurt the overall protocol at all, it does add nearly nine seconds to the overall time for a call to complete every time it happens. Processor overload is a long term problem at the point of system maturity. At the current time, the speed of the channel units is the limiting factor in the system, and until the number of channel units and the number of total message transactions grow significantly, this issue should not be a significant problem.

5. Message Packet Fails Checksum Test

Each packet that is transmitted over the satellite has an associated checksum to verify that the data that finally arrives at the destination is intact. When the checksum test fails, some number of packets has to be retransmitted to get the correct data. The protocol defines retry procedures for each of these cases. A request for a retry from a mobile to an LES depends on a signalling burst. To receive new information requires a minimum of three frames and usually requires four. That is, if there is only one frame to be sent a second time. Again, this common error can easily add another 30 seconds to the protocol and may add minutes depending on other factors. The ability to verify a checksum on a packet of a longer message advantageously allows for the protocol to transmit only part of a message rather than the entire message when data is missing. Considering the speed of transmission, this feature is required.

6. Terrestrial Network Busy or Congested

Terrestrial network busy or congested occurs, but can be considered a rare event. As stated earlier, this situation has already occurred before the LES even sees the message to be delivered.

7. Terrestrial to LES Connections Busy

Terrestrial to LES connections busy is equivalent to the problem of terrestrial delivery delay above but on the LES side as the call receiver. If there are insufficient logical channels available to the LES to handle normal inbound and outbound calls, then there may not be a logical channel available when a response is needed to a message input. The logical channel utilization is to be monitored and increase resources as call volume increases.

From the previous examination of the protocol, it can be seen that a protocol picture cannot be used in a message request to message response situation and consider a combined two minute send and receive time. Further, even with other changes to the protocol, it has been determined that there exists the following potential problems:

1. The current message protocol tends to optimize the satellite channel usage. Overloading the satellite channels results with potential delays for the caller when using the message channel to send in messages or when using the TDM channel to respond to the MES. However, from the system standpoint, the largest volume of data is passed in the available bandwidth on the message and TDM channels. For the Protocol, this is exactly the right emphasis since the satellite bandwidth is the most expensive resource.

2. The current message protocol is optimized for an average message size of 500 to–1000 character. Much more than generally needed.

It has been determined that the following are several significant facts regarding the protocol:

1. The end to end call time grows faster in the to MES direction at the low utilizations than the from MES direction since the signal channel is used twice rather than once, and collisions on the signal channel are very costly in retry time.

2. The end to end call time is less dramatically impacted at the high utilizations since terrestrial circuit blockage is not a factor and the delay on the TDM is really rather small.

3. The concept of the system to run the TDM at 100% utilization to optimize the use of this channel. Until the TDM is well overloaded, the delay from the TDM channel alone is not significant in the long call delay times seen with overall system utilization.

4. It is important to remember changes in average call size can add bigger delays not only to the transmission time, but also to various of the retry times and thus have multiple impacts on the end to end call time. Larger message sizes will also tend to overload the TDM channel quickly.

5. Bad transmissions causing checksum errors, which can often occur within the design approach to this system can easily add a minimum to 30 seconds to the overall call time, and adds much more if the full retransmission of a long message is required.

6. Delays in the real world will not work according to this simple assumption. which could have either positive or negative effects on the values given.

Request Response Using Message Protocols

The concept of call request with an associated terrestrial response is foreign to the protocol. The protocol is a Store and Forward protocol which assumes that each call is independent, regardless of its direction. The advantages of considering the use of the normal message protocol are that no changes in the system will be required and there is no limitation on either addressing or message size other than those already accepted as standard. Using the normal message protocol requires a minimum of over six minutes after including some processing time for the terrestrial system. As discussed, this time is derived by adding the MES to terrestrial and the terrestrial-to-MES call times together. The round trip call time grows much larger as the level of system utilization increases.

Even if the idle wait time, which accounts for slightly more than half of the minimum call time, could be eliminated, the round trip time would still be over three minutes. The idle wait timers serve two purposes:

1. The idle wait timer provides a window in which packet retransmission takes place without a specific protocol sequence to complete the call. The call is assumed completed due to lack of negative acknowledgement To eliminate this idle timer, the protocol would have to be modified to put in a positive acknowledgement instead. While the concept of a positive acknowledgement could reduce the total call time by 130 seconds in each direction, not all of this time can be can be gained. The 3 frame access, as explained earlier, implies that the positive response will require at least 3*8.64=25.92 seconds. Further, the positive response would have to be another signalling packet, an area that has already been shown to be adversely effected by an increase in system load.

2. Secondarily, the idle wait timer currently acts to stop new messages from being delivered to a MES to assure that the previous transmission is completed. While the positive response could do much the same processing, the problem remains that there is currently no correlation between input and output messages from the MES perspective. In other words, there is currently no way to guarantee that the next output to an MES after a transaction request will be the response to that request and not just some other message to that MES.

The issues associated with error conditions is discussed next.

1. Burst Collision Occurs

Adding a positive response message to the message protocol would add an additional burst in each direction of the call. Because of the assumption that most burst collisions are ignored, the retry time on a true collision is more than a minute, and this factor alone tends to push the average message time much higher under load utilization To keep this problem from happening would require additional signalling channels to be added to each TDM Group.

2. TDM Overloaded

The TDM channel(s) is the only method to transmit data from the LES to the MES population and would thus have to be used for the additional messages from the LES to add the positive response message type. Since the TDM transmissions are done on a frame by frame basis and are controlled by the LES, the retry time is much smaller. Regardless of this fact, the positive response would add another protocol packet to the load on an already heavily used resource.

3. Overlapping Calls

The protocol does not have the concept of associated calls. Thus between the time that the call request is accepted into the system, another call to the mobile can be processed, and as soon as the inbound message is finished, the mobile can be assigned to accept this new outbound message. The initiation of a secondary call means that the outbound message response is delayed until after a secondary to mobile message is sent. Because a message response to a request is expected, there is now concern about messages being out of order for the first time in the protocol. A positive response protocol would have exactly the same problems, they would only occur a little sooner. For the concept of a request-response message to work, software will have to be added to keep the ship not only busy but looking for a response message only. However, special response message processing might imply that follow on calls will not work when a MES is waiting for transaction response and will add another possible delay point to all other messages associated with an ME'S that can have transaction type requests.

4. LES Has Heavy Processing Load

As implied already, adding a positive response will only increase the problems with heavy processing load, which will occur in three ways:

a. There will be a higher rate of collisions on channel for MES to LES positive notifications. Collision rates can be helped to some degree by an increase in the number of signalling channels.

b. There will additional burden on the TDM channel for the LES to MES positive response acknowledgements. New TDM channel utilizations cannot be offset in the current configuration and thus would force the addition on new TDM groups at an earlier stage.

c. The necessity to hold a MES for the transaction response would become a new point for potential delays in all other types of messages.

5. Message Packet Fails Checksum Test

More packets needed for the positive response protocol will only exacerbate this problem also.

From the previous examination of the Protocol, it has been determined that a protocol picture cannot be used in a message request to message response situation. Further, even with other changes to the protocol, it has been determined that the following problems still exit:

1. The total time is more than 50% over the goal in each direction even in the best case.

2. The current message protocol tends to optimize the satellite channel usage. overloading the message channels results with potential delays for the caller when using the signalling channel, and more importantly for the LES when using the TDM channel to respond to the MES.

3. The current message protocol assumes much more inbound messages from the MES population than outbound messages to the MES population because there is a high message channel to TDM channel ratio. For the message request and response transaction, this ratio is reversed.

4. The current message protocol does not recognize any relationship between any two messages and in some cases this relationship is difficult to implement 5. The current message protocol is optimized for long message transmission times, the opposite of short messages.

Polling

This section will discuss the enhanced service of polling and the associated response data reports. In addition to the normal message protocol, the protocol also supports two forms of enhanced services, 1. polling and data reporting, 2. and enhanced group calls.

Polling and data reporting give the user a poll, response capability with data being logged to a mailbox on the LES. Polling and data reports work on closed networks. A closed network is a group of mobiles defined to be owned and operated by a registered user and is referenced by a Closed Data Network Identification number (DNID). A closed network is defined in the LES with a fixed amount of data storage capability that can be used to store data reports or messages from mobiles that belong to that closed network. The LES can optionally also make mobiles belong to only one DNID by associating that DNID number in the mobile list with the particular mobile.

Polling and data reporting is really an end to end protocol that is used transparently by the user with the LES acting only as the mailbox. A user addresses an individual mobile, part of the closed group, or the entire closed group by using a poll message. A poll message can be initiated by the user from a registered user session as part of an X.25 calls. In the systems environment, the common channel and the LES TDM are the same channel, so polls are broadcast on the TDM along with normal protocol packets and normal messages.

In the implementation, the poll message is limited to 256 bytes. However, with header data and space reserved for the polling details, the actual data size is limited to 232 bytes of information. Most polls contain outgoing information in this datu area even though the main purpose of the poll is usually to request that information be delivered from the mobile to the mailbox. In the current protocol there is already a polling message denoted as "Data Transmission" that is specifically designed to deliver data to an MES(s) in the DNID group.

Each poll message is addressed to a DNID group, and it is the responsibility of each mobile in the region to look at all poll messages to see if the message is addressed to a DNID group of which it is a member. Each mobile belongs to as many as 64 DNIDS. Within each DNID, and included in each message is a value called member number. The member number is controlled totally by the user, and allows the usa to address an individual member of the DNID group. The LES has no knowledge of which mobile corresponds to a member number within a closed network.

The response to a poll can be defined by the user to be a data report, a message, or nothing. A data report is a very short message that can be delivered on the signalling channel and consists of one to four bursts of data. A prime example of how data reports can be used is the data report used for position location. The poll message is currently generated by the use within the X.25 screen formats provided by the LES. The poll message, when generated is passed to the LES to be transmitted on the common channel. The data in the poll is considered transparent to the LES and is not associated with any other message. The user addresses the entire DNID group, an individual group member within the group, or using special codes addresses mobiles within geographic regions such as ocean region or even rectangular or circular area from a given latitude, longitude point.

The user can also ask for a response to a poll, a response of either a data report or a message. However, since the poll and response used in this method is transparent to the LES, there is no checking by the LES that polls have been responded to by the LES. The verification of the response is a function to be done by the user rather than the LES. When the user submits a poll message, it is treated as another message in the LES to be transmitted on the TDM channel but with several special attributes:

1. The poll message has a slightly higher priority than normal messages, and thus when there is a short poll message and a short normal message needing transmission, the poll message will be sent first.
2. The completion of the message protocol, including the idle wait timer, does not apply to poll messages. The LES simply forwards the message on the TDM and leaves it as an exercise for the mobiles to pick this message. No response is expected from the LES perspective. The no response approach causes the transmission time to be minimum, but does not guarantee that the message arrives are the desired mobile. The chances of a mobile missing a poll are advantageously reduced system environment since the Common channel and the LES TDM are the same. The mobile can be receiving a normal message with its mobile identification and at the same time be receiving a poll with its DNID designation. If this overlap should occur, it should be noted that any poll response will be delayed until the full normal message has been received and responded to.
3. Still if a mobile is sending a message, it will be tuned to the message channel and thus miss the poll message. Because there is no high level protocol on poll messages, there is a definite chance that poll messages will be missed. To remedy this situations the poll message always has the option of asking for a mobile response, either in the form of a datu report or a message and/or a data report acknowledgement. The originator of the message will have to gather the data in the reserved DNID mailbox area, examine the data to determine that the expected response has been received or start the transmission process all over again if the expected response fails to be delivered.
4. The response, when given at the direction of the user is simply logged to the mailbox from the LES perspective. The LES assumes no correlation between the original poll and the response, either in the form of a data report or a message with the original poll message.
5. Polls are currently limited to 232 bytes of real data. There is an expanded protocol supported for longer poll messages.

The concept of using the poll as a response will minimized the time delay on the return side, but a detailed examination of the current poll protocol is needed to find potential errors that occur. It has been determined that the minimum poll time is less than 20 seconds which is a vast improvement over the three and half minute message response time. However, the time is saved by essentially offset by losing all message security. There are a series of potential problems that have been determined and that will be discussed in the following paragraphs:

1. The first problem associated with the poll message has already been mentioned, the fact that the poll can be missed totally by the MES if it is in transmit mode.

The concept of a data report response to a poll was added to help eliminate this problem, but even responses cause problems that will also be discussed as another weakness of the poll message. If a poll response is added to the poll message to eliminate missed polls, the minimum response time now goes up to 37 seconds, but this is only the time taken to get the acknowledgement to the mailbox.

2. The second problem with the poll and data report response is that the response can be easily missed. Data reports are submitted as signalling channel bursts, and as discussed in connection with the message protocol, this is a high probability of collision on the signalling channel. Further, in the case of messages, a collision will be detected eventually in the protocol to recover the message. Higher level recovery is not true with data reports, where the data is submitted and if the signalling channel descriptor is set, the mobile assumes that the data report was delivered. However, the fact that all collisions with the exception of two very strong signal bursts are ignored by the LES to keep from having noise slow down the overall protocol in turn make the probability of missing data reports increase. The problem could be resolved if the LES did not ignore any collisions, but the many noise collisions would slow down the overall protocol for all types of call, not only the polling data report response messages.

3. The third problem associated with the poll is that the verification of the acknowledgement is really rather difficult, especially if time is an issue. Assuming that the poll was seen by the mobile and that the data report response was accepted correctly by the LES, the normal data report response is only logged to the mailbox. For the user to get the response, he then has the responsibility lo pick up the mailbox file, referred to as a 'DNID Download', and then examine all of the data downloaded to attempt to find the proper data report response. In order to be relatively certain that the response has arrived, the user will have to wait enough time to make sure that the response has indeed been logged to the DNID mailbox. By looking at the slower response times with the system is loaded, it seems that the user will have to wait about 2 minutes to have a good chance of making sure that the response has been received and has been correctly logged to the proper DNID file. Adding a few more seconds processing time to this delay will mean that the poll and data report response is now over two minutes. While this time is somewhat better than the a normal message response, it is also the full time allocated as the goal for transaction and response message, and it is still added to the full message input time.

4. The fourth problem is that the LES cannot be involved with the response verification because the message was based on the mobile ID and the response is based on the DNID, a correlation that is not available to the LES but only to the user. Not only does this fact inhibit faster error checking, it keeps the problem of another message being started to the mobile while the mobile is waiting for a transaction response open.

5. On top of these problems, if the mobile missed the poll, the LES fails to properly accept the data report response, or the data report is not logged to the DNID file before the user does his download, the process will have to start all over again. Repeating the full process will of course double the response time to make even longer than a normal message response, and there is still a chance that the message will fail on the second attempt for all of the reasons that it failed on the first.

6. To assume that the user will have the ability to verify the poll response from the user end for a transaction request response is simply not practical.

The first enhanced service provided by the LES is the ability for the user to define a closed network that has an associated mailbox data file in which to store messages. Further, the poll message is provided to request information from the DNID member and the data report is provided to give the mobiles the capability of sending short message responses on the signalling channel rather than waiting on the message channel. The mailbox can also be used to store messages addressed to the DNID mailbox. However, it is the user's responsibility to log into the LES to download the messages that have been stored in the mailbox and keeping the mailbox cleared.

It has been determined that the poll, even with data report response, is not usable in the transaction response exchange for many reasons:

1. The basic concept of a poll with response in exactly the opposite direction that would be needed for a request response message.
2. The message size is extremely limited.
3. The poll can be missed by the mobile.
4. The data report response can be lost due to signalling channel collisions.
5. The LES has no way to keep other messages from being inserted in the middle of the transaction response message set.
6. The verification of the response is both difficult and time consuming.
7. The retry for a failure of any type is to repeat the entire protocol sequence with at least doubles the time and may be even worse.

The data report provides a mechanism to get a message to the system without using the message channels. However, there are several limitations to the data report capability. Since the data report is transmitted on the signalling channel, it is limited to a total of 15 bytes. To handle longer messages, the protocol currently allows for data reports to have as many as four packets, or the initial packet and up to three continuation packets. The first packet has to include specific information such as the DNID number (two bytes), the member number (one byte), the LES number (one byte) and the data report category (one byte) thus supporting only seven bytes of data space. Each packet after that has to reserve a byte to denote the packet type and continuation bit plus two bytes for packet checksum, supporting up to twelve bytes of information. Therefore, the number of packets in the data report depends on the message length as follows:

1 Packet=1 to 7 bytes of data
2 Packets=8 to 19 bytes of data
3 Packets=20 to 31 bytes of data
4 Packets=32 to 49 bytes of data.

As can be seen from above, the current use of the normal eight bit IA5 character set limits data reports up to 49 characters but only if all four packets are used. The data length restriction could be changed by either adding to the number of packets received or by changing the data set to be 6 bit character (or even 5 bit characters) that would have to be unpacked at the application level in a new fashion. Increasing the number of packets would increase the time of transmission as discussed below. Changing the input character set to 6 bits would eliminate all control characters and many special characters. Using a 6 bit character would still allow for both upper case and lower case letter, the digits, and many special characters. Using a 5 bit character set as is done in telex would limit messages to only the upper case character set. However, if the 6 bit character set is assumed, 4 characters can be made to fit into every 3 bytes and the above table becomes:

1 Packet=1 to 7 bytes of 1 to 9 characters of data
2 Packets=8 to 19 bytes of 10 to 25 characters of data
3 Packets=20 to 31 bytes of 27 to 41 characters of data
4 Packets=32 to 49 bytes of 42 to 65 characters of data The packing to 6 bit characters change implies that a 40 character message can be sent in 3 data packets. Likewise, if a telex type character set is assumed, 3 characters can be packed into every 2 bytes of data since a character uses only 5 bits and this table becomes:

1 Packet=1 to 7 bytes of 1 to 10 characters of data
2 Packets=8 to 19 bytes of 12 to 28 characters of data
3 Packets=20 to 31 bytes of 30 to 46 characters of data
4 Packets=32 to 49 bytes of 48 to 73 characters of data Packing of characters into data bytes gives slightly more message length, but will require modifications in the Mobile applications software and any user software that attempts to read data report. Since users are effected, it is not recommended for this reason alone. However, it should be considered if message time becomes a predominant problem as is explained in the protocol timing paragraph.

The processing in the LES of data reports involves a number of steps. The satellite driver front end processor in the LES holds all of the data report continuation packets until the last segment has arrived. Once all of the segments can be concatenated into a single message, the full data report is passed to the main processor. The main processor decodes the header information in the datu report to determine the DNID number and then stores the data report in the disk mailbox associated with that DNID number. Currently, if the mailbox area is full, the data report is discarded so it is important that the user not allow his mailbox area to overflow.

Once material has been added to the DNID mailbox file, the LES has no further responsibility with the data report. The user accesses the data report mailbox file as a normal function of an X.25 registered user session. The user has the capability to download the data to his own computer and to archive and delete the data if it is no longer needed. Because the mailbox capability is so easy to use, there are three other features that need to be mentioned.

1. The mobile initiates data reports independently with any poll request being sent.
2. The user programs the mobiles in the DNID to send periodic data reports and to stop periodic reporting using a series of poll commands.
3. The message protocol (as described earlier) contains the possibility that a message can be routed to a DNID rather than to a terrestrial address. This means that messages of any size can be sent to the mailbox for later retrieval by the user. However, it has been determined that sending DNID messages can use large portions of the defined mailbox data storage area and thus limit the number of datu reports that can be accepted by the LES.

Now that the data report input and storage is discussed, the timing of multiple packet data reports needs to be considered. The days report is a signalling channel burst, and under the normal protocol, three frames have to be used for each burst within the three frame slots. The three frames include the first frame in which the burst is sent, the second frame header in which the updated with the burst detect bit in the signalling channel descriptor is placed in the hardware buffers for frame encoding and forward error correction, and the third frame for the actual transmission of the TDM data frame. Thus the burst arrives in frame one, frame two sets the burst detect bit, within frame three the TDM is transmitted, and in frame four the mobile sees that the data report has been received by the LES by reading the signalling channel descriptor from frame two where the burst detect bit was set.

Since the three frame slot delay in known, data report timing is based on the first frame, so that the LES reserves the equivalent slot that was used for the original burst, just three frames later. If the first packet arrives in frame one and a second packet needed, the data report sent from the mobile in frame one contains a continuation bit. The continuation bit directs the LES to reserve the same slot in frame four that was used in frame one. The same would be true for frames seven and ten if packets three and four packets were needed. The final LES burst detect bit is received in frame 13 for a full four packet data report Assuming that the mobile has to wait half a frame to begin its transmission, the total time for a 40 byte data report message is 4.32+(12*8.64)=108 seconds. However, the last two frames are just notification to the mobile that the last packet arrived and can be overlapped with the terrestrial call time. The data report actually reaches the system 17.28 seconds earlier, or in 1 minute and 31 seconds. Thus the data report provides a faster message input but a very limited message size. The actual time for a data report to reach the system varies with the size of the message as follows:

1 Packet=4.32+8.64=12.96
2 Packets=4.32+(4*8.64)=38.88
3 Packets=4.32+(7*8.64)=64.80
4 Packets=4.32+(10*8.64)=91.02.

Two more frames are used for the final burst received bit in each case. If the character packing concept mentioned previously was implemented, the implications are that a 40 byte message could be transmitted is almost 30 seconds less time. The potential problems with data reports are identical to any other transmitted packet (i.e. the possibility of collisions). As was discussed earlier, the three frame slot is to allow the mobile to know that the burst has been received by the LES. If the burst detect bit is not set in the signalling channel descriptor, the mobile knows for sure that the burst was missed and can simply start the data report collision recovery process in frame four for the data report. However, if the burst detect bit is set, there is the possibility that a collision has occurred and that the mobile may be misled into thinking that its packet has been accepted when indeed some other data was received. Furthermore, since there is no higher level of protocol active in this case, the data report is totally lost since the mobile will not know to retransmit.

The lost data report would not have occurred except that the LES is ignoring most signalling channel collisions in order to keep the general noise collisions from increasing the average call end to end delivery time. The collisions processing approach is a tradeoff but depends on a realistic understanding of the real traffic in the system including ration of data reports to messages and average message length. The lost data report problem could be corrected if some type of acknowledgement was added to the protocol. An acknowledgement could be generated from the FEP to the sent on next TDM frame so that the mobile would be assured that the DR indeed was received. Remember that a data report is based on DNID number. The only messages that can be addressed to DNID numbers are polls. To be able to reply to data reports means that the LES would have to decode the data report to find the DNID and member number, and then create a pseudo poll message to that DNID and member number with some new type on it to acknowledge the data report. As already discussed in the polling section, there are also problems that cause polls to be missed also.

However, a significant issue we have determined about data reports is that they are simply logged to the DNID mailbox. Simply logging the data report means that while the data has arrived it is not acted upon until the user calls the LES, does a download of the data from the DNID files, then actually decodes the report for action. There is no way to tell how long this process could take, but surely it will be in times of minutes.

The time it takes to get the message to the user could be decreased by forcing the LES to deliver the data from a DNID file to customer without waiting for a download request. A DNID download could be done on several levels:
1. The download could be initiated from the LES to the users NUA number-whenever some percentage of the data reporting space reserved for that customer had been reached. Utilization download would give the user the chance to keep from overflowing his allocated file space, but would still require that the customer specifically ask for the all downloaded to be deleted.

This approach still has problems from a time perspective. When a customer receives long messages to a DNID, the downloads could be too often. If a customer receives too few data reports, the time between downloads could be longer than just waiting for the customer to request the data in the first place.

2. Data reports could be downloaded on a time basis.

Download by time would have the LES initiating a DNID download based on some timer interval from the completion of the last completed download. The time could be 1 hour, 15 minutes, every, two minutes, etc. The timer could be optimized by customer based on his own traffic mix which includes number of messages and average size of message. The negative to this approach is that there will be a new processor load added to the LES, with that load increasing as more customers require short duration downloads. Processing power used for this type of control will in the long run take away from processing time needed for calls.

3. Data reports could be automatically forwarded to the NUA number on arrival in a real-time fashion. Automatic forwarding would mean minimum response time from Mobile to user, but would definitely impact LES CPU utilization. For the message activity to seem real time, there would have to essentially be a virtual circuit between the LES and any user requiring this service, thus reducing the number of logical channels available for normal calls. The LES would generally be sending the messages out X.25 line, so it could dispense with the logging of messages to the mailbox but it would still have to log data for billing purposes. However, the mailbox capability must still be available in case the link to the usa is lost to keep form losing data totally. The 'immediate forwarding' concept is a complex implementation.

Thus, it has been determined that data reporting is not a very practical method to use as the input method of the transaction response message. There are potential problems with loss of data reports. There is currently no way to acknowledge data report receipt. There is no controlled way of knowing when a data report that is received will actually be processed.

Enhanced Group Calls

The second shore to mobile enhanced service is called the enhanced Group Calls (EGC). Enhanced group calls give a user the ability to transmit messages to mobiles defined under an Enhanced Group identification (ENID). The EGC group of Users concept can be accessed only with messages to mobiles, and includes no form of mobile to LES input capability. An example of an ENID user might be a weather service, who would broadcast hourly weather reports to all users who had signed up for the service and thus has been downloaded with the ENID Group ID.

The ENID groups are separate and distinct from DNID groups, but the numbering methods and access methods are similar. Polling under DNID groups is like a subset of message output under ENIDs. An enhanced group call can be sent to the group, an individual mobile in the group, and has the capability of addressing other special groups such as a particularly region or a navigational area. However, besides the fact that EGCs are output only, there are several major differences between EGC messages and poll messages:

1. An ENID is defined for the for the entire system while a DNID is defined by each LES. When each TDM group is considered a different ocean region, there can be 32,768 DNIDs in each ocean region, but only 32,768 ENIDs for the entire system application.

2. EGC messages have the advantage that they can be either short messages, like the 256 byte poll or long messages of up to 32,000 bytes in length.

3. An EGC message can be specified to be sent multiple times. For example, the original message can be repeated after 6 minutes. There are different intervals up to 48 hours some of which can be repeated after a six minute interval. The repeated message helps with the problem of missed EGC which occurs just like missed polls.

4. With polling, an acknowledgement can always be requested to close the communications loop. To be able to get an acknowledgement on an EGC would require protocol modifications.

The EGC message is currently generated by the use within the X.25 screen formats provided by the LES. The user generated EGC message is passed to the LES to be transmitted on the common channel. The data in the EGC is considered transparent to the LES and is not associated with any other message. The user addresses the entire ENID group, an individual group member within the group, or using special codes addresses mobiles within geographic regions such as ocean region or even rectangular or circular area from a given latitude, longitude point.

When the user submits a EGC message, it is treated as another message in the LES to be transmitted on the TDM channel but with several special attributes:

1. The EGC message has an equal priority with normal messages, and thus when there is a short EGC message and a short normal message needing transmission, the one arriving to be queued first will be sent first. However, by putting EGC messages at a lower priority, they would have less interference in the average end to end response time for normal messages, especially shorter messages.

2. The completion of the message protocol, including the idle wait timer, does not apply to EGC messages. The LES simply forwards the message on the TDM and leaves it as an exercise for the mobiles to pick this message. No response is expected from the LES perspective. The no response expected approach causes the transmission time to be minimum, but does not guarantee that the message arrives are the desired mobile. The chances of a mobile missing a EGC are less in this environment since the Common channel and the LES TDM are the same. The mobile can be receiving a normal message with its mobile identification and at the same time be receiving an EGC with its ENID designation. Still, if a mobile is sending a message, it will be tuned to the message channel and thus miss the EGC message.

3. Because there is no high level protocol on EGC messages, there is a definite chance that EGC messages will be missed. To remedy this situation, especially since EGCs can be used in as a distress output message by Maritime Rescue Centers is the ability for the user to specify multiple transmissions of each message.

4. EGCs are not limited to 232 bytes of real data as is true with polls, but can contain messages of up to 32,000 bytes. Obviously, the transmission time for and EGC is dependent on its length. However, if an EGC is limited to 300 bytes as would be the case if EGC were to be used as the output mode for the transaction response message, the EGC would be exactly the same as those given for the poll output message except that a two packet double header would be used.

The concept of using the EGC as a response will minimize the time delay on the return side. As discussed above in connection with polls, it is seen that the minimum poll time is less than 20 seconds. The time to broadcast a short EGC would be the same which is a vast improvement over the three and half minute message response time. However, the time is saved by essentially losing all message security. It has been determined that there are a series of potential problems that will be discussed in the following paragraphs.

1. The first problem associated with the EGC message has already been mentioned, the fact that the EGC can be missed totally by the MES if it is transmit mode. If the approach of using the retransmit is assumed to solve the problem, the time for an EGC now jumps to over six minutes, much longer than six minutes which is the smallest time defined in the current protocol. The minimum retry timer could of course be decreased, but there is still no guarantee that the message has actually reached any particular mobile without some form of positive acknowledgement.
2. The second problem is that the LES cannot be involved with message control in any way because the message was based on the mobile ENID and the response is based on the ENID, a correlation that is not available to the LES but only to the user. Not only does this fact inhibit any message control, it keeps the problem of another message being started to the mobile while the mobile is waiting for a transaction response open.
3. The alternative of adding an EGC acknowledgement does not exist under the current protocol. EGC address can be interpreted by the mobiles, but since this message type is outgoing only, there is no way in the LES to address an EGG acknowledgement to a mailbox or an NUA address at the current time.

Thus, an enhanced service provided by the LES is the ability for a particular user to define a closed network that has an associated enhanced group output address. The enhanced group call as a particular enhanced service does provide the extra flexibility to send large messages. However, it has been determined that the following problems occur:

1. The EGC can be missed by the mobile.
2. The LES has no way to keep other messages from being inserted in the middle of the transaction response message set.
3. No method of verification can be defined with the current data available.
4. There is simply no way to get a command response from this particular exchange as is currently defined in the protocol.

Transactions

1. Request Transaction

To have a transaction response message meet the 2 minute time constraint, the two half calls that are required are analyzed. If each half call can be completed in 45 seconds or less in the no load case, then the call will meet the timing goals and still leave some room for the slower response time as the system utilization increases. If one half call exceeds its budget of 45 seconds, the other half call will have to complete faster to offset the lost time.

An examination of the inbound, MES to LES, message will be done first. The two method of MES to LES communication are normal messages and the data report.

It has already shown that the overall time for an inbound message is about 3 minutes. Even if the idle wait timer can be reduced or overlapped in some way with the terrestrial access, the minimum time to get a message into the system is shown to be 65 seconds. However, nine ways that the message could be delayed were also discussed. It has been found that the actual time was five frames longer in the best case, or an additional delay of 5*8.64=43.2 seconds, and the actual message transmission was usually one frame later on the incoming side.

The number of bursts on the signalling channel are advantageously doubled from 14 to 28. The increased burst slots means that with the 30% slotted ALOHA limitation, the system can have eight burst per frame instead of four without causing undue collisions. If a new use for data reporting is to be created, it is very desirable to increase the number of bursts from 14 to 28 slots on each signalling channel. Besides the extra capacity for more burst traffic, the system doubles the message channel speed by a factor of two. While this may not help with the request/response message, it will certainly decrease the time for long messages in the system.

The total time for a 40 byte data report using four packets in the normal protocol is 108 seconds as taken from the discussion of data reporting. However, this time is really made up of 4.32 seconds to wait for a start of frame, and four packets each requiring three frame slot timing of 25.92 seconds, 4.32+(4*25.92)=108 seconds. The three frames are required to set the burst received. and the continuation bits to be read by the MES before the next burst is transmitted. The four frames are done independently because the data report can be of variable length, and until a packet is received at the LES, the LES does not know whether to reserve the next three frame slots or not. The last two frames of this time is the acknowledgement to the MES. The full data report is received at the LES in 17.28 seconds less. Since the acknowledgement time can be overlapped with the terrestrial segment of the inbound message, a four packet data report, it actually takes 91 seconds. As noted in the section on two frame slots, if 25% two frame slots are assumed, 25% of the data reports will be done in 4.32+(4*17.28)=73 seconds. In this case, the last frame is for the acknowledgement, so that the data report information is in the LES in 65 seconds. Using the assumption of 25% for two frame slots, the average data report delivery will drop to 84 seconds.

One alternative would be to change the assumption that the data report is variable in length If the system always assumes that the data report is four packets long, there is no need to worry about continuation bits in the transmission to know when to reserve the next frame. The continuation bits can still be used to reassemble the data report, but the system can, in theory, reserve the next three consecutive frames even if the second packet is the last packet to be transmitted. Thus, for the first packet, normal protocol is used and in the three frame slots, the burst detected bit and the continuation bit is set. The system can also reserve the slot on the next frames to allow all possible data reports to be transmitted in a total of 7 frames when including the signalling channel descriptor acknowledgement. Using burst after the first 3 frame acknowledgements gives the advantage of letting the mobile know that the initial burst of the data report was detected and that the other three bursts have reserved slots. The total time now becomes 4.32+(8.64*7)=64.8 seconds in the worst case where 3 frame slots are being used to set the burst detected bit. In the case of 2 frame slots, the last two bursts would arrive in reserved slots and the signalling channel descriptor acknowledgement time would be one frame, or 8.64 seconds less.

In the ideal case, the data actually arrives in the first 4 frames. The LES operates on the transaction request as soon as the data arrives thus changing the timing to be 4.32+(4*8.64)=38.88 seconds, within the 45 second goal. Of course there are two or three additional frames used to resolve the burst detection bits depending on which slot burst was originally chosen by the MES, but this time will overlap with the terrestrial call. Still, while this concept appears to solve the problems at first glance, the following major considerations have been determined:
1. A collision occurs in any of the frames where the slot has not been previous reserved. This would include packets 1 and 2 in the two frame slots area and any of the first 3 packets in the three frame slot area.
2. All data reports are assumed to be four frames long from a transmission perspective, because the normal protocol is skipped for the three frame slot.
3. The LES detects that this particular data report is not the normal three frame slot data report and needs to pick up the continuation packets in different frames than is normally done.

The first problem is difficult to resolve. In a data report, only the first frame contains the DNID and member number. Under the normal protocol, frames 2–4 are only burst into reserved slots so that the packets can be protected against collision and thus can be concatenated together in the LES to make up the full data report. It should be noted that if two mobiles both burst the first packet of an equal length data report into the same frame, either a collision will occur in which case the burst detect bit will not be set or one will be more powerful than the other and be accepted. If the first burst is more powerful. it is assumed that all bursts will be more powerful, and that one full data report will be accepted. This also means that one full data report was lost to the system.

However, if each of the continuation bursts is not reserved, a packet from another mobile hits a burst, for example with the first packet of a new data report. If the signal level for this new burst is higher, there would now be mixed packets when the LES puts the pieces back together, an unacceptable situation. The window is actually smaller for just like two frame slots, the LES could reserve the burst slots for burst 3 and 4, but cannot always be sure of reserving the burst slots for burst number two. But since this hole of frame 2 exits, it now becomes possible to get an invalid data report, where the first packet is from MES A, while the second packet is from MES B that had a stronger signal. This chance is totally unacceptable and eliminates the concept of having the data reports delivered in consecutive frames.

Even the case that seems supportable, really is not. The example given waited for the first frame to acknowledge before reserving frames 5, 6 and 7 in addition to the 4 that is normally reserved. But even this would not have worked if another data report was started legitimately in frame 2 in the same slot number. By starting another data report in frame 2, the slot if frame 5 is now needed both for the third packet of the first data report and the second packet of the second data report, and equally difficult situation.

There is no way to realistically use the frames within a multi-frame slot, so it has been determined that new way will have to be found to decrease the normal data report time of the average time of 84 seconds. The second alternative is to change the actual signalling channel used for these data reports. The bulletin board in each TDM frame defines the types of transactions that can be transmitted into a particular signalling channel. By defining a new type of signalling channel, the cards defined for this new channel type could be reserved for high speed request data reports only.

It has been determined that a much faster way to get data reports into the system is to use the dedicated signalling channel and send multiple bursts within one frame. The first data report packet can be randomized over slots one to seven instead of slots one to twenty eight. The second packet can be transmitted in the selected slot plus 7. The third and fourth slots, if needed, can be transmitted in the selected slot plus 14 and plus 21 respectively. The concept could even be expanded over multiple bursts for longer data reports if necessary. Using multiple bursts means that the full four packet data report can be delivered to the system in an average time of 4*28+8.64=12.92 seconds. By using every seventh slot in this fashion, the MES has 1.74 seconds between bursts on a second generation timing basis.

Using the multiple burst concept gives the best input time, but has a number of tradeoffs:
A whole satellite channel is dedicated for a feature that initially has minimal use.
Since the concept uses only one quarter of the channel as the randomizing interval, collisions should be considered:
1. The slotted ALOHA calculation shows: 35%*7 slots=2 messages per frame. Thus, using the multiple burst concept will limit the system facility to about 2 request data reports in any 8.64 period without causing collisions. When the load of these type of transactions gets higher, a greater number of dedicated channels will be required.
2. The problem of collisions on packets two through four is greatly reduced since reserved slots are defined in the channel concept The problem still exists when there is a real data report collision (all packets) rather than a single packet collision.

For the MES to LES request data report, the only feasible solution reduces the input to thirteen seconds by having a dedicated request signalling channel that supports multiple data bursts within a single frame from a single mobile. The request channel method assumes that four bursts are reserved for a request data report when they could be from two to four packets in length. The packet type can remain data reports or become a new type referred to as transaction request. The option of creating a transaction type can also become a flag to the LES that this message has to be forwarded immediately to a terrestrial user application rather than being logged into a DNID file.

Here is a summary of this solution as compared to problems and goals stated previously:
1. Time under 45 seconds:
   Reduces the time down transaction request time to 13 seconds.
2. A collision on data only frame:
   Less of a problem than first solution in that collisions can now occur only on the first frame. The problem of having two data reports of the same length colliding and causing the loss of a data report still exists.
3. Assume only 4 frame data reports:
   The basic concept will assume space for 4 data packets as soon as one is seen. The assumption that all data reports will be 4 packets will not cause any harm to data reports of less than 4 packets, just created unused slots in the transaction request signalling channel bursts. On the other hand, if 4 packets are always sent, there would no longer be any need for the continuation bit, the type byte or the burst detect bit which requires a full byte for storage. If the last frame and last byte was used for a checksum of all of the bytes of a 4 packet data report, the two byte checksum on each packet would not be needed either so that the data content of the data report could be increased another 8 bytes more than a 10% increase in data capability. In reality, message lengths can vary, but only in groups of 4 packets, i.e., 4, 8, 12, preferably with at least one frame between each group of 4 packets.

Note that the maximum number of packets in each Data Report does not necessary have to be the counts given.

While making potentially unnecessary reservations does decrease the capacity of the signalling slightly, the decrease in total transmission time make this a worthwhile tradeoff even for smaller messages.

4. Confuses the LES:

The confusion problem is resolved by defining a new packet type for the transaction request packet.

There is the inherent issue with the protocol that can allow a data report, or its equivalent transaction request to be lost when two mobiles attempt to used the same set of frame bursts. The transaction request messages are too important and have a minimum time response, so the MES needs to be sure that the original request has been accepted by the system. For this type of transaction, at least, the LES should send an acknowledgement packet to the MES. The time for the acknowledge packet would overlap with the terrestrial transmission and response transaction, and so it would not likely effect the overall timing budget.

A simple solution for a transaction input acknowledgement is to send a new poll type of message in addition to setting the burst received and continuation bits in the signalling channel descriptors. By adding this additional transaction, in the case where a collision has occurred, the MES whose message was accepted will be sure. The MES whose burst is not accepted would have a timer of x seconds after the last burst was submitted to receive its polling acknowledgment. On the time expiring, the MES can let the MES operator know that there has been a transmission failure while the call is being retried. The error response informs the operator that it could be another two minutes before the expected response will be received.

As was seen above in connection with the current protocols, the transmission time for a poll or an EGC is only approximately 18 seconds. Other issues to be considered yet include:

1. There can be addressing problems when trying to mix messages, data reports and polls, or EGC calls.
2. Attempting to use the data report as an acknowledgement to the terrestrial user is very difficult since these messages are only routed to a mailbox.

Both of these issues are really about how messages are addressed. The three modes of addressing in the current protocol is mobile number, DNID, and ENID. In the solutions so far, a data report like message is being redefined into a transaction request message. A data report normally is addressed with the DNID number which requires two bytes of data and the member number within the DNID group which requires an additional third byte of data. It would be much better from a control perspective to use the mobile number for the transaction request message. Using the mobile number can easily be done since 3 bytes is also the amount of space needed to store a forward ID or a return ID, and the internal numbers used by the LES to address a MES. The mobile number is used by the outside world, but within any LES, this mobile number is converted into a forward identification number to send any message to that mobile. Likewise, the mobile uses its return identification number when addressing any message to an LES By using forward and return identification numbers within all transaction response request associated packets. Based on the above, it has been determined that there are several advantages:

1. The mobile is known by the LES so that it helps in the transaction flow as necessary.
2. It will help with the security of the call by using only system internal data for addressing and it will allow for functionality of transaction type to be checked by a mobile number to assure that only qualified mobiles are attempting to use a specific type of transaction response message.
3. It will allow poll or EGC type messages to be used for quick broadcasts but with a mobile specified so that the messages can be ignored by mobiles that are not interested in the information.
4. The transaction request is no longer limited to a response to the DNID terrestrial account holder.

Therefore the transaction request message should include the mobile number in terms of forward or return identification numbers and that another packet type be defined as an acknowledgement type that is treated the same as a poll or a short EGC but that also contains the proper mobile identifier.

Assuming that a transaction request will be acknowledged in some fashion, and that this acknowledgement time will be overlapped with the terrestrial processing time, the total time for the transaction input time thus far is less than approximately 20 seconds. It has also been determined that the transaction request message channel approach to the transaction request is not influenced by the load on the system since the only potential interference is with processor utilization.

To solve the problem of collisions on the first, advantageously a set of timers has been added to the same table showing the delivery time of an acknowledgement to the request. The total delivery and acknowledgement time is less than 40 seconds with no load and only exceeds 1 minute when the system is 70% utilized. Thus, if some type of acknowledgement is assumed, and the MES sets a one minute timer after each transaction request, the MES knows for sure to expect a response or to send the request again. If a collision does occur, the MES does not receive an acknowledgement within the 1 minute, the MES informs the operator that a retry is required so that he expects a longer response, and the transaction can be tried again with a new 2 minute response assumed.

Terrestrial Processing and Response

The ability to get the transaction request to the LES quickly is just the first step in the chain. Normally, data reports are logged to the mailbox database for download at the users convenience. It is important to quickly get the message out and to generate a reply message. When the system receives a transaction request, it must take a new action for transaction requests rather than log it to the mailbox associated with the DNID member. The transaction request needs to be forwarded to the proper terrestrial user in order to initiate the database lookup, and the like, and to provide the response to the MES. In a normal data report, there is a one byte field that defines the data report category. In the transaction request, this byte of data informs the LES which of 255 transaction types is being requested. If 255 transaction types is too small a limit, this field may be optionally changed to two bytes but at the loss of the amount of input data in the first frame taken up by one byte.

In the current LES applications, for data reports the only address that is known is the NUA of the registered user for the DNID. It also seems logical to send the data report to this user, for the registered user may be the only place that currently has the database that contains a list of which mobiles may do any particular type of request response transaction. The following considerations are assumed for this side of the protocol:

1. To get the request addressed, the raw transaction request is routed to an external machine. The external machine can be the registered user or some intermediate processor that will know how to connect to the database provider.
2. To route the data report to the external machine, a full time connection must be provided to allow for quick output and receipt of the response. The full time connection can be a virtual X.25 circuit which would work for a registered user or some other type of machine, or can be an RS232 link to a local intermediate machine, etc. In any case, the LES has to provide a new driver to send/receive data reports and formatted responses, and to assure that the link remains intact.
3. The external machine is responsible for any necessary security checking associated with the request data report. External security checking might imply that the LES has to download registered user information with the request data report. Security validation might imply that the correlation of the DNID and member number combination relation to LES number be kept accurate in the intermediate machine, a database that is currently the responsibility of the registered user. The intermediate machine may need to know individual types of requests that can be delivered with the data report request facility and needs a database of which particular LES are allowed to use that request type.
4. The external machine also is responsible to return a message that is data transparent to the LES so the LES has only to decide on the proper protocol mechanism to send out the message in the form that it was received.

Assuming the above approach, it has been determined that the two minute response time can be reached if the external machine responds within the thirty second budget allocated so far in this report. In the long run, the budget given to the external machine depends on how much time is used in the protocol once a method is chosen and how much this chosen method is impacted by system loading. In reality, the terrestrial response has to be small enough to assure the 2 minute response whether the system is loaded or not, so the 30 second window given here may well be down to the 5 seconds.

Further, if desired, the LES times out the terrestrial response. If a response has not been received in some maximum time, the LES can at least send a message back to the originating MES, letting the user know that the response has failed, and to please try again. The timed response concept will assure the users that they will receive a response within the expected two minutes. Assuming 6 seconds is the terrestrial delay as the best time, adding a factor for busy terrestrial provider, and assuming overlap of terrestrial processing with acknowledgement processing, it has also been determined with the overlap considered, the transaction input and terrestrial processing are ready for response in under 40 seconds in the no load case and in slightly over 1 minute is a heavily loaded case. It should also be noted that if the terrestrial delay is held to the 5 seconds time, or near this number, the full terrestrial processing will overlap with the acknowledgement process. The only leg remaining is the LES to the MES response which will be discussed below.

The immediate acknowledgement with retry mechanism solves one of the major problems already discussed, the fact that data reports can be lost when hitting the signalling channel. The MES now knows when a data report is missed, but that also implies that an new retry mechanism is added to the system timing. It should also be noted that this same response transaction could be used for normal data reports, but that would obviously add overhead on the TDM channel for the sending of the Acknowledgement and on the message channel for the retry cases. This impact should be tolerated, however, to guarantee that all data reports are actually delivered properly to the system.

Transaction Response Messages

The last segment of the time interval is to be used for the transmission of the response data from the LES to the MES. As with the inbound side, there are the two alternatives of using normal messaging or an enhanced service both of which need to be examined. Since the transaction request makes data available in less than twenty seconds, the first alterative is just to use normal LES to MES message as the transaction response. To use the normal message protocol has two distinct advantages:

1. The amount of software change, and therefore cost would be minimized.
2. There is no restriction on the message size.

While the total message response time was over three minutes, the message arrives at the MES much earlier than the total transaction time required for the full protocol because of the idle wait timer. The timing for the transaction request and the normal message response have already been generated. It has been determined that, at the low levels of utilization, the response time can be met by simply using the normal message LES to MES protocol with no changes. It must also be remembered that the utilization figures now being used, assume an equal loading of all factors, which is conservative. Thus it is safe to assume that this method would work sufficiently for up to 30% system loading.

However, the need for an acknowledgement was discussed in the last section relative to the criticality of the transaction response. With the message output, an acknowledgement is actually built into the transaction protocol. The protocol sends an announcement as the first step in the message output. The message announcement acts as the acknowledgement which tells the MES two significant facts:

1. The transaction response did not have a collision. If a collision had occurred, and another MES took up the slots, the announcement would be to the other MES.
2. If the announcement has not arrived in some time frame, say 60 seconds or half way through the transaction, the MES tells the user that a retry will be necessary and begin the 2 minute response time again.

It should be noted that the time for the announcement to reach the MES as an acknowledgement is not effected by long delays, and is relatively stable. In all cases up to 40% loading the response time is less than 60 seconds, even assuming worst case loading. Even if the acknowledgement has not arrived in some specific delay time, and the MES sends a second request, the LES may have to process the transaction twice but the MES application program should filter out the second response.

The message response protocol will work but only for low system utilizations. Further, as described above, when retries are added on the transaction request deliveries, the problem will only become worse. However, there is one possible partial solution to the utilization problems also. The normal protocol does not begin to process the outgoing call until the full terrestrial processing is completed. However, it was shown previously that the acknowledgement can be overlapped with the terrestrial processing if the acknowledgement is started at the same time as the terrestrial output. In this case, that would imply that the message announcement would have to be started not when the terrestrial response arrived, but when the transaction request arrived.

However, as also explained above, the acknowledge process solves the problems associated with missed data reports due to collisions but only if the retry is added back into the overall time calculations. In this case, the acknowledge time is essentially 60 seconds, just like in any other missed collision, so that the data report delivery line which currently reads 8.6 at all utilizations should really be the same as the MES sends assignment response line.

It has also been determined that by sending the assignment request as an acknowledgement based on the receipt of the transaction request, and even including transaction request retries, the message can be used for a transaction response in the lower utilization levels. This method has the following advantages:

1. The only new message type defined has been for the transaction request.
2. The problem of lost transaction requests as modified data reports has been totally resolved.
3. Since a normal message is to be used for the response. there is no limit to the message size of the response.
4. If the utilization levels of the message channels and the transaction request channels can be kept at a low level, the response time will remain within the desired change. There is no problems below 20% utilization and this could be moved up to the 40% range if the number of signalling channels was doubled. Remember that these percentage times are based on equal utilization of all system parameters. With careful operational control, these values can be improved in other areas just as the improvement is seen by adding more signalling channels.

However, this approach does have its associated cost.
1. Hardware costs for duplication of all signalling and transaction request channels.
2. The current software protocol assumes that a message has arrived before it is forwarded to the satellite driver for message announcement. The software will have to be modified not only to issue the announcement on receipt of the transaction request, but also to create a logical link between the store and forward processor and the announce process. This logical link will be used to forward the terrestrial response to the satellite driver so that the response message can be associated with the original announcement that was started with the transaction request. This is not a simple task since the protocol portion is in the LES FEP while the Store and Forward process is in the LES BAP.

Thus the first alternative, that of using a message response is feasible when combined with the new request transaction input using a specially designed signalling channel. While message response will work within two minutes at low utilization levels, to use message responses at higher utilization levels requires that the LES overlap the message delivery announcement and the terrestrial processing based on the transaction request arrival.

The second alternative is to use the special services responses to send the transaction response. As already explained, the polling message and the EGC message provide the ability to send out a message on the TDM channel. Both message types provide a broadcast facility to send a message out to an entire ocean region but with a subaddress of a single mobile. Issues to be considered:

1. The problem of overlapped transaction request due to collisions has not been addressed, so that the potential for lost transactions has not been resolved.
2. The problems of making sure that no other messages begins output after a transaction request and before transaction response still exits.
3. The response message type will have to have at least equal priority with normal messages for the response times to be true. This may be a conflict with other cases where the LES would prefer that EGCs in a particular run at a lower priority in than normal messages.
4. Currently, poll messages are limited to 232 bytes of data and will not meet the stated goals.
5. Normally, poll messages are addressed to DNID numbers and EGC are addressed to ENID numbers. In this case, the need to send the message to a specific MES.
6. Unlike the normal call response case, only the MES knows that the transaction has been delivered. With a normal call, the LES is assured that the call is delivered at the end of the Idle Wait timer also. With the transaction as described, the LES has no assurance that the transaction response was actually delivered.

The first problem is the old issue of what to do when a collision occurs on a transaction request so that it is lost. The loss due to collision has been determined to be the same as a message lost to data errors such as bad checksum also, for in both cases the message is missed. These cases of missed packet, frame, and the like, need to be recovered with some retry procedure.

In the case of transaction input and EGC type output, it has been determined that the end to end message time is, in general less than half of the of the original two minute system response requirements. That means that the response itself can be considered the acknowledgement. If the response has not arrived in 60 seconds, the MES simply repeats the transaction. The mobile operator can be warned that a retry is in process on the first re-attempt or if preferred, only warned on the second retry in the case where there are two failures. Either choice is an applications decision in the MES software. If the response to the first request should arrive late, the response can be delivered to the operator and the MES will simply watch for and then throw any second response.

By assuming that the message itself will be the acknowledgement response, everything possible should be done to assure that the end to end response time will usually be under 60 seconds. It has been determined that at system utilization rates of less than 60%, the overall response time is less than one minute. The delay exceeds one minute at higher utilization rates because a message of 300 bytes cannot be always be transmitted on a single TDM frame, and each addition frame needed to transmit the message cause the end to end response time to increase by 8.64 seconds. This problem would become worse as the TDM approaches 100% utilization, which is really the way the system is designed. However, this problem could be resolved if the transaction response message was given priority over normal messages so that they would be moved to the front on any pending message queue and such that its packets were not interleaved with any other messages unless it was guaranteed transmission in one frame.

The second problem on interfering messages will have to be resolved by the Store and Forward process, since the Store and Forward process will have to be modified to route the transaction request properly, code will have to also be added to limit calls to or from the MES in question until the transaction response has be delivered from the terrestrial user and forwarded to the satellite driver from delivery. To fully close the loop, a call completion from the MES will be required to allow for satellite driver retries.

The third, fourth, and fifth problems are all resolved by choosing between the use of EGCs and Polling messages. Without additional work to allow for polls of variable number of packets, polls are too restrictive of one size. Furthermore, EGC messages give not only unlimited size responses but have two additional advantages:

1. Already built into the protocol for EGCs is four levels of priority, those being normal, safety, urgent, and distress. The category urgent is not currently being used by the system and could be applied to the transaction response packets to move them in front of normal messages but still keep them at a lower priority than distress messages.
2. Also available in the protocol is the EGC type defined to be EGC System Message that can be broadcast to one or more ocean regions using only a mobile number and not requiring an ENID. Since it was already decided to use the mobile number return ID on the transaction request, the message definition fits the transaction response perfectly. Thus, the problems with message length, message priority, and message addressing for the transaction response will all be solved by using the EGC System Message Type.

The final problem it has been determined is to close the loop between the MES to LES so that the LES is assured that the EGC response has been delivered. EGC's themselves are not acknowledged by the MES normally. The acknowledgement could be similar to the transmission acknowledgement request used in normal message delivery where a reserved slot is defined for the response burst. Using this form of acknowledgement would eliminate the terrible retry times that occurs when a random burst slot is used. To be able to use this retry sequence on this particular EGC message, it would probably be best to make this EGC response a new message type, the transaction response. Just as was seen with the transaction request and data reports, the transaction response message would in general be similar to an EGC System Message, but would be followed by an acknowledgement request with a dedicated burst slot to assure that the message did indeed arrive at the MES. If the acknowledgement burst is not sent, the satellite driver in the LES knows to retransmit the transaction response. Of course, the alternative to the positive response is the normal message timeout process by setting an idle wait timer on the EGC output message.

This final step in the overall transaction request response sequence would increase the end to end time, but transparently to the user who actually placed the request since it would be done in a overlapped fashion with the response delivery to the user. The capability to provide a transaction request and associated response can be provided by examining each major functional level of the request message, the transaction processing, and the response message.

The transaction request message will be a message type that is evolved from the current data report concept. In order to make this transaction require minimum time the following is done.
1. A new signalling channel is defined and dedicated to receipt of the transaction requests.
2. The transaction requests are sent as four packets within one frame on the new signalling channel type.
3. The transaction requests packets, concatenated as with data reports and forwarded immediately to the Store and Forward process.

The transaction processing portion of the message requires the following items:
1. The Store and Forward process keeps any other messages from interfering with the transaction request.
2. The Store and Forward process sends the transaction request immediately to the proper terrestrial party based on the type.
3. A terrestrial process is developed to handle the application specifics of the each type of transaction, routing to terrestrial data bases as necessary, assuring proper transaction security, and returning responses to the LES within a 5 minute window.

The response portion of the message can be done by normal message protocols perhaps with early call announcement or with an new transaction type the transaction response similar to an EGC message to one mobile. The normal message response requires the following items:
1. The LES begins an immediate announcement of a call to be ready to send the transaction response when it arrives.
2. The Store and Forward process forwards the message immediately to the proper satellite driver output logical to connect the response.
3. Once this connection is realized, simply completion of normal call processing.

The new transaction response message requires:
1. The Store and Forward process initiates the response immediately to the satellite driver for output on the TDM including the setting of address, message type and priority as necessary.
2. An acknowledgement request and response packet is done similar to normal LES to MES message are done.

The request response transaction is done on any TDM group that has the special signalling channels for the transaction requests. Another alternative could be to have a TDM channel that is dedicated to only distress packets and transaction request response messages. This dedicated TDM channel could have the associated dedicated signalling channels discussed earlier and the LES would not have a TDM group dedicated to fast response transactions alone. Using this concept would help to monitor the load and effectiveness of the area of the system. FIGS. 15–18 are diagrams illustrating utilization of satellite network resources for various exemplary transactions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Glossary

| | |
|---|---|
| API | Application Programmers Interface |
| BB | Bulletin Board |
| BBER | Bulletin Board Error Rate |
| BPS | Bits Per Second |
| CNID | Closed Network ID. Group address, also used to indicate destination of inbound messages |
| CPU | Central processor Unit |
| CU | Channel Unit. Designates the FEP, the modulation and demodulation equipment |
| DCE | Date Circuit Terminating Equipment |
| DCU | Dispatch Control Unit, at the subscriber headquarters |
| DEC | Digital Equipment Corp. |
| DEMSA | DEC MicroServer, connects DECNet with X.25 PSDN |
| DNID | Data Network Identification |
| DSP | Digital Signal Processing in demodulation |
| DTE | Data Terminal Equipment |
| DU | Display Unit and Integrated Keyboard |
| EGC | Enhanced Group Call (Group broadcast messages) |
| EIRP | Equivalent Isotopically Radiated Power |
| ENID | EGC Network Identification |
| FEP | Front End Processor |
| FTU | Frame Timing Unit |
| ISDN | Integrated Service Digital Network |
| ISDN FEP | FEP handling interface to ISDN |

-continued

| | |
|---|---|
| LAN | Local Area Network |
| LES | Land Earth Station |
| LMES | Land Mobile Earth Station |
| MES | Mobile Earth Station |
| MET | Mobile Earth Terminal |
| NCS | Network Control or Coordination Station |
| NOC | Network Operations Center |
| PAD | Packet Assembler/Disassembler |
| PAT | Performance Analysis Tool |
| PSDN | Packet Switched Data Network |
| PSK | Phase Shift Keying |
| PSTN | Public Switched Telephone Network |
| SCD | Signalling Channel Descriptor |
| SPS | Symbols Per Second |
| SSM | Slot State Marker |
| TDM | Time Division Multiplex Channel |
| TSM | Transaction/Server Matrix |
| VC | Virtual Call |
| VAX | Hardware operating under VMS operating system |
| VUP | VAX Unit of Processing |

Definition of Terms

Channel Unit
   Designated satellite side, one channel IF modulation or demodulation equipment.
   Includes IF converters, Digital Signal Processing unit (DSP) and Front End Processing.
Front End Processor
   Processor doing one or more system subfunctions. On the satellite side, the FEP decodes the data from the signal processing unit. On the terrestrial side, the FEP handles the low level data protocols.
LES ID
   A protocol field comprising the [Ocean Region] and the [Station Number] fields.
Load Factor
   A number associated with a registered user that is based on the predicted or measured average load generated by the users Mobiles.
Local ID
   A protocol field transmitted on a TDM. It is defined as a value in the range 0–7. The LES uses the values between 1 and 6 to indicate which of the six possible TDM handlers within a FEP is generating the TDM.
MH
   Message Handler. A software component of the LES that allows human interaction with the other LES software subsystems.
MLS
   Mobile load simulator. A PC based software tool that simulates a large number of mobile terminals for testing the LES at high traffic levels.
Ocean region
   Used to describe call routing to one of four FEP pairs without having a specific geographical connotation.
Origin ID
   The [LES ID] as transmitted on a TDM. This together with the [Local ID] uniquely identifies the TDM.
Primary TDM
   The first common TDM in a spot area. The mobiles must have one common TDM frequency for each beam pre-programmed in memory in order to be able to log into the LES and send and receive messages.
Spot area
   A physical part of the earth's surface containing at least one Common TDM. The configuration described in this document preferably supports six spot areas:
   1. Eastern
   2. Central
   3. Mountain
   4. Western
   5. Alaska and Hawaii
   6. Southern (Mexico and Puerto Rico)
Spot (beam)
   The beam coverage formed by the Satellite whose footprint forms the Spot Area. The LES will provide at least one TDM group in each Spot Beam. The first Spot Beam must be a Primary (Common) TDM.
Spot ID
   Spot beams have IDs [Spot ID] in the range 0–255. Spot beam ID 0 is the global spot. A global spot implies coverage of all Spot Beams with the same [Ocean Region] identifier.
TDM group
   The hardware view of TDM group is as follows
   1 TDM Tx.
   0–1 TDM Rx. If equipped this provides the Satellite loop delay.
   1–20 Signalling channels.
   0–20 Message channels.
Station Number
   A protocol term for the number of the LES station. This number is combined with the [ocean region] to form the [LES ID]. Each LES system should have a unique number assigned.

What is claimed is:

1. In a mobile satellite system including a satellite communication switching office having a satellite antenna for receiving/transmitting a satellite message via a satellite from/to at least one data terminal of a plurality of data terminals using a mobile communication system, a satellite interface system, a management system including a central controller receiving/transmitting the satellite message from/to the satellite communication switching office, the central controller responsive to the satellite message received from the data terminal via the satellite, and receiving data in the satellite message received from the data terminal, a communication protocol method, comprising the steps of:

(a) transmitting from the management system to the plurality of data terminals on a Time Division Multiplex (TDM) channel, the TDM channel including management system signaling, multiple management system messages, and management system acknowledgments;

(b) transmitting from each data terminal to the management system on a respective signaling channel, the signaling channel including data terminal call requests, data reports, position reports or data terminal acknowledgments, and the management system receiving multiple signaling channels per TDM group or message channel; and (c) transmitting from the data terminal to the management system on a message channel, the message channel including multiple messages from the plurality of data terminals, the management system receiving the multiple messages per TDMA channel, and allocating message channel bandwidth for each of the multiple messages to the data terminal responsive to the data terminal call request received on one of the multiple signaling channels, wherein said step (a) of transmitting on the TDM channel includes concurrently transmitting multiple management system messages from the management system to the plurality of data terminals, wherein the TDM channel includes a plurality of frames, each frame including a plurality of data packets comprising at least a portion of one of the multiple management system messages from the plurality of data terminals, the plurality of data packets being included within the plurality of frames and arranged by sizes of the multiple management system messages and wherein the multiple management system messages including fewer packets have a higher transmission priority than the multiple management messages including more packets.

2. The method according to claim 1, wherein the TDM channel is divided into TDM frames.

3. The method according to claim 2, wherein the TDM channel is divided into the TDM frames and each TDM frame is about 8.64 seconds long and about 639 bytes, including control information.

4. The method according to claim 3,
wherein the TDM channel is divided into the TDM frames and each TDM frame is about 8.64 seconds long and about 639 bytes, including control information, and
wherein the TDM frames provide about 10,000 TDM frames per day, and frame zero occurring at a predetermined time period.

5. The method according to claim 2, wherein each TDM frame is interleaved and encoded using a forward error correction (FEC) encoding so that data within the TDM frame is recoverable even when portions of the TDM frame are lost.

6. The method according to claim 2, wherein each TDM frame is built by the management system out of data packets that are pending transmission.

7. The method according to claim 6, wherein each TDM frame is built by the management system out of data packets that are pending transmission using transmission priority rules.

8. The method according to claim 6, wherein each data packet includes a packet type indicating a packet format, a packet checksum used by the data terminal to detect invalid data packets, and optionally a data terminal address.

9. The method according to claim 1, wherein the data terminal transmits on the signalling channel on a contention basis, with randomizing and retransmission in case of collisions with transmissions of other data terminals.

10. The method according to claim 1, wherein the data terminal transmits on the signalling channel on a contention basis, and the signalling channel is configured to operate at approximately one of 300 bps or 600 bps depending on satellite power availability.

11. The method according to claim 1, wherein the data terminal transmits on the signalling channel using signalling packets, the signalling packets including packet type and checksum information.

12. The method according to claim 1, wherein the data terminal transmits on the messaging channel and the communication switching office allocates the message channel bandwidth, the allocation of the message channel bandwidth effectively providing scheduled TDMA access for the data terminal for the messaging channel.

13. The method according to claim 1, wherein the data terminal transmits on the messaging channel using messaging packets, the messaging packets including packet type and checksum information.

14. The method according to claim 1, wherein a set of the TDM channel and associated signalling and message channels is called a TDM Group, and the management system coordinates access to channels in the TDM group using the TDM.

15. The method according to claim 1, wherein the management system transmits four categories of packets on the TDM channel including:
(1) a bulletin board packet providing overall control information for a TDM Group;
(2) a signalling channel descriptor packet providing reservation of signalling channel slots in the signalling channel and acknowledgement of received data in the signalling channel slots;
(3) a signalling channel packet providing control and acknowledgement signalling; and
(4) a message packet including store and forward message packets as a series of up to 125 byte sized packets.

16. The method according to claim 15, wherein the signalling channel descriptor packet defines a return channel frequency indicating whether the received data was received in the signalling channel slots, and whether the signalling channel slot is reserved.

17. The method according to claim 15, wherein the signalling channel descriptor packet defines a return channel frequency indicating whether the received data was received in the signalling channel slots, and whether the signalling channel slot is reserved.

18. The method according to claim 15, wherein the data terminal sets the signalling channel slot indicating that the satellite message is to be continued across several message packets, and the management system marks the signalling channel slot reserved in the signalling channel descriptor packet so that other data terminals will not transmit in that signalling channel slot.

19. The method according to claim 1, wherein the multiple messages include, when available, a combination of at least one small message, at least one medium message, and at least one long message, the small, medium, and long messages being multiplexed and transmitted to the multiple data terminals.

20. The method according to claim 19, wherein the at least one small message comprises less than about 128 characters, the at least one medium message comprises about between about 128 characters and about 384 characters, and the at least one long message comprises more than about 384 characters.

21. The method according to claim 19, wherein the management system prioritizes the at least one small, medium and long messages in accordance with a predetermined priority.

22. The method according to claim 21, wherein the predetermined priority comprises the at least one small message being of a higher priority than the at least one medium message, and the at least one medium message being of a higher priority than the at least one long message.

23. In a communication system including a communication switching office having a transceiver for receiving/transmitting a message from/to at least one data terminal of a plurality of data terminals using a communication system, a management system including a central controller receiving/transmitting the message from/to the communication switching office, the central controller responsive to the message received from the data terminal, and receiving data in the message received from the data terminal, a communication protocol system, comprising:
said management system transmitting to the plurality of data terminals on a Time Division Multiplex (TDM)

channel, the TDM channel including management system signaling, multiple management system messages, and management system acknowledgments, and the plurality of data terminals, responsively connected to said management system, each data terminal transmitting to the management system on a respective signaling channel, the respective signaling channel including data terminal call requests, data reports, position reports or data terminal acknowledgments, and the management system receiving multiple signaling channels per TDM group or messaging channel, and said data terminal transmitting to the management system on a message channel, the message channel including multiple messages from multiple data terminals, the management system receiving the multiple messages per TDMA channel, and allocating message channel bandwidth for each of the multiple messages to the data terminal responsive to the data terminal call request received on one of the multiple signaling channels, wherein the TDM channel includes the multiple management system messages concurrently transmitted from the management system to the plurality of data terminals, wherein the TDM channel includes a plurality of frames, each frame including a plurality of data packets comprising at least a portion of one of the multiple management system messages from multiple data terminals, the plurality of data packets being included within a frame transmission by a FIFO-free message transmission prioritization for a message queue.

24. The communication protocol system according to claim 23, wherein the TDM channel is divided into TDM frames.

25. The communication protocol system according to claim 24, wherein the TDM channel is divided into the TDM frames and each TDM frame is about 8.64 seconds long and about 639 bytes, including control information.

26. The communication protocol system according to claim 25,
wherein the TDM channel is divided into the TDM frames and each TDM frame is about 8.64 seconds long and about 639 bytes, including control information, and
wherein the TDM frames provide about 10,000 TDM frames per day, and frame zero occurring at a predetermined time period.

27. The communication protocol system according to claim 24, wherein each TDM frame is interleaved and encoded using a forward error correction (FEC) encoding so that data within the TDM frame is recoverable even when portions of the TDM frame are lost.

28. The communication protocol system according to claim 24, wherein each TDM frame is built by the management system out of data packets that are pending transmission.

29. The communication protocol system according to claim 28, wherein each TDM frame is built by the management system out of data packets that are pending transmission using transmission priority rules.

30. The communication protocol system according to claim 28, wherein each data packet includes a packet type indicating a packet format, a packet checksum used by the data terminal to detect invalid data packets, and optionally a data terminal address.

31. The communication protocol system according to claim 23, wherein the data terminal transmits on the signalling channel on a contention basis, with randomizing and retransmission in case of collisions with transmissions of other data terminals.

32. The communication protocol system according to claim 23, wherein the data terminal transmits on the signalling channel on a contention basis, and the signalling channel is configured to operate at approximately one of 300 bps or 600 bps depending on satellite power availability.

33. The communication protocol system according to claim 23, wherein the data terminal transmits on the signalling channel using signalling packets, the signalling packets including packet type and checksum information.

34. The communication protocol system according to claim 23, wherein the data terminal transmits on the messaging channel and the communication switching office allocates the message channel bandwidth, the allocation of the message channel bandwidth effectively providing scheduled TDMA access for the data terminal for the messaging channel.

35. The communication protocol system according to claim 23, wherein the data terminal transmits on the messaging channel using messaging packets, the messaging packets including packet type and checksum information.

36. The communication protocol system according to claim 23, wherein a set of the TDM channel and associated signalling and message channels is called a TDM Group, and the management system coordinates access to channels in the TDM group using the TDM.

37. The communication protocol system according to claim 23, wherein the management system transmits four categories of packets on the TDM channel including:
(1) a bulletin board packet providing overall control information for a TDM Group;
(2) a signalling channel descriptor packet providing reservation of signalling channel slots in the signalling channel and acknowledgement of received data in the signalling channel slots;
(3) a signalling channel packet providing control and acknowledgement signalling; and
(4) a message packet including store and forward message packets as a series of up to 125 byte sized packets.

38. The communication protocol system according to claim 37, wherein the signalling channel descriptor packet defines a return channel frequency indicating whether the received data was received in the signalling channel slots, and whether the signalling channel slot is reserved.

39. The communication protocol system according to claim 37, wherein the signalling channel descriptor packet defines a return channel frequency indicating whether the received data was received in the signalling channel slots, and whether the signalling channel slot is reserved.

40. The communication protocol system according to claim 37, wherein the data terminal sets the signalling channel slot indicating that the satellite message is to be continued across several message packets, and the management system marks the signalling channel slot reserved in the signalling channel descriptor packet so that other data terminals will not transmit in that signalling channel slot.

41. The communication protocol system according to claim 23, wherein the multiple messages includes the combination of at least one small message, at least one medium message and at least one long message, when the small, medium and long messages are transmitted when available to the multiple data terminals.

42. The communication protocol system according to claim 41, wherein the at least one small message comprises less than about 128 characters, the at least one medium message comprises about between about 128 characters and about 384 characters, and the at least one long message comprises more than about 384 characters.

43. The communication protocol system according to claim 41, wherein the management system prioritizes the at least one small, medium and long messages in accordance with a predetermined priority.

44. The communication protocol system according to claim 43, wherein the predetermined priority comprises the at least one small message being of a higher priority than the at least one medium message, and the at least one medium message being of a higher priority than the at least one long message.

45. A communication protocol system for transferring data between a management system and a plurality of data terminals via a satellite, said system comprising:

a management system; and a plurality of data terminals;

said management system and said plurality of data terminals including a transmission channel having a plurality of multiplexed outbound messages from the management system to the plurality of data terminals, the plurality of multiplexed outbound messages being concurrently transmitted;

said management system and said plurality of data terminals including a signaling channel having a data terminal call request from a requesting data terminal of said plurality of data terminals to the management system to receive message channel bandwidth allocation therefrom; and said management system and said plurality of data terminals including a message channel having an inbound message from a calling data terminal of said plurality of data terminals to said management system, wherein the transmission channel includes a plurality of frames, each frame including a plurality of data packets comprising at least a portion of one of the plurality of multiplexed outbound messages, the plurality of data packets being included within a frame transmission, each packet of said plurality of data packets including a packet size at least as large as a predetermined message size while maximizing simultaneous transmission of the plurality of multiplexed outbound messages, and wherein said transmission channel includes a plurality of frames, each frame of said plurality of frames including a plurality of packets, each outbound message of the plurality of outbound messages being divided into at least one packet of said plurality of packets, said plurality of packets being time division multiplexed within a frame transmission so that respective packets of at least two outbound messages are substantially simultaneously transmitted within the frame transmission.

46. The system according to claim 45, wherein each packet of said plurality of packets has a size of 64 characters.

47. The system according to claim 45, wherein said transmission-channel includes an announcement of receipt at the management system of a future outbound message to at least one receiving data terminal of the plurality of data terminals.

48. The system according to claim 46, wherein said plurality of packets are time division multiplexed within the frame transmission by size so that said outbound messages divided into fewer packets are given a higher transmission priority than said outbound messages divided into more packets.

49. The system according to claim 48, wherein said transmission channel additionally includes a poll message for at least one data terminal of said plurality of data terminals from another data terminal of said plurality of data terminals, the poll message having a higher transmission priority than an outbound message of a comparable size of the plurality of outbound messages.

50. The system according to claim 45, wherein each data terminal of said plurality of data terminals includes a two minute call completion timer.

51. The communication protocol system of claim 45 wherein the predetermined message size is approximately equal to an average size of the plurality of multiplexed outbound messages.

52. The communication protocol system of claim 51 wherein the average size is in a range of 50–60 characters.

53. The communication protocol system of claim 45 wherein the plurality of multiplexed outbound messages are simultaneously transmitted.

54. A communication protocol method for transferring data between a management system and a plurality of data terminals via a satellite, said protocol method comprising the steps of:

multiplexing a plurality of outbound messages at the management system;

transmitting the multiplexed plurality of outbound messages concurrently on a transmission channel from the management system to the plurality of data terminals;

transmitting a data terminal call request from a requesting data terminal of the plurality of data terminals on a signaling channel to the management system to receive message channel bandwidth allocation therefrom; and transmitting an inbound message from a calling data terminal of the plurality of data terminals on a message channel to the management system, wherein the transmission channel includes a plurality of frames, each frame including a plurality of data packets comprising at least a portion of one of the plurality of outbound messages, the plurality of data packets being included within the plurality of frames and arranged by sizes of the multiple management system messages and wherein the plurality of outbound messages including fewer packets have a higher transmission priority than the plurality of outbound messages including more packets.

55. The method according to claim 54, wherein said multiplexing step includes dividing each outbound message of a plurality of outbound messages to the plurality of data terminals into at least one packet of a plurality of packets at the management system, and time division multiplexing, by utilizing a priority scheme, the plurality of packets in at least one frame of a plurality of frames at the management system so as to maximize a number of outbound messages that can be transmitted simultaneously in the at least one frame; and wherein said transmitting step includes transmitting the at least one frame via the transmission channel from the management system to the plurality of data terminals.

56. The method according to claim 55, further comprising the steps of:

including in the at least one frame an announcement of receipt at the management system of a future outbound message to at least one of the plurality of data terminals, prior to transmitting a first packet of the future outbound message in a subsequent frame.

57. The communication protocol method according to claim 55, further comprising the step of:

analyzing an outbound message size of the each of the outbound messages at the management system, wherein the priority scheme includes prioritizing the plurality of packets based on a respective outbound message size of the each of the outbound messages so that a packet of the plurality of packets associated with a larger outbound message receives a lower priority than a packet of the plurality of packets associated a smaller outbound message.

58. The method according to claim 55, wherein each packet of the plurality of packets has a size of 64 characters.

59. The method according to claim 54, wherein each of the plurality of data terminals includes a two minute call completion timer.

60. The communication protocol system of claim 54 wherein the plurality of multiplexed outbound messages are simultaneously transmitted.

61. In a mobile satellite system including a satellite communication switching office for receiving/transmitting a satellite message via a satellite from/to at least one data terminal of a plurality of data terminals, a central controller receiving/transmitting the satellite message from/to the satellite communication switching office, the central controller responsive to the satellite message received from the data terminal via the satellite, and receiving data in the satellite message received from the data terminal, a communication protocol method, comprising the step of transmitting a plurality of messages from a management system to the plurality of data terminals respectively at least one of simultaneously and concurrently on a same communication channel in accordance with predetermined criteria, the plurality of data packets being included within a frame transmission, each packet of the plurality of data packets including a packet size at least as large as a predetermined message size while maximizing simultaneous transmission of the plurality of messages.

62. The method according to claim 61, wherein said transmitting step further comprises the step of transmitting the plurality of messages from the management system to the plurality of data terminals respectively at least one of simultaneously and concurrently on the second channel in accordance with the predetermined criteria including message size of each of the plurality of messages.

63. The communication protocol system of claim 61 wherein the predetermined message size is approximately equal to an average size of the plurality of multiplexed outbound messages.

64. The communication protocol system of claim 63 wherein the average size is in a range of 50–60 characters.

65. A communication protocol system for transferring data via a satellite, comprising
a management system;
a plurality of data terminals communicating with said management system via the satellite,
said management system and said plurality of data terminals communicating over at least one TDM channel, and
a plurality of outbound communications being transmitted from said management system to said plurality of data terminals in accordance with a communications protocol, each outbound communication of said plurality of outbound communications including a plurality of packets, each packet of said plurality of packets being transmitted on one TDM channel of said at least one TDM channel,
a network coordination station communicating with said plurality of data terminals, and wherein said system is configured to be free of the network coordination station communicating with said plurality of data terminals when said plurality of data terminals are not engaged in message transfer.

66. The system according to claim 65, wherein each TDM channel of said at least one TDM channel is free of a demand-assigned mode.

67. A communication protocol system for transferring data via a satellite, comprising
a management system;
a plurality of data terminals communicating with said management system via the satellite,
said management system and said plurality of data terminals communicating over at least one TDM channel, and
a plurality of outbound communications being transmitted from said management system to said plurality of data terminals in accordance with a communications protocol, each outbound communication of said plurality of outbound communications including a plurality of packets, each packet of said plurality of packets being transmitted on one TDM channel of said at least one TDM channel,
wherein said management system includes a plurality of data mailboxes, said management system forwarding at least one of a data report and a message addressed to said plurality of data mailboxes to a terrestrial host processor without storing said at least one of a data report and a message in said plurality of data mailboxes, unless forwarding fails.

68. The system according to claim 67, wherein said at least one TDM channel includes a load-balanced plurality of TDM channels per spot beam.

69. The system according to claim 67, wherein said plurality of data terminals scan said at least one TDM channel when a signal therefrom is lost.

70. The system according to claim 69, wherein the signal is lost during roaming between spot beams.

71. The system according to claim 67, wherein said at least one TDM channel includes a plurality of frames, each frame including a plurality of signaling bursts per data terminal.

72. The system according to claim 67, wherein said at least one TDM channel includes a plurality of frames, each frame including a plurality of signaling bursts per said plurality of data terminals.

73. The system according to claim 67, wherein said at least one TDM channel including an immediate acknowledgment with retry mechanism.

74. The system according to claim 67, wherein said at least one TDM channel includes a plurality of automated group call acknowledgments.

75. In a mobile satellite system including a satellite communication switching office for receiving/transmitting a satellite message via a satellite from/to at least one data terminal of a plurality of data terminals, a central controller receiving/transmitting the satellite message from/to the satellite communication switching office, the central controller responsive to the satellite message received from the data terminal via the satellite, and receiving data in the satellite message received from the data terminal, a communication protocol method, comprising the steps of:

(d) transmitting at least one data terminal message from a plurality of data terminals to a management system on at least one first channel, the at least one data terminal message including at least one of data terminal call requests, data reports, position reports, data messages and data terminal acknowledgments;

(e) receiving by the management system the at least one data terminal message from the plurality of data terminals; and (f) transmitting plurality of management system messages from the management system to the plurality of data terminals respectively at least one of simultaneously and concurrently on a second channel in accordance with predetermined criteria, wherein the at least one first channel includes a plurality of frames, each frame including a plurality of data packets comprising at least a portion of one of the multiple management system messages, the plurality of data packets being included within a frame transmission a FIFO-free message transmission prioritization for a message queue.

76. The method according to claim 75, wherein said transmitting step (c) further comprises the step of transmitting the plurality of management system messages from the management system to the plurality of data terminals respectively at least one of simultaneously and concurrently on the second channel in accordance with the predetermined criteria including message size of each of the plurality of management system messages.

77. A communication protocol system for transferring data between a management system and a plurality of data terminals via a satellite, said communication protocol system comprising:

a management system; and a plurality of data terminals, said management system and said plurality of data terminals communicating over a transmission channel, a plurality of outbound messages being transmitted from the management system to said plurality of data terminals in accordance with a communication protocol, said communication protocol system defining a plurality of frames, each frame including a plurality of data packets comprising at least a portion of one of the plurality of outbound messages, wherein at least one of (a) said plurality of data packets is included within a frame transmission by message size, (b) said plurality of data packets is included within a frame transmission by a FIFO-free message transmission prioritization for a message queue, and (c) said plurality of data packets is included within a frame transmission, each packet of said plurality of data packets including a packet size at least as large as a predetermined message size while maximizing simultaneous transmission of the plurality of outbound messages.

78. The communication protocol system of claim 77 wherein the predetermined message size is approximately equal to an average size of the plurality of multiplexed outbound messages.

79. The communication protocol system of claim 78 wherein the average size is in a range of 50–60 characters.

80. A communication protocol system for transferring data via a satellite, comprising means for managing a system;

a plurality of data terminal means for communicating with said management means via the satellite, said management means and said plurality of data terminal means communicating over at least one TDM channel, and a plurality of outbound communications being transmitted from said management means to said plurality of data terminal means in accordance with a communications protocol, each outbound communication of said plurality of outbound communications including a plurality of packets, each packet of said plurality of packets being transmitted on one TDM channel of said at least one TDM channel, means for communicating and coordinating with said plurality of data terminals, and wherein said management means is configured to be free of the means for communicating and coordinating with said plurality of data terminals when said plurality of data terminal means are not engaged in message transfer.

* * * * *